(12) United States Patent
Sako et al.

(10) Patent No.: US 7,894,424 B2
(45) Date of Patent: Feb. 22, 2011

(54) CONTENT USING METHOD, CONTENT USING APPARATUS, CONTENT RECORDING METHOD, CONTENT RECORDING APPARATUS, CONTENT PROVIDING SYSTEM, CONTENT RECEIVING METHOD, CONTENT RECEIVING APPARATUS, AND CONTENT DATA FORMAT

(75) Inventors: Yoichiro Sako, Tokyo (JP); Mitsuru Takehara, Tokyo (JP); Toru Sasaki, Tokyo (JP); Takatoshi Nakamura, Kanagawa (JP); Yuichi Abe, Tokyo (JP); Toshiro Terauchi, Tokyo (JP); Motoyuki Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 722 days.

(21) Appl. No.: 11/729,263

(22) Filed: Mar. 28, 2007

(65) Prior Publication Data
US 2007/0237136 A1 Oct. 11, 2007

(30) Foreign Application Priority Data
Mar. 30, 2006 (JP) ............................... 2006-093061

(51) Int. Cl.
*H04L 12/00* (2006.01)
*G06Q 30/00* (2006.01)
(52) U.S. Cl. .................................... 370/368; 705/14.54
(58) Field of Classification Search ................. 370/368; 725/34, 38, 134; 705/14, 14.54
See application file for complete search history.

(56) References Cited

U.S. PATENT DOCUMENTS 7,017,174 B1 * 3/2006 Sheedy ......................... 725/87
7,330,824 B1 * 2/2008 Kanojia et al. ................. 705/14
2003/0046281 A1 * 3/2003 Son ................................ 707/6
2003/0093790 A1   5/2003 Logan et al.
2005/0149557 A1 * 7/2005 Moriya et al. ............. 707/104.1
2007/0110401 A1 * 5/2007 Deguchi et al. ............... 386/95
2007/0157281 A1 * 7/2007 Ellis et al. .................... 725/134
2007/0162502 A1 * 7/2007 Thomas et al. ........... 707/104.1

FOREIGN PATENT DOCUMENTS

JP    2004-139576    5/2004
JP    2004-259313    9/2004

OTHER PUBLICATIONS

Loui, A.C. et al., "Automatic Image Event Segmentation and Quality Screening for Albuming Applications," Mulitmedia and Expo, Jul. 30, 2000, pp. 1125-1128, vol. 2, IEEE International Conference on New York, NY, USA.
Wang, Yijin et al., "My Videos—A System for Home Video Management," Proceedings ACM Multimedia, Dec. 1, 2002, pp. 412-413, vol. Conf. 10, International Conference on Multimedia, Juan-Les-Pins, France.
Lagoze, Carl et al., "An Event-Aware Model for Metadata Interoperability," Research and Advanced Technology for Digital Libraries: 4th European Conference, Sep. 2000, pp. 103-116, vol. 1923, No. 2000, Lisbon, Portugal.

* cited by examiner

*Primary Examiner*—Pankaj Kumar
*Assistant Examiner*—Saba Tsegaye
(74) *Attorney, Agent, or Firm*—Wolf, Greenfield & Sacks, P.C.

(57) ABSTRACT

A method of using contents includes the steps of setting public time information and private time information, the public time information being associated with each content and defined universally for use by a large number of unspecified users, the private time being associated with the content and defined for use by a small number of particular persons, and searching for a content according to the public time information and/or the private time information and using the content detected in the searching.

11 Claims, 41 Drawing Sheets

FIG. 2

| ID | TYPE | GENRE | TITLE | PERFORMER | (PUBLIC) TIME INFORMATION #1 | | (PUBLIC) TIME INFORMATION #2 | |
|---|---|---|---|---|---|---|---|---|
| | | | | | | ATTRIBUTE OF TIME INFORMATION | | ATTRIBUTE OF TIME INFORMATION |
| 1 | MUSIC | POP | ○○×○○ | □□□□ | AUGUST 25, 1997 | DATE OF RELEASE | FEBRUARY 1998 | RANKED AMONG THE BEST TEN |
| ... | ... | ... | | | | | | |
| 100 | MOVIE | THRILLER | "○○×" | □×□× | JUNE 8, 1995 | DATE OF RELEASE (IN JAPAN) | AUGUST 3, 1994 | DATE OF RELEASE (IN USA) |
| ... | ... | ... | | | | | | |
| 250 | TV PROGRAM | VARIETY SHOW | △△○○□ | △△□□□ | JANUARY 1, 2001 | DATE OF BROADCAST | FEBRUARY 28, 2002 | DATE OF RELEASE OF DVD VERSION |
| ... | ... | ... | | | | | | |
| 1001 | NEWS | GENERAL | ASSUMPTION OF OFFICE OF MR. K AS PRESIDENT | ×□□× | JUNE 1, 2000 | DATE OF BROADCAST | MAY 31, 2000 | DATE OF OCCURRENCE OF EVENT |
| 1002 | NEWS | SPORT | MR. I GOT 2000TH HIT | □□×× | AUGUST 20, 2004 | DATE OF PUBLICATION IN NEWSPAPER | AUGUST 19, 2004 | DATE OF OCCURRENCE OF EVENT |
| ... | ... | ... | | | | | | |
| 2001 | E-BOOK | SAMURAI STORY | "BATTLE OF ○○" | ○○□□ | MAY 1, 1995 | DATE OF PUBLICATION OF PAPER BOOK VERSION | APRIL 10, 1996 | DATE OF PUBLICATION OF E-BOOK VERSION |
| ... | ... | ... | | | | | | |

FIG. 3

| ID | TYPE | GENRE | TITLE | PERFORMER | TIME INFORMATION #1 (PUBLIC) | | TIME INFORMATION #2 (PUBLIC) | | TIME INFORMATION #3 (PRIVATE) | |
|---|---|---|---|---|---|---|---|---|---|---|
| | | | | | ATTRIBUTE OF TIME INFORMATION | | ATTRIBUTE OF TIME INFORMATION | | ATTRIBUTE OF TIME INFORMATION | |
| 1 | MUSIC | POP | ○○×○○ | □□□□ | AUGUST 25, 1997 | DATE OF RELEASE | FEBRUARY 1998 | RANKED AMONG THE BEST TEN | DECEMBER 1998 | DATE OF PURCHASE |
| ... | | | | | | | | | | |
| 100 | MOVIE | THRILLER | "○○×" | □×□× | JUNE 8, 1995 | DATE OF RELEASE (IN JAPAN) | AUGUST 3, 1994 | DATE OF RELEASE (IN USA) | AUGUST 2, 1994 | DATE OF SEEING (IN USA) |
| ... | | | | | | | | | | |
| 250 | TV PROGRAM | VARIETY SHOW | △△○○□ | △△□□□ | JANUARY 1, 2001 | DATE OF BROADCAST | FEBRUARY 28, 2002 | DATE OF RELEASE OF DVD VERSION | APRIL 1, 2003 | DATE OF PLAYBACK OF DVD |
| ... | | | | | | | | | | |
| 1001 | NEWS | GENERAL | ASSUMPTION OF OFFICE OF MR. K AS PRESIDENT | ×□□× | JUNE 1, 2000 | DATE OF BROADCAST | MAY 31, 2000 | DATE OF OCCURRENCE OF EVENT | JUNE 1, 2000 | DATE OF WATCHING TV |
| 1002 | NEWS | SPORT | MR. I GOT 2000TH HIT | □□×× | AUGUST 20, 2004 | DATE OF PUBLICATION IN NEWSPAPER | AUGUST 19, 2004 | DATE OF OCCURRENCE OF EVENT | AUGUST 21, 2004 | DATA OF READING NEWSPAPER |
| ... | | | | | | | | | | |
| 2001 | E-BOOK | SAMURAI STORY | "BATTLE OF ○○" | ○○□□ | MAY 1, 1995 | DATE OF PUBLICATION OF PAPER BOOK VERSION | APRIL 10, 1996 | DATE OF PUBLICATION OF E-BOOK VERSION | DECEMBER 10, 1995 | DATE OF DOWNLOADING |
| ... | | | | | | | | | | |

CONTENT USING METHOD, CONTENT USING APPARATUS, CONTENT RECORDING METHOD, CONTENT RECORDING APPARATUS, CONTENT PROVIDING SYSTEM, CONTENT RECEIVING METHOD, CONTENT RECEIVING APPARATUS, AND CONTENT DATA FORMAT

CROSS REFERENCES TO RELATED APPLICATIONS

The present invention contains subject matter related to Japanese Patent Application JP 2006-093061 filed in the Japanese Patent Office on Mar. 30, 2006, the entire contents of which are incorporated herein by reference.

BACKGROUND OF THE INVENTION

1. Field of the Invention

The present invention relates to a method and apparatus for using contents, and more particularly, to a method and apparatus for using contents represented in a data format that allows it to easily find desired contents from a large number of music contents, a large number of video content, a large number of electronic book contents, and the like, by performing searching according to time information as a search key.

In the present description, the term "content" is used to denote content information represented in the form of signals such as music content, audio contents, video contents (movie contents, TV program contents, photographic image contents etc.) electronic book contents (text information and/or still image information of papers, novels, journals, etc.), news information contents, guide information contents, Web page contents, and program contents (computer program contents, game program contents, etc.).

2. Description of the Related Art

It is known to store contents in a content storage unit in association with date information or time information expressed in year, month, day, hours, minutes, and seconds, and find particular contents by searching the content storage unit by using time information as a search key.

For example, Japanese Unexamined Patent Application Publication No. 2004-259313 discloses a recording/playback apparatus capable of storing contents in a content storage unit in association with a title and a recording date, and displaying titles of contents found as a result of searching performed using a recording date as a search key thereby allowing it for a user to easily find a desired content.

Japanese Unexamined Patent Application Publication No. 2004-139576 discloses a technique of dealing with image data, including storing image data in a server together with date information indicating a date of taking an image, information indicating a starting place of a travel, a starting time, and a final destination, etc., input by a user, guessing a place on a travel route at which image data was taken on the basis of date information associated with the image data, reading associated data including, for example, other image data or text data associated with the guessed place at which the image data was taken, and producing album data from the image data and the associated data.

SUMMARY OF THE INVENTION

In the known techniques, such as those disclosed in Japanese Unexamined Patent Application Publication No. 2004-259313 and Japanese Unexamined Patent Application Publication No. 2004-139576, to search for contents using time information such as date information, contents are stored in a storage unit in association with time information with a particular attribute associated with a feature or a characteristic of each content. In these techniques, the time information used as a content search key has only single attribute, and thus it is not necessary to specify an attribute of time information when searching is performed.

In other words, when various types contents are stored in the storage unit, or when a plurality pieces of time information having different attributes are assigned to each content stored in the storage unit, it is difficult to directly use the technique disclosed in Japanese Unexamined Patent Application Publication No. 2004-259313 or Japanese Unexamined Patent Application Publication No. 2004-139576.

It is known to search for text information on the Internet by using particular date information as a search key.

However, in this text information search technique, it is possible to find only text information or Web site information including the date information matching date information specified as the search key, and it is difficult to search for contents including time information as metadata (associated data). For example, it is difficult to find music contents released at a particular date, broadcast program contents broadcast at a particular day of a particular month in a particular year, or movie contents (such as MPEG (Moving Picture Experts Group) files including metadata indicating date information) shown at a particular day of a particular month in a particular year, by performing searching using date information as a search key.

There can be two types of time information associated with contents. One is public time information universally defined for common use by a large number of unspecified persons, such as time information indicating a content release date. The other is private time information defined for use by a small number of particular persons (or groups), such as time information indicating a date when a content was purchased or a date when a content was viewed.

However, in the known techniques, it is difficult to distinguish the public time information and the private time information from each other when contents are searched for, which is very inconvenient for users.

In view of the above, the present invention provides a system and a method which allow it to easily find desired contents including time information in the form of metadata from a wide variety of contents stored in a storage unit, by searching for contents on the bases of time information.

According to an embodiment of the present invention, there is provided a method of using contents, including the steps of setting public time information and private time information, the public time information being associated with each content and defined universally for use by a large number of unspecified users, the private time being associated with the content and defined for use by a small number of particular persons, and searching for a content according to the public time information and/or the private time information and using the content detected in the searching.

In this method of using contents, public time information and private time information are set as time information associated with each content, and contents can be searched for using the public time information and/or the private time information.

Thus, the method makes it possible to easily find a content having a particular attribute from a large number of contents.

In the method of using contents, the public time information and the private time information may each include, as associated data, attribute information indicating attributes of the public time information and the private time information, respectively, and the content searching may be performed using also the attribute information of each type of time information.

In this method of using contents, because each of public time information and private time information is associated with attribute information of time information, it is possible to search for contents having a particular attribute by precisely setting a search condition based on attribute information of time information.

In the method of using contents, the attribute information of the private time information may include information identifying a person or group associated with the private time information.

In this method of using contents, because the attribute information of the private time information can include information identifying a particular person or group, it is possible to search for contents by using not only private time information associated with a user but also using private time information associated with a particular person or group.

In the method of using contents, the content searching may be performed using the difference between the public time information and the private time information as a search key.

In this method, for example, when a date of releasing each content is set as public time information, and a date of purchasing each content is set as private time information, it is possible to find contents whose purchase date is within a particular range with respect to the content release date, by performing searching using the time difference as a search key.

Thus, in this method, for example, a user can search for contents which were purchased at a particular time after the release date, such as those purchased immediately after the release date or those purchased a long time after the release date.

As described above, the present invention provides great advantages. That is, by setting public time information and private time information for each of a wide variety of contents, it becomes possible to easily find desired contents from the wide variety of contents by performing searching according to the public time information and the private time information. Furthermore, the present invention provides a new method of acquiring and using contents by finding desired contents by performing searching using the difference between public time information and private time information as a search key.

BRIEF DESCRIPTION OF THE DRAWINGS

FIG. 2 shows an example of associated data of contents stored in a content database of a content providing server in a content providing system according to an embodiment of the present invention;

FIG. 3 shows an example of associated data of contents stored in a content storage unit of a content receiving terminal in a content providing system according to an embodiment of the present invention;

DESCRIPTION OF THE PREFERRED EMBODIMENTS

The present invention is described in further detail below with reference to embodiments in conjunction with the accompanying drawings.

Figure 1:
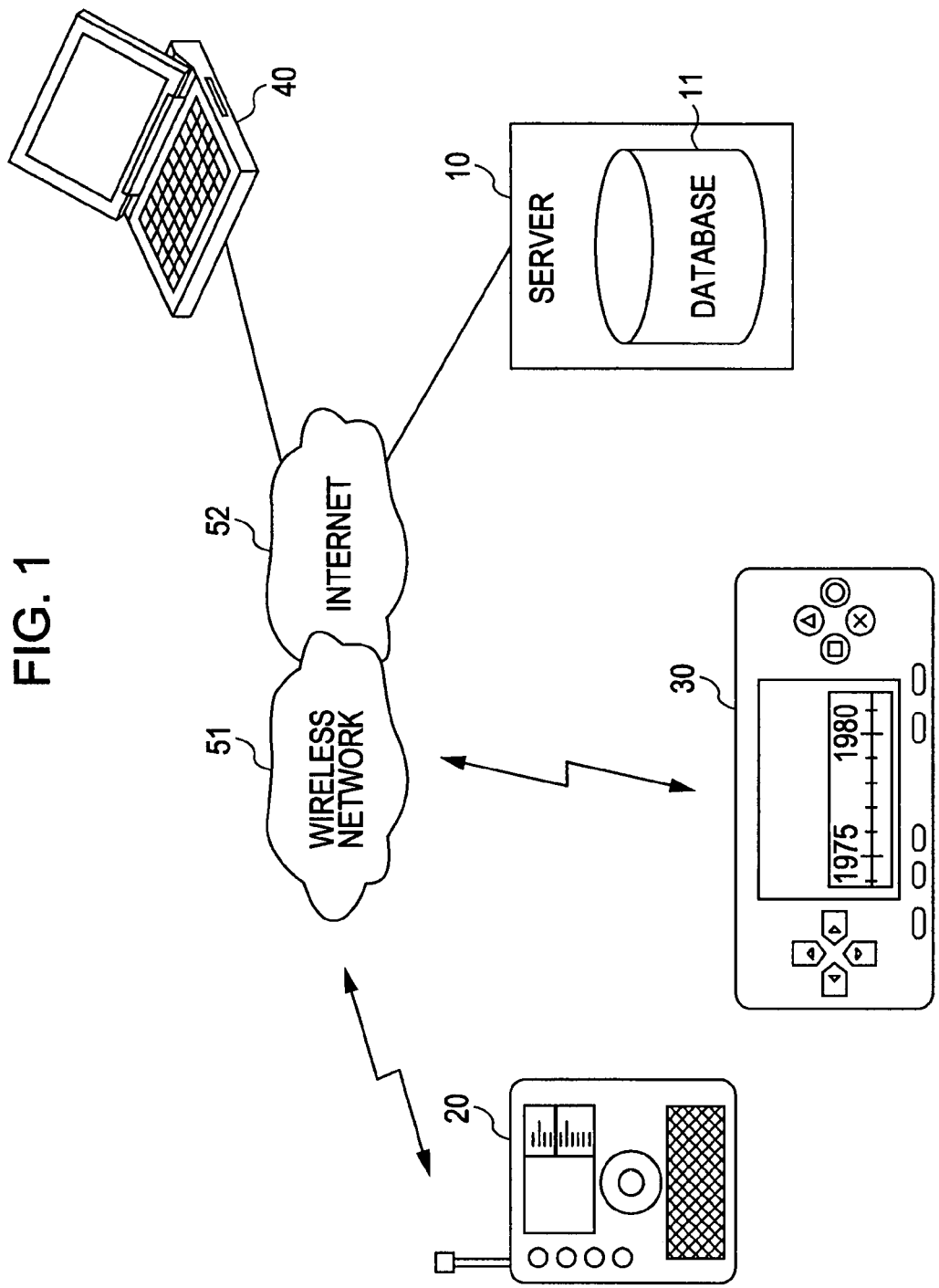
FIG. 1 is a diagram showing a content providing system according to an embodiment of the present invention.

FIG. 1 is a diagram showing a content providing system according to an embodiment of the present invention.

In the embodiment shown in FIG. 1, the content providing system includes a content providing server 10 and a plurality of types of content receiving terminals (content receiving terminals 20, 30, sand 40 in the example shown in FIG. 3) connected to the content providing server 10 via a particular communication channel. In the example shown in FIG. 1, the communication channel includes a wireless network 51 and the Internet 52.

The content receiving terminal 20 is, for example, a receiving terminal dedicated to receiving and playing back music content and configured to be portable as with a portable radio receiver. This content receiving terminal 20 (hereinafter, referred to as the music content receiving terminal 20) is configured to be capable of accessing the content providing server 10 via the wireless network 51 and the Internet 52, establishing a communication channel to the content providing server 10, and making a connection with the content providing server 10 via the established communication channel.

The content receiving terminal 30 is, for example, a receiving terminal for AV (Audio-Visual) contents such as movie contents. In the present example, this content receiving terminal 30 is assumed to be a portable game machine having a capability of playing back AV contents. This content receiving terminal 30 (hereinafter, referred to as the AV content receiving terminal 30) is also configured to be capable of accessing the content providing server 10 via the wireless network 51 and the Internet 52, establishing a communication channel to the content providing server 10, and making a connection with the content providing server 10 via the established communication channel.

The content receiving terminal 40 is, for example, a personal computer configured to also function as a content receiving terminal by software according to the present embodiment of the invention, that is, configured to be capable of receiving various contents and playing back them. This content receiving terminal 40 (hereinafter, referred to as the general-purpose content receiving terminal 40) is capable of accessing the content providing server 10 via the Internet 52, establishing a communication channel to the content providing server 10, and making a connection with the content providing server 10 via the established communication channel.

The content receiving terminals 20, 30, and 40 described above are examples of content receiving apparatuses according to the present embodiment of the invention. Note that the content receiving apparatuses according to the present invention are not limited to these content receiving terminals 20, 30, and 40, but various other types of content receiving terminals can also be used. In the following description of the present embodiment, for simplicity of discussion, it is assumed that the content providing system includes only the content receiving terminals 20, 30, and 40.

The content providing server 10 includes a content database 11. In this content database 11, various kinds of content data are stored together with associated data related to the corresponding contents. Examples of contents are music contents, video contents, broadcast program contents, electronic book contents, and photography contents (photographic image contents).

FIG. 2 shows examples of associated data of contents stored in the content database 11 of the content providing server 10. In the present example, the associated data is described in a data format shown in FIG. 2 such that each content data is related to corresponding associated data via a content identification number (ID) and stored in a data storage unit such as the content database 11. Although not shown in the figure, each content data is stored in the content database 11 in association with a corresponding content identification number (ID), and associated data of each content data is stored in the content database 11 in associated with the content identification number (ID) as shown in FIG. 2.

In the example shown in FIG. 2, items of the associated data of the content include "type" of content such as "music", "movie", "television broadcast program", or "electronic book", "genre" of content, "title" of content, "performer" such as a player or an actor/actress, "time information" associated with content, and "data format" indicating a data format such as a compression method of content data.

In the present embodiment, in particular, the time information includes, in addition to information indicating a time value, attribute information indicating an attribute (meaning) of the time information. Note that it is allowed to describe a plurality of pieces of time information having different attributes for a single content. That is, in the present embodiment, time information associated with a content stored in the content database 11 may indicate a plurality of time values having different attributes. Note that each piece of time information can be identified by attribute information.

In the case of associated data of contents stored in the content database 11 of the content providing server 10, time information associated with each content is public time information universally defined for use by a large number of unspecified persons, and the time information is stored in association with a corresponding content.

In the present embodiment, private time information associated with a content, defined for a particular user (or a group) is not included in the associated data of the content in the content stored in the database 11 of the content providing server 10. However, as in an alternative embodiment described later, private time information associated with a content may also be stored in the content database 11 of the content providing server 10.

When the content providing server 10 acquires a content and stores it in the content database 11, public time information is also stored in association with the content in the content database 11. In a case where, when a content data is acquired, associated data of the acquired content includes public time information, the associated data including this public time information is directly stored in association with the content in the content database 11 of the content providing server 10.

In a case where an acquired content does not have associated data at all or associated data does not have public time information, an operator describes associated data including public time information and stores it together with the content in the content database 11.

In the case of music contents, public time information may indicate, for example, as shown in FIG. 2, a date/time of release of a music record or a CD (Compact Disc), a date/time of being ranked in a best-ten hit chart, a date/time of being performed in a live show, or a date/time of being broadcast on radio or television, and the public time information is stored together with attribute information (which may be described, for example, in the form of text) indicating an attribute of the time information in the content database 11.

In the case of movie contents, public time information may indicate, for example, as shown in FIG. 2, a date/time of being released in Japan, a date/time of being released in the USA, or a date/time of being broadcasted on TV, and the public time information is stored together with attribute information (which may be described, for example, in the form of text) indicating an attribute of the time information in the content database 11.

In the case of TV program contents, public time information may indicate, for example, as shown in FIG. 2, a date/time of being broadcast, a date/time when a DVD (Digital Versatile Disc) version of the program content was released, or a date/time of being re-broadcast, and the public time information is stored together with attribute information (which may be described, for example, in the form of text) indicating an attribute of the time information in the content database 11.

In the case of news contents, as shown in FIG. 2, the public time information indicates, for example, a date of broadcasting news, a date when an event occurred, or a date when an event was reported on a newspaper, and the public time information is stored together with attribute information (which may be described, for example, in the form of text) indicating such an attribute of the time information in the content database 11. In the present embodiment, it is assumed that news contents are stored separately depending on types of news in the content database 11. For example, when a plurality of pieces of news reporting different events are broadcast in the same time slot, each piece of news is stored separately in the content database 11 and managed separately.

In the case of electronic book contents, as shown in FIG. 2, the public time information indicates, for example, a date (year, month, day) of publishing of a paper book version, a date (year, month, day) of publishing of an electronic book version, or a date (year, month, day) when a book was for the first time ranked within best seller books, and the public time information is stored together with attribute information (which may be described, for example, in the form of text) indicating such an attribute of the time information in the content database 11.

Content data (main content data such as music content data, image content data, or text content data) are compressed by a proper method selected depending on the content type and stored in the content database 11. For example, in the case of music content data, the data is compressed according to the MP3 (MPEG-1 Audio layer 3) standard or the ATRAC3 (Adaptive Transform Acoustic Coding 3) standard, and the resultant compressed data may be stored. Music content data may be in a format according to the MIDI (Musical Instrument Digital Interface) standard.

In the case of video content data, the data may be compressed according to the MPEG (Moving Picture Experts Group) 2 standard, the MPEG4 standard, or JPEG standard, and the resultant compressed data may be stored.

Although not shown in FIG. 2, information indicating the compression method or the data format of each music content or video content is also stored as attribute information in the content database 11. As will be described in further detail later, when the content providing server 10 receives a content acquisition request from a content receiving terminal, the content providing server 10 determines, from associated information included in the request, which data format can be decoded and played back by the content receiving terminal which has issued the content acquisition request, and the content providing server 10 selects and transmits contents data which can be decoded and played back by the content receiving terminal.

In the present embodiment, as described above, in the content providing server 10, a plurality of types of contents are stored in association with time information in the content database 11. When the content providing server 10 receives a content acquisition request from the content receiving terminal 20, 30, or 40, the content providing server 10 transmits a requested content to the content receiving terminal 20, 30, or 40 which has issued the request.

In the present embodiment, a user of the content receiving terminal 20, 30, or 40 is allowed to issue a content acquisition request together with time information specifying a time value (year, month, day, min, sec). For example, a user may request music contents of 1960s, movie contents of 1980s, news contents about events occurred Nov. 11, 1999, 10:00 p.m., etc.

That is, in the present embodiment, the content acquisition request transmitted from the content receiving terminal 20, 30, or 40 to the content providing server 10 includes at least time information which is to be used as a keyword in searching for contents.

In a case where only a time is specified and the content type is not specified, all contents which matches the specified time information are extracted as a result of the search and transmitted. To request contents of a particular kind such as music contents, movie contents, or news contents, time information and information specifying the content type are transmitted together with the content acquisition request from the content receiving terminal.

If a content acquisition request includes only time information with no attribute information indicating the attribute of the time information, it is impossible to identify the attribute of the time information. In the present embodiment, to avoid the above problem, time information transmitted together with a content acquisition request needs to include attribute information indicating the attribute of the time information. For example, to request music contents which were hit in the 1970s, the time information is set to indicate the 1970s and the attribute information of the time information is set to indicate "hit music".

More particularly, in this case, to set the attribute information of the time information so as to indicate "hit music", the same attribute information as that stored in the content database 11 of the content providing server 10 shown in FIG. 2 may be used. For example, "ranked within best ten" may be used as attribute information.

Note that, to specify "hit music" as the attribute of time information, it is not necessarily needed to use the same attribute information as that stored in the content database 11 of the content providing server 10. When attribute information is different from that stored in the content database 11 of the content providing server 10, the content providing server 10 may analyze the attribute information of the time information included in the content acquisition request received from the content receiving terminal and may search the content database 11 for contents which satisfy the attribute information.

For example, when "hit music" is specified by attribute information of time information included in a content acquisition request received from a content receiving terminal, the content providing server 10 regards the attribute information of the time information as corresponding to "ranked within best ten" and search the content database 11 for contents having attribute information "ranked within best ten" and satisfying time information specified by a user. Thus, for example, music contents which were hit in the 1970s are extracted.

In the present embodiment, as will be described in further detail later, selectable attributes of time information are defined in advance, and a user may select one of these attributes. This makes it easy for the content providing server 10 to set a search condition.

In the present embodiment, because a plurality of types of contents are stored in the content providing server 10 as described above, to acquire a particular type of content, it is needed to specify the particular content type in a content acquisition request. Thus, basically, a user is needed to specify a desired content type.

However, the music content receiving terminal 20 is designed to receive and play back only music contents, while the AV content receiving terminal 30 is designed to receive and play back only video contents. Therefore, in the present embodiment, when a content acquisition request is issued by the music content receiving terminal 20 or the AV content receiving terminal 30, information indicating the content type corresponding to the type of the content receiving terminal is automatically incorporated in the content acquisition request. This makes it unnecessary for a user to specify a content type.

Note that in the case of the general-purpose content receiving terminal 40, a user has to specify the type of a content to be provided.

In the present embodiment, a particular attribute may be specified for time information or no particular attribute may be specified. In the case where no particular attribute is specified for time information, the content providing server 10 determines that a "recommended" content is requested.

In a case where a particular attribute of time information is specified in a content acquisition request, the content providing server 10 searches for contents which satisfy the specified attribute of the time information and transmits detected contents to a content receiving terminal which has issued the content acquisition request.

In the present embodiment, on a content receiving terminal, a user is allowed to set information to specify an attribute of a content such as a genre in addition to the attribute of time information. Hereinafter, information indicating an attribute of a content other than the attribute of time information will be referred to simply as content attribute information. The content attribute information set by the user is incorporated in a content acquisition request. When the content providing server 10 receives the content acquisition request, the content providing server 10 uses the content attribute information as one of search conditions. A user may specify no particular content attribute. In this case, the content providing server 10 searches for contents without taking into account the content attribute.

In the present embodiment, as described above, time information and associated information specifying a particular scope of contents to be acquired are included in a content acquisition request transmitted to the content providing server 10. If the content providing server 10 receives the content acquisition request, the content providing server 10 sets the search condition according to the time information and the associated information included in the received content acquisition request, and searches the content database according to the search condition. Thus, it is possible to easily acquire a particular content including time information as metadata, such as a music content released at a date specified by the time information, a broadcast program content broadcast at a specified date, or a movie content released at a specified date.

In the present embodiment, when a content is downloaded to a content receiving terminal 20 or 30 from the content providing server 10, the content providing server 10 produces private time information indicating the date of downloading or purchasing of the content and adds the produced private time information to the associated data of the content.

Thus, when the content receiving terminal acquires the content from the content providing server 10, the associated data of the acquired content includes public time information and private time information. In the present embodiment, the content receiving terminal may be used to acquire a content for the purpose of simply viewing the content and also for the purpose of purchasing the content. When a content is acquired for the purpose of purchasing from the content providing server 10, the data of the content and associated data acquired from the content providing server 10 are stored in the content storage unit.

When a content is searched for from those stored in the content storage unit of the content receiving terminal, the public time information and the private time information may be included in the search condition.

In the present embodiment, a user is allowed to define additional private time information in associated data for each content by operating an input means disposed on the content receiving terminal. When private time information is defined, the user may also define a person/group name associated with the private time information so as to indicate that the private time information is defined for the particular person/group indicated by the person/group name.

For example, the person/group name may be set so as to indicate that the private time information is defined for "father", "mother", "myself", or "daughter A". The person/group name may also be set to indicate a particular group such as a particular family.

FIG. 3 shows an example of associated data of contents stored in a content storage unit of a content receiving terminal.

In the example shown in FIG. 3, private time information is described as time information #3. For example, "date of purchase" of a music content is described in private time information by the content providing server 10. On the other hand, for example, "date of viewing" of a movie content is input by a user via input means and added as private time information to the associated data of the music content.

"Date of playback" of a TV program content indicates a date when a DVD is played back on a content receiving terminal (such as a personal computer 40) and is described as private time information by the content receiving terminal. Alternatively, "date of playback" may be input by a user via input means.

"Date of viewing" of a news content is described as private time information by the content receiving terminal. "Date of reading" of a news content is input by a user via input means and stored as private time information.

"Date of downloading" of an electronic book content is described as private time information by the content providing server 10 when the content is downloaded.

Although in the present embodiment, it is assumed that "date of downloading" and "date of purchasing" are described in associated data by the content providing server 10, they may be described in associated data by a content receiving terminal when a content is downloaded or stored in the content storage unit. In this case, the content providing server 10 does not need to describe the private time information in the associated data for the content.

In the present embodiment, when contents are searched for from those stored in a content storage unit of a content receiving terminal, private time information and public time information are distinguished from each other. To this end, the content receiving terminal determines whether specified time information is private time information or public time information.

One of methods described below may be used to identify whether time information is private time information or public time information.

A first method is to add additional information indicating whether time information is public time information or private time information to attribute information of the time information. For example, one-bit additional information is set to "0" to indicate that time information is public time information or "1" to indicate that time information is private time information.

In this first method, when the attribute of time information is defined by the content providing server 10 or the content receiving terminal 20, 30, or 40, the additional information is also described by the content providing server 10 or the content receiving terminal 20, 30, or 40. When time information is input by a user via input means, a content receiving terminal sets the additional information depending on whether private time information or public time information is selected by the user.

A second method of identifying the type of time information is to define in advance which attributes of time information can be of public time information and which attributes of time information can be of private time information, and describe the defined type in a time information type dictionary. When time information with a particular attribute is given, a determination of the time information type is made using the time information type dictionary.

In this second method, allowable attributes of time information are limited to those registered in the time information type dictionary. When a new attribute of public time information or private time information appears, it may be additionally registered in the time information type dictionary.

In this second method, when a user inputs private time information via input means, a content receiving terminal may display a list of attributes of private time information registered in the time information type dictionary so that the user is allowed to select an attribute for the private time information from the list. When an attribute adequate for private time information is not found in the list, a user may directly input the adequate attribute. In this case, the content receiving terminal registers the directly input new attribute of the private time information in the time information type dictionary.

Examples of configurations of the content providing server 10 and the content receiving terminals 20, 30, and 40 and their operations are described in further detail below. Note that in the examples described below, for the purpose of simplicity, content attribute information selectable by a user is limited to genre information.

Hardware Configuration of Content Providing Server

Figure 4:
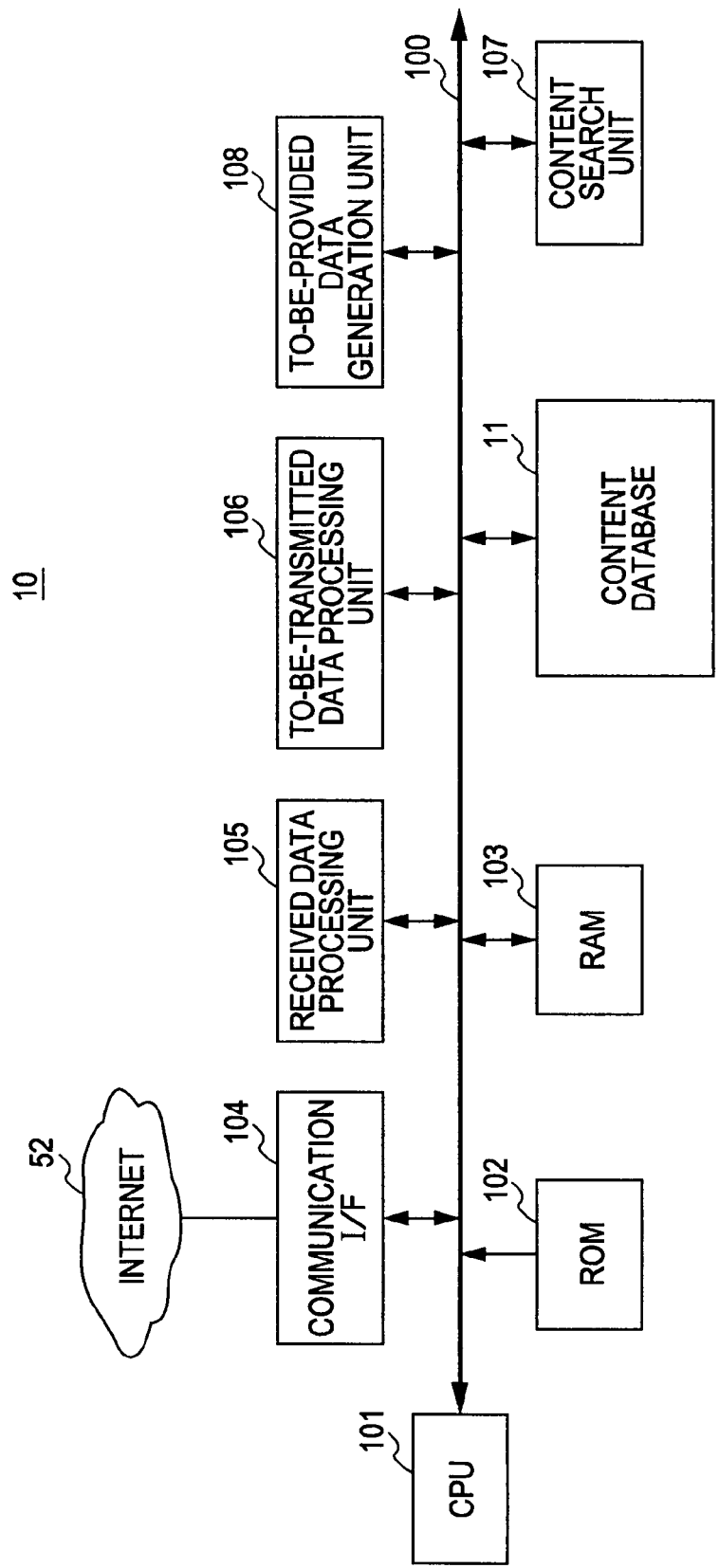
FIG. 4 is a block diagram showing an example of a hardware configuration of a content providing server according to an embodiment of the present invention.

FIG. 4 shows an example of a hardware configuration of the content providing server 10 according to an embodiment of the present invention.

In the example shown in FIG. 4, the content providing server 10 includes a CPU (Central Processing Unit) 101 and other units connected to the CPU 101 via a system bus 100. The units connected to the CPU 101 are a program ROM (Read Only Memory) 102, a work area RAM (Random Access Memory) 103, a communication interface 104, a received data processing unit 105, a to-be-transmitted data processing unit 106, a content database 11, a content search unit 107, and a to-be-provided data generation unit 108. The communication interface 104 is connected to the Internet 52.

In the ROM 102, a processing program to be executed by the CPU 101 of the content providing server 10 is stored. The RAM 103 is used as a work area by the CPU 101 when the CPU 101 executes the processing program. In the ROM 102, a communication network address assigned to the content providing server 10 is also stored. This communication network address is used in communication.

If the received data processing unit 105 receives a content acquisition request from a content receiving terminal via the communication interface 104, the received data processing unit 105 converts the received content acquisition request into a form processable by the content providing server 10 and transmits it over the system bus 100.

The to-be-transmitted data processing unit 106 converts to-be-transmitted data produced by the to-be-provided data generation unit 108 into a form adequate for transmission over a communication network and transmits it over the Internet 52 via the communication interface 104.

The content database 11 stores data of contents and associated data thereof including at least time information associated with the respective contents and attribute information of the time information, for example, as shown in FIG. 2. As described above, each content and corresponding associated data are related to each other via content identification information ID.

The content search unit 107 sets a search condition according to the time information, the attribute information of the time information, the genre information, etc. included in the content acquisition request received from the content receiving terminal, searches associated data stored in the content database 11 in accordance with the search condition, and extracts content data hit in the search. Note that the content search unit 107 may be implemented in the form of software executed by the CPU 101.

The to-be-provided data generation unit 108 produces data to be transmitted in accordance with information obtained as a result of the searching performed by the content search unit 107 and transfers the produced data to be transmitted to the to-be-transmitted data processing unit 106.

In a case where the requested content is, for example, a music content, the to-be-provided data generation unit 108 converts the music content data, which has been obtained as a result of the searching process from the content database 11, into a form that allows the music content receiving terminal 20 to perform streaming-playback of the music contend, and transmits it to the music content receiving terminal 20.

In the present embodiment, in a case where a plurality of music contents are extracted from the content database 11 as a results of the search process, the plurality of music contents are transmitted sequentially in a random order to the music content receiving terminal 20. The random order is determined based on a time at which a content is transmitted or a content acquisition request is received so that the order of transmitting a plurality of contents detected in the search becomes different depending on the time at which the content acquisition request is received, even if the same contents are detected.

The reason for transmission in a random order is that when the same plurality of music contents as those provided in the past are again requested by the same user of the music content receiving terminal 20, if the plurality of music contents are transmitted in the same order as that in the previous transmission, transmission in the same order can bore the user. A transmission log may be recorded for each user, and music contents may be transmitted in accordance with the transmission log so that the same contents are not transmitted repeatedly to the same user.

In the present embodiment, as described above, music contents are provided to the user of the music content receiving terminal 20 from the content providing server 10 in response to a content acquisition request including at least time information specifying contents, and thus the user can enjoy listening to music contents provided in a similar manner to radio. For example, the user can listen to music contents which were hit in the 1960s in an arbitrary order. Thus, as described above, the present embodiment of the invention provides a new system and method of providing music contents to users.

Furthermore, in the present embodiment, when the music content receiving terminal 20 is playing back a music content provided from the content providing server 10, a user of the music content receiving terminal 20 can purchase the music content being currently played back by sending a purchase request to the content providing server 10.

If the content providing server 10 receives the content purchase request from the music content receiving terminal 20, the content providing server 10 downloads the data of the content, which is being transmitted to the music content receiving terminal 20 at the point of time when the content purchase request is received, to the music content receiving terminal 20 which has issued the content purchase request, together with associated data of the content. Note that the term "download" is used in the present description to denote transmission of full data of a requested music content to the music content receiving terminal 20 from the content providing server 10. When downloading is performed, the current streaming transmission is stopped temporarily, and the full data of the requested content is transmitted.

In the present embodiment, as described above, when downloading is performed, private time information indicating the download date or the purchase date and attribute information of the private time information are incorporated in the associated data of the music content data downloaded to the music content receiving terminal 20 from the content providing server 10. Note that the associated data is produced by the to-be-provided data generation unit 108.

In the example described above, when a plurality of contents are found in the content database as a result of the search, the plurality of contents are sequentially transmitted. Alternatively, instead of simply transmitting all detected contents, a list of contends found in the search may be transmitted to the content receiving terminal. A user selects one or more contents from the list, and transmits information indicating the selected contents to the content providing server 10. The content providing server 10 transmits the contents selected by the user to the content receiving terminal.

In the present embodiment, as for music contents found in the search, the content providing server 10 sequentially transmits music contents in a random order in the form of streaming data as described above. However, for other types of contents such as AV contents, electronic book contents, etc., a list of contents found in the search is transmitted before full content data is transmitted.

That is, when the to-be-provided data generation unit 108 determines that contents of a type other than music contents are requested to be provided, the to-be-provided data generation unit 108 produces a list of one or more contents found in the content database 11 as a result of the search, and transmits the list to the content receiving terminal 30 or 40.

When the content receiving terminal 30 or 40 receives the list of contents, a user selects a particular content from the list.

A content acquisition request is produced according to the selection made by the user, and the resultant content acquisition request is sent to the content providing server 10.

In the present embodiment, the content acquisition request issued by the content receiving terminal 30 or 40 includes purpose-of-request information indicating whether the requested content is for the purpose of simple viewing or for the purpose of purchasing.

When the content providing server 10 receives a content acquisition request, the content providing server 10 determines the purpose of the content request. If it is determined that the content request is for simple viewing, the content providing server 10 transmits the requested content in the form of streaming data. On the other hand, if it is determined that the purpose of the content request is for purchasing, the content providing server 10 downloads the specified content data and associated data to the content receiving terminal 30 or 40 which has issued the content acquisition request.

In the present embodiment, as described above, when downloading is performed by the content providing server 10, the to-be-provided data generation unit 108 produces data to be transmitted such that private time information indicating the download date or the purchase date and attribute information of the private time information are included in associated data of the content data to be downloaded to the music content receiving terminal 30 or 40.

Hardware Configuration of Music Content Receiving Terminal

Figure 5:
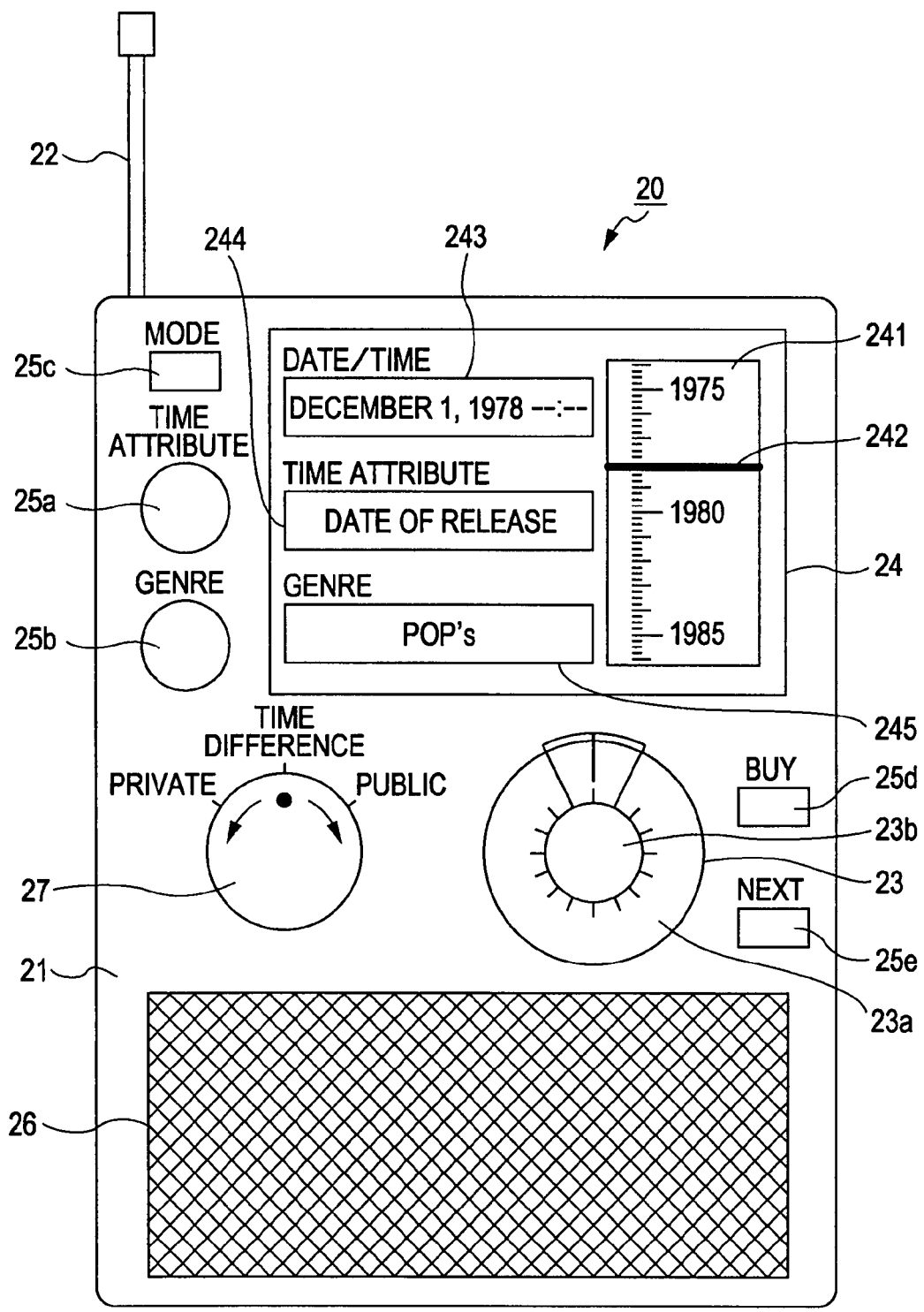
FIG. 5 is a diagram showing an example of an operation control panel of a content receiving terminal configured so as to function as a music content receiving terminal according to an embodiment of the present invention.

FIG. 5 shows an example of an external appearance of the music content receiving terminal 20 according to an embodiment of the present invention. In FIG. 5, a front panel, serving as an operation control panel, of a case 21 of the music content receiving terminal 20 viewed from front is shown.

In the present embodiment, as described above, the music content receiving terminal 20 includes a transmitting/receiving antenna 22 for connection to a wireless network. On the operation control panel of the case 21 of the music content receiving terminal 20, there are disposed a rotatable operation control knob 23 for setting time information, a display screen 24 realized by a display device such as an LCD (Liquid Crystal Display), a plurality of operation buttons 25a, 25b, 25c, 25d, and 25e, a sound/voice emission unit 26 using a speaker, and a search condition selection switch 27.

In the example shown in FIG. 5, the operation control button 25a is used as an operation control button for selecting/setting an attribute of time information (hereinafter referred to as a time attribute selection button), and the operation control button 25b is used as an operation control button for selecting/setting a genre (hereinafter referred to as a genre selection button).

The operation control button 25c serves as a mode selection button for selecting the operation mode of the music content receiving terminal 20 between a content receiving mode and a content search mode. In the content receiving mode, the music content receiving terminal 20 accesses the content providing server 10 and contents are received from the content providing server 10, while in the content search mode, contents are searched for from the content storage unit of the content providing server 10. In the present embodiment, each time the operation control button 25c is pressed, the state of the operation control button 25c toggles between a state in which the operation control button 25c is locked in a pressed-down position and a state in which the operation control button 25c is in an upper free position. When the operation control button 25c is in the pressed-down position, the content receiving mode is selected, while the content search mode is selected when the operation control button 25c is in the upper free position.

The operation control button 25d serves as a purchase button. If this button is pressed in the content receiving mode, a purchase request for a music content being currently played back is issued.

The operation control button 25e serves as a next-content button. In the content receiving mode, when a plurality of music contents are found as a result of search and one of them is being currently transmitted from the content providing server 10 in response to a content acquisition request, if the next-content button 25e is pressed, the transmission of the current music content is terminated and a next music content is transmitted from the content providing server 10.

The search condition selection switch 27 is an unit for switching/selecting a search condition, and the search condition selection switch 27 is enabled only in the content search mode. In the present embodiment, the search condition selection switch 27 has three switching positions: "private", "public", and "time difference".

In the search operation in the content search mode, to specify private time information by a time value set by the rotatable operation control knob 23, the search condition selection switch 27 is switched to the "private" position. On the other hand, in the search operation in the content search mode, to specify public time information by a time value set by the rotatable operation control knob 23, the search condition selection switch 27 is switched to the "public" position.

In the present embodiment, the difference between a time value indicated by the public time information and a time value indicated by the private time information (for simplicity, such a difference will be denoted as a difference between public time information and private time information, that is, a time value indicated by time information will be referred to simply as "time information" unless confusion occurs) is allowed to be used as a search condition. To specify a time difference as a search condition, the search condition selection switch 27 is switched to the "difference" position.

In the present embodiment, on the display screen 24, a time information display area 241, a time axis cursor 242, a time information display area 243, a time information attribute display area 244, and a content genre display area 245 are displayed.

In the time information display area 241, tick marks indicating time values are displayed along a time axis in a vertical direction as shown in FIG. 5. In the example shown in FIG. 5, long tick marks with numeric labels indicating years are formed every five years, middle-long tick marks are formed every year, and short tick marks are formed every three months.

The time axis cursor 242 is displayed in the form of a horizontal bar, and its position moves within the time information display area 241 along the time axis in response to the rotating operation of the rotatable operation control knob 23 performed by a user. In the present embodiment, the position of the time axis cursor 242 is controlled by software such that the position of the time axis cursor 242 is changed in accordance with the rotation of the rotatable operation control knob 23.

More specifically, the time axis cursor 242 moves continuously in accordance with the rotation of the rotatable operation control knob 23 in a similar manner to continuous motion of a frequency bar of a radio receiver in accordance with the rotation of a frequency dial. Thus, in the present embodiment, it is possible to continuously change the time value (year, month, day, minute, second) by operating the rotatable operation control knob 23.

Note that tick marks along the time axis in the time information display area 241 are displayed only in a particular partial range of a full range in which time information is allowed to be specified by a user. When the time axis cursor 241 is at the top of the time information display area 241, if the rotatable operation control knob 23 is further rotated toward an earlier time, the tick marks displayed along the time axis in the time information display area 241 are scrolled such that earlier time values are indicated. On the other hand, when the time axis cursor 241 is at the bottom of the time information display area 241, if the rotatable operation control knob 23 is further rotated toward a present time, the tick marks displayed along the time axis in the time information display area 241 are scrolled such that later time values are indicated.

In the present embodiment, the rotatable operation control knob 23 includes a large knob 23a in the shape of a flat and circular plate and a small knob 23b in the shape of a cylinder with a proper height that allows a user to easily manipulate the small knob 23b. The large knob 23a and the small knob 23b are coaxially rotatable in one of two modes as described below.

A user manipulates the rotatable operation control knob 23 by holding the small knob 23b. The small knob 23b is slidable along the rotation axis thereof. When the small knob 23b is in a pulled-up position, the large knob 23a and the small knob 23b rotate as a unit about a first rotation axis. When the small knob 23b is in a pushed-down position, only the small knob 23b rotates about a second rotation axis. That is, if the small knob 23b is pushed down to the pushed-down position, the lock between the small knob 23b and the large knob 23a are released, while the small knob 23b and the large knob 23a are locked if the small knob 23b is pulled up to the pulled-up position.

When rotation is performed in the mode in which both the large knob 23a and the small knob 23b move as a unit, the time value changes coarsely in accordance with the rotation. In this mode, for example, the time value changes in units of years. In the mode in which only the small knob 23b rotates, a fine adjustment of the time value is allowed (for example, the time value can be specified in units of months, days, and hours).

Note that the configuration of the rotatable operation control knob 23 is not limited to that described above, but the rotatable operation control knob 23 may be configured differently. For example, the rotatable operation control knob 23 may include only one knob rotatable in a single mode.

In the time information display area 243 of the display screen 24, the time information (time value represented in the format of year: month: day: hour: minute) is displayed which corresponds to the time value at the time axis cursor 242 in the time information display area 241 set by the user by rotating the rotatable operation control knob 23.

In the time information attribute display area 244 of the display screen 24, text is displayed to indicate the attribute of the time information selected by the user. In the present embodiment, each time the time attribute selection button 25a is pressed, the attribute of the time information displayed in the time information attribute display area 244 is changed. Note that the attribute being currently displayed is selected as the attribute of the time information.

In the present embodiment, as described above, it is allowed to specify no particular attribute for the time information. In this case, content search is performed for all possible attributes of the time information specified by operating the rotatable operation control knob 23.

The operation control button 25a may be configured to be rotatable as well as pushable such that when the operation control button 25a is pushed down, a list of attributes of time information displayable in the time information attribute display area 244, that is, a list of selectable attributes of time information is displayed in the form a pull-down menu, and one of attributes can be selected from the list by rotating the operation control button 25a. After the selection, if the operation control button 25a is pushed down again, the selection of the attribute of the time information is applied.

In the genre display area 245 of the display screen 24, text information indicating the genre selected by the user is displayed. In the present embodiment, each time the genre selection button 25b is pressed, the genre displayed in the genre display area 245 is changed and selected.

In the present embodiment, as described above, it is allowed to specify no particular genre. In this case, content search is performed for all genres and for the time information specified by operating the rotatable operation control knob 23.

As with the selection of the attribute of the time information displayed in the time information attribute display area 244, the selection of the genre may be performed by selecting a genre from a list in the form of a pull-down menu.

In the search mode, when the search condition selection switch 27 is in the "public" position, the attribute information of the public time information is displayed in the attribute display area 244. When the search condition selection switch 27 is in the "private" position, the attribute information of the private time information is displayed in the attribute display area 244.

In the search mode, when the search condition selection switch 27 is in the "time difference" position, the attribute information of the public time information used in the calculation the time difference is first displayed in the attribute display area 244. If the attribute for the public time information is specified, the specified attribute information of the private time information is displayed in the attribute display area 244.

In the present embodiment, for example, the button 25d serving as the buy button in the content receiving mode functions as an apply button in the search mode.

When the "time difference" is selected as a search condition, the attribute information of the public time information displayed in the attribute display area 244 is changed each time the time information attribute selection button 25a is pressed. When a particular attribute for the public time information is displayed in the attribute display area 244, if the purchase button 25d (functioning as the apply button in this mode) is pressed, the selected attribute information for the public time information is applied.

At this stage, the attribute information displayed in the attribute display area 244 is switched for the private time information. In this state, the attribute information of the private time information displayed in the attribute display area 244 is changed each time the time information attribute selection button 25a is pressed. When a particular attribute for the private time information is displayed in the attribute display area 244, if the purchase button 25d (functioning as the apply button in this mode) is pressed, the selected attribute information for the private time information is applied.

When the "time difference" is selected as a search condition, the time axis in the time information display area 241 is deleted and a value indicating the time difference is displayed, although not shown in the figure. The value of the time difference changes in response to the rotation of the rotatable operation control knob 23a. When the small knob 23b of the rotatable operation control knob 23 is in the pushed-down position, the range smaller than the specified time difference is specified as a search condition. On the other hand, when the small knob 23b of the rotatable operation control knob 23 is in the pulled-up position, the range greater than the specified time difference is specified as a search condition.

Now, an example of a hardware configuration of the music content receiving terminal 20 according to an embodiment of the present invention is described below with reference to FIG. 6.

Figure 6:
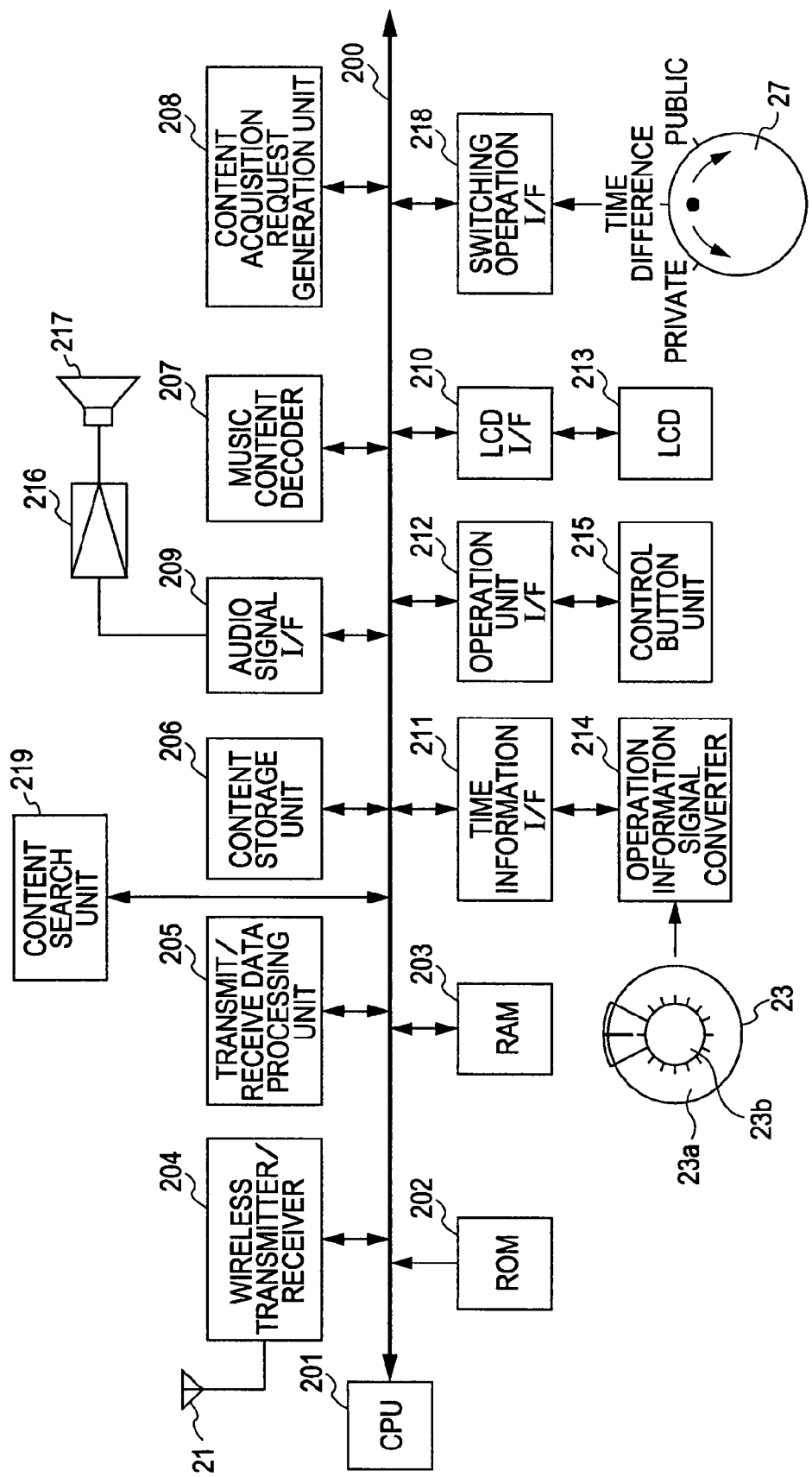
FIG. 6 is a block diagram showing an example of a hardware configuration of a content receiving terminal configured so as to function as a music content receiving terminal according to an embodiment of the present invention.

As shown in FIG. 6, the music content receiving terminal 20 includes a CPU 201 and other units connected to the CPU 201 via a system bus 200. The units connected to the CPU 201 include a program ROM 202, a work area RAM 203, a wireless transmitting/receiving unit 204, a transmit/receive data processing unit 205, a content storage unit 206, a music content data decoder 207, a content acquisition request generation unit 208, an audio signal interface 209, an LCD interface 210, a time information interface 211, an operation unit interface 212, a switching operation interface 218, and a content search unit 219.

The LCD interface 210 is connected to an LCD 213 having a display screen 24. The content storage unit 206 is realized, for example, using a hard disk drive so as to be capable of storing a large amount of content data and associated data.

The operation unit interface 212 is connected to an operation control button unit 215 including a time attribute selection button 25a, a genre selection button 25b, and other operation control buttons 25c, 25d, and 25e. Information indicating an operation of the time attribute selection button 25a or the genre selection button 25b performed by a user is supplied to the system bus 200 via the operation unit interface 212.

If the CPU 201 receives the operation information associated with the time attribute selection button 25a or the genre selection button 25b via the system bus 200, the CPU 201 analyzes the received information in accordance with a program stored in the ROM 202 to detect the attribute assigned to the time information (no attribute may be assigned) and the genre (no genre may be specified). The detected attribute information of the time information and the genre information are transferred to the content acquisition request generation unit 208, for use in generation of information to be added to associated information of time information included in a content acquisition request.

The time information interface 211 is connected to an operation information signal converter 214. If the operation information signal converter 214 receives the operation information signal output in response to the rotation or pushing of the large knob 23a or the small knob 23b of the rotatable operation control knob 23, the operation information signal converter 214 converts the received operation information signal into time information indicating a time value on the time axis. The resultant time information output from the operation information signal converter 214 is supplied to the system bus 200 via the time information interface 211. Under the control of the CPU 201, the time information supplied to the system bus 200 is transferred to the content acquisition request generation unit 208, for use in generation of information to be included in the content acquisition request.

The switching operation interface 218 detects the position of the search condition selection switch 27 and transmits information indicating the detection position to the CPU 201 via the system bus 200 to notify the CPU 201 of the search condition in the search mode.

In the content receiving mode, under the control of the CPU 201, the content acquisition request generation unit 208 produces a content acquisition request including associated information including the time information, the attribute information of the time information, and the genre information received via the time information interface 211 and the operation unit interface 212, and the content acquisition request generation unit 208 supplies the produced content acquisition request to the transmit/receive data processing unit 205.

In the content receiving mode, the transmit/receive data processing unit 205 reads the communication network address of the content providing server 10 from the ROM 202, converts the data to be transmitted to the content providing server 10 into a signal form adapted to wireless transmission, and transmits the resultant to-be-transmitted data to the wireless transmitting/receiving unit 204.

In the content receiving mode, if the wireless transmitting/receiving unit 204 receives the to-be-transmitted data from the transmit/receive data processing unit 205, the wireless transmitting/receiving unit 204 transmits the data from the antenna 21. On the other hand, if the wireless transmitting/receiving unit 204 receives data via the antenna 21, the wireless transmitting/receiving unit 204 transfers the received data to the transmit/receive data processing unit 205.

In the content receiving mode, the transmit/receive data processing unit 205 converts the received data supplied from the wireless transmitting/receiving unit 204 into data in a form processable by the music content receiving terminal 20 and transmits the resultant data over the system bus 200. The CPU 201 analyzes this received data and transfers the music content data to the music content data decoder 207 or the content storage unit 206.

The music content data decoder 207 decodes the input music content data into a digital audio signal and supplies the resultant digital audio signal to the audio signal interface 209.

The audio signal interface 209 converts the digital audio signal into an analog audio signal and supplies the resultant analog audio signal to the speaker 217 via the audio amplifier 216. The speaker 217 emits an acoustic sound in accordance with the supplied audio signal.

The content storage unit 206 stores the received music content data and associated data such that they are related to each other via a music content ID.

In the content search mode, the content search unit 219 searches for contents from those stored in the content storage unit 206 in accordance with the specified search condition. The content search unit 219 may be implemented by software executed by the CPU 201 in accordance with a program stored in the ROM 202. Similarly, the music content data decoder 207 and the content acquisition request generation unit 208 may also be implemented by software.

In the present embodiment, the content acquisition request includes information indicating music content data decoding functions available in the music content data decoder 207 of the music content receiving terminal 20 so that, in accordance with this information, the content providing server 10 can provide a music content in a format that can be decoded by the music content data decoder 207.

Hardware Configuration of AV Content Receiving Terminal

Figure 7:
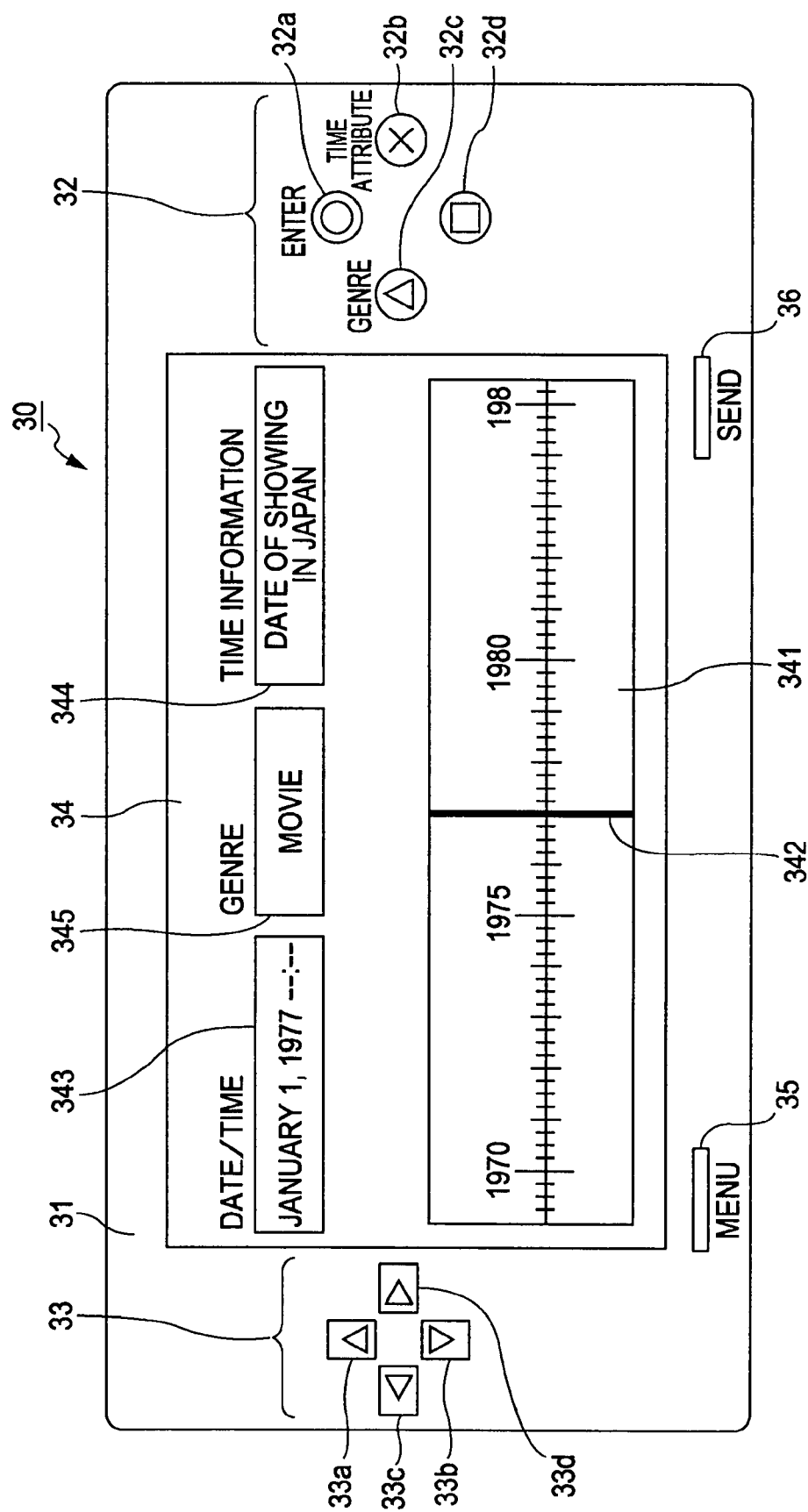
FIG. 7 is a diagram showing an example of an operation control panel of a content receiving terminal configured so as to function as an AV content receiving terminal according to an embodiment of the present invention.

FIG. 7 shows an example of an external appearance of the AV content receiving terminal 30 according to an embodiment of the present invention. In FIG. 7, an operation control panel of a case 31 of the AV content receiving terminal 30 viewed from front is shown.

In the present embodiment, as described above, the AV content receiving terminal 30 is configured such that it also functions as a game machine, and has a transmitting/receiving antenna for connection with a wireless network.

In the present embodiment, on the operation control panel of the case 31 of the AV content receiving terminal 30, operation control button units 32 and 33 serving as a game operation controller and a display screen 34 such as a LCD are disposed. A menu button 35 and a send button 36 are also disposed on the operation control panel of the case 31.

The operation control button unit 32 includes game operation control buttons 32a, 32b, 32c, and 32d. In the present embodiment, these operation control buttons 32a, 32b, 32c, and 32d also function as operation buttons used in generation of an AV content acquisition request or in search for AV contents. More specifically, in the present embodiment, the operation control button 32a also function as an enter button (apply button), the operation control button 32b as a button for specifying an attribute of time information, the operation control button 32c as a genre selection button, and the operation control button 32d as a mode switching button for switching the operation mode between the content receiving mode in which AV contents are received from the content providing server 10 and the content search mode in which contents are searched for from the content storage unit of the AV content receiving terminal 30.

The operation control button unit 33 includes up, down, left, and right arrow buttons 33a, 33b, 33c, and 33d. These buttons 33a, 33b, 33c, and 33d function as up, down, left, and right arrow buttons regardless of whether the AV content receiving terminal 30 is used as a game machine or used to issue an AV content acquisition request. In particular, the left and right arrow buttons 33c and 33d are used in setting of time information.

In the content search mode, as with the music content receiving terminal 20 described above, the AV content receiving terminal 30 according to the present embodiment is also capable of selecting a mode in which "public" time information is used as a search condition, a mode in which "private" time information is used as a search condition, and a mode in which "time difference" between public time information and private time information is used as a search condition. The selection of the mode is accomplished by operating the menu button 35 to display a search condition menu and by operating the operation control button units 32 and 33.

In the mode in which "time difference" is used as a search condition, the specifying of the public time information and the specifying of the attribute of the private time information are accomplished by operating the menu button 35 to display a menu and by operating the operation control button units 32 and 33.

In the present embodiment, when the operation is in the content receiving mode or when "public" time information or "private" time information is used as search condition in the content search mode, a time information display area 341, a time axis cursor 342, a time information display area 343, a time information attribute display area 344, and an AV content genre display area 345 are displayed on the display screen 34 of the AV content receiving terminal 30.

In the time information display area 341, tick marks indicating time values are displayed along a time axis in a horizontal direction as shown in FIG. 7. In the example shown in FIG. 7, long tick marks with numeric labels indicating years are formed every five years, middle-long tick marks are formed every year, and short tick marks are formed every three months.

The time axis cursor 342 is displayed in the form of a vertical bar, and its position moves within the time information display area 341 along the time axis (to the left or right) in response to the operation of the left or right arrow buttons 33c or 33d performed by a user. In the present embodiment, the position of the time axis cursor 342 is controlled by software such that the position of the time axis cursor 342 is moved to the left or right in accordance with the operation of the left or right arrow button 33c or 33d.

More specifically, the time axis cursor 342 moves continuously in accordance with the rotation of the rotatable operation control knob 23 in a similar manner to continuous motion of a frequency bar of a radio receiver in accordance with the rotation of a frequency dial. Thus, in the present embodiment, it is possible to continuously change the time value (year, month, day, minute, second) by operating the left or right arrow button 33c or 33d.

Note that tick marks along the time axis in the time information display area 341 are displayed only in a particular partial range of a full range in which time information is allowed to be specified by a user. When the time axis cursor 341 is at the left-hand end of the time information display area 341, if the left arrow button 33c is pressed to change the time value toward a further earlier time, the tick marks displayed along the time axis in the time information display area 341 are scrolled such that earlier time values are indicated. On the other hand, when the time axis cursor 341 is at the right-hand end of the time information display area 341, if the right arrow button 33d is pressed to change the time value toward a further later time, the tick marks displayed along the time axis in the time information display area 341 are scrolled such that later time values are indicated.

In the time information display area 343 of the display screen 34, the time information (time value represented in the format of year: month: day: hour) is displayed which corresponds to the time value at the time axis cursor 342 in the time information display area 341 set by the user by operating the left or right arrow button 33c or 33d.

In the time information attribute display area 344 of the display screen 34, text information is displayed to indicate the attribute of the time information selected by the user. In the present embodiment, each time the operation control button 32b is pressed, the attribute of the time information displayed in the time information attribute display area 344 is changed. Note that the attribute being currently displayed is selected as the attribute of the time information.

In the present embodiment, as described above, it is allowed to specify no particular attribute for the time information. In this case, content search is performed for all possible attributes of the time information specified by operating the left or right arrow button 33c or 33d.

The attribute for time information may be specified in the following manner. When the operation control button 32b is pressed, a list of attributes of time information displayable in the time information attribute display area 344, that is, a list of selectable attributes of time information is displayed in the form a pull-down menu in which selectable attributes are listed in the vertical direction. After one of attributes is selected from the list by pressing the up or down arrow button 33a or 33b, if the enter button 32a is pressed, the selection of the attribute of the time information is applied.

In the genre display area 345 of the display screen 34, text information indicating the genre selected by the user is displayed. In the present embodiment, each time the operation control button 32c is pressed, the genre displayed in the genre display area 345 is changed and selected.

In the present embodiment, as described above, it is allowed to specify no particular genre. In this case, content search is performed for all genres and for the time information specified by operating the left or right arrow button 33c or 33d.

As with the selection of the attribute of the time information displayed in the time information attribute display area 344, the selection of the genre may be performed by selecting a genre from a list in the form of a pull-down menu.

When the menu button 35 is pressed, a menu of operation modes such as a game mode, an AV content acquisition request mode, etc. available on the AV content receiving terminal 30 is displayed on the display screen 34. In a state in which the list of function modes is being displayed after the menu button 35 was pressed, a user can select a desired function mode of the AV content receiving terminal 30 by pressing the up, down, left, or right arrow button 33a-33d and then pressing the operation control button 32a serving as the enter button.

The send button 36 is used by a user in the content receiving mode to transmit a content acquisition request, a content purchase request, or other command to the content providing server.

Now, an example of a hardware configuration of the AV content receiving terminal 30 according to an embodiment of the present invention is described below.

Figure 8:
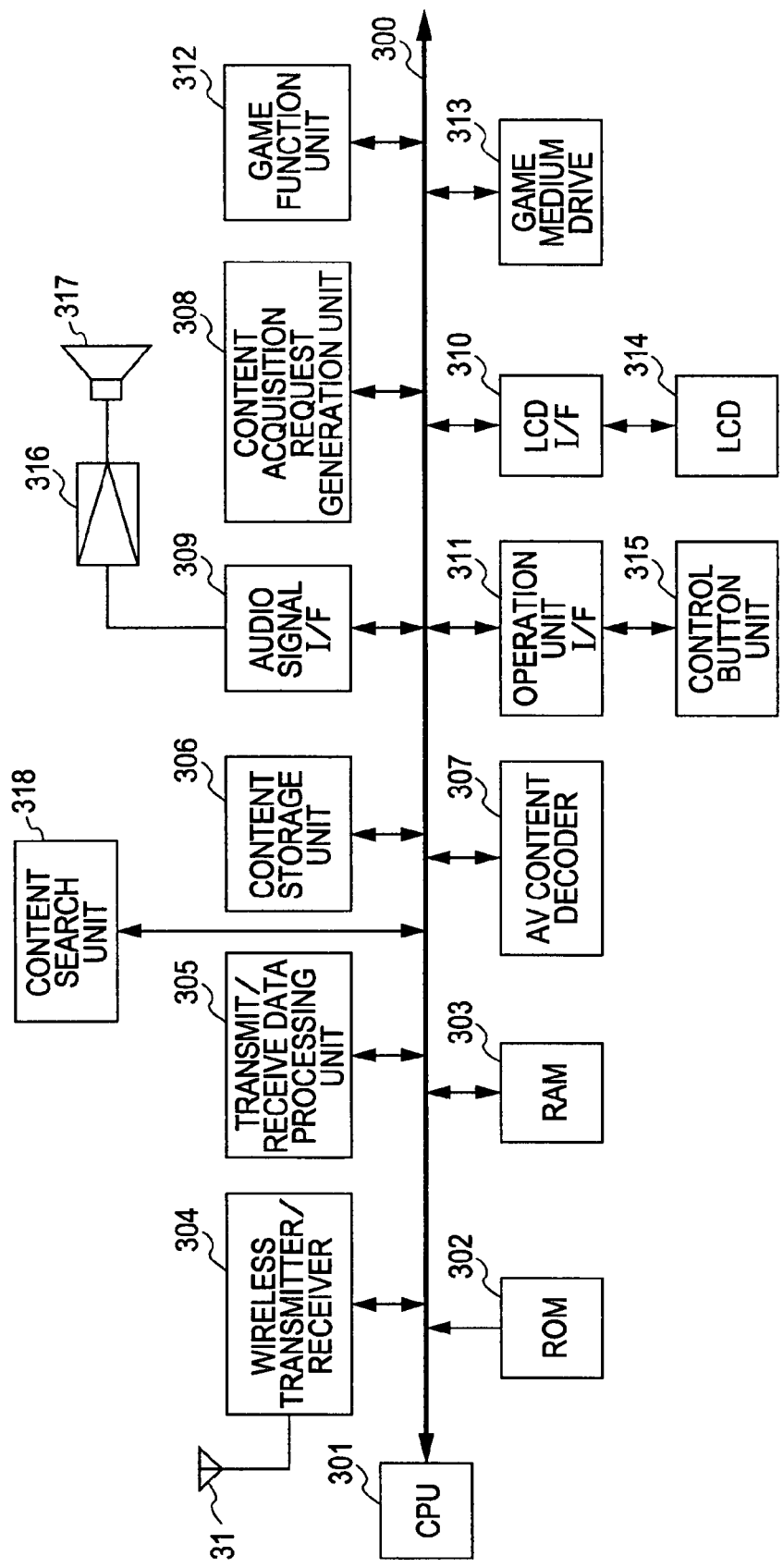
FIG. 8 is a block diagram showing an example of a hardware configuration of a content receiving terminal configured so as to function as an AV content receiving terminal according to an embodiment of the present invention.

As shown in FIG. 8, the AV content receiving terminal 30 includes a CPU 301 and other units connected to the CPU 301 via a system bus 300. The units connected to the CPU 301 include a program ROM 302, a work area RAM 303, a wireless transmitting/receiving unit 304, a transmit/receive data processing unit 305, a content storage unit 306, an AV content data decoder 307, a content acquisition request generation unit 308 an audio signal interface 309, an LCD interface 310, an operation unit interface 311, a game unit 312, a game medium drive 313, and a content search unit 318.

The LCD interface 310 is connected to an LCD 314 having a display screen 34. The operation unit interface 311 is connected to an operation control button unit 315 including operation control buttons 32a to 32d, up, down, left, and right arrow buttons 33a to 33d, a menu button 35, and a send button 36. Under the control of the CPU 301, the operation unit interface 311 detects which button of the operation control button unit 315 (the operation control buttons 32a to 32d, up, down, left, and right arrow buttons 33a to 33d, the menu button 35, or the send button 36) has been operated by a user, and supplies operation is information indicating the operated button to the system bus 300.

The CPU 301 analyzes the operation information associated with the operation control button unit 315 supplied to the system bus 300 in accordance with a program stored in the ROM 302, and performs a process corresponding to the detected operation depending on the function mode.

For example, in the content acquisition mode, if the left or right arrow button 33a or 33b is operated, the CPU 301 determines that a command to set the time information has been issued, and the CPU 301 changes the position of the time axis cursor 342 on the time axis in the time axis display area 341 in accordance with the operation of the left or right arrow button 33a or 33b, and displays the time value on the time axis in the time information display area 343 of the display screen 34. The CPU then supplies the time information indicating the specified time value to the content acquisition request generation unit 308 for use in generation of information to be included in the content acquisition request.

Similarly, the CPU 301 changes information displayed in the time information attribute display area 344 or in the genre display area 345 in accordance with the operation of the operation control button 32b or 32c, and supplies the attribute information (no particular attribute may be specified) of the time information or the genre information (no particular genre may be specified) to the content acquisition request generation unit 308 for use in generation of associated information to be included in the content acquisition request.

In the content receiving mode, under the control of the CPU 301, the content acquisition request generation unit 308 produces a content acquisition request including associated information specifying the search condition, including the time information, the attribute information of the time information, and the genre information, and the content acquisition request generation unit 308 supplies the produced content acquisition request to the transmit/receive data processing unit 305.

In the content receiving mode, the transmit/receive data processing unit 305 reads the communication network address of the content providing server 10 from the ROM 302, converts the data to be transmitted to the content providing server 10 into a signal form adapted to wireless transmission, and transmits the resultant to-be-transmitted data to the wireless transmitting/receiving unit 304.

If the wireless transmitting/receiving unit 304 receives the to-be-transmitted data from the transmit/receive data processing unit 305, the wireless transmitting/receiving unit 304 transmits the data from the antenna 31. On the other hand, if the wireless transmitting/receiving unit 304 receives data via the antenna 31, the wireless transmitting/receiving unit 304 transfers the received data to the transmit/receive data processing unit 305.

The transmit/receive data processing unit 305 converts the received data supplied from the wireless transmitting/receiving unit 304 into data in a form processable by the AV content receiving terminal 30, and transmits the resultant data over the system bus 300. The CPU 301 analyzes this received data and transfers the AV content data to the AV content data decoder 307 or the content storage unit 306.

The AV content data decoder 307 decodes the input AV content data into a digital video data and supplies the resultant digital video data to the LCD via the LCD interface 310, which displays an image in accordance with the supplied digital video data. The digital audio signal obtained as a result of the decoding performed by the AV content data decoder 307 is supplied to the audio signal interface 309.

The audio signal interface 309 converts the digital audio signal into an analog audio signal and supplies the resultant analog audio signal to the speaker 317 via the audio amplifier 316. The speaker 317 emits an acoustic sound in accordance with the supplied audio signal.

The content storage unit 306 stores the received AV content data and associated data such that they are related to each other via a content ID.

In the content search mode, the content search unit 318 searches for contents from those stored in the content storage unit 306 in accordance with the specified search condition. The content search unit 318 may be implemented by software executed by the CPU 301 in accordance with a program stored in the ROM 302. The AV content data decoder 307 and the content acquisition request generation unit 308 may also be implemented by software.

In the present embodiment, the content acquisition request includes information indicating AV content data decoding functions available in the AV content data decoder 307 of the AV content receiving terminal 30 so that, in accordance with this information, the content providing server 10 can provide an AV content in a format that can be decoded by the AV content data decoder 307.

The game unit 312 displays a game screen on the display screen 34 of the LCD 314 in accordance with a game program and game data read from a game medium such as a CD-ROM or DVD mounted on the game medium drive 313. The game unit 312 changes the image displayed in the game screen in accordance with the operation performed on the operation button 32 or 33 of the operation control button unit 315.

Hardware Configuration of General-Purpose Content Receiving Terminal

In the present embodiment, as described above, the general-purpose content receiving terminal 40 is realized by a personal computer having one of well-known hardware configurations although not shown in the figure. The personal computer serving as the general-purpose content receiving terminal 40 is capable of accessing the content providing server 10 via the Internet 52.

In the present embodiment, the general-purpose content receiving terminal 40 includes a content storage unit realized, for example, by a hard disk drive. A software program is stored in a ROM disposed in the general-purpose content receiving terminal 40 to realize functions of a music content receiving terminal and/or an AV content receiving terminal similar to the functions of the music content receiving terminal 20 and/or the AV content receiving terminal 30 described above. A software program for achieving a capability of issuing a content acquisition request for a content such as an e-book content and a software program for achieving a capability of searching contents stored in the content storage unit are also stored in the ROM.

On the display screen of the general-purpose content receiving terminal 40, an operation screen similar to the operation screen of the AV content receiving terminal 30 is displayed when a content acquisition request is issued or when searching for contents is performed. It is allowed to set time information by using up, down, left, and right arrow keys disposed on a keyboard of the personal computer. It is also allowed to select an attribute of time information or a genre by using a particular key.

The operation to issue a content acquisition request to acquire a content such as an e-book content, the operation of the content server performed in response to the content acquisition request, the operation of acquire a content when the personal computer functions as a content receiving terminal, and the operation of searching for contents are similar to those described above. Note that the operations may be modified depending on a feature of a content.

In the general-purpose content receiving terminal 40, a user is expected to select a type of a content to be acquired or searched for. Note that "don't care" can be selected as a content type (no specific content type is specified). In this case, the content request or the content searching is performed for all possible content types.

For the above purpose, the general-purpose content receiving terminal 40 has an operation control function that allows a user to select a content type and a function to display the selected content type on the display screen.

Content Providing Modes

As described above, the content providing server 10 operates in one of different content providing modes depending on whether music contents or movie contents are transmitted. Some specific examples of content providing modes of the content providing server 10 are described below.

First Content Providing Mode

Figure 9:
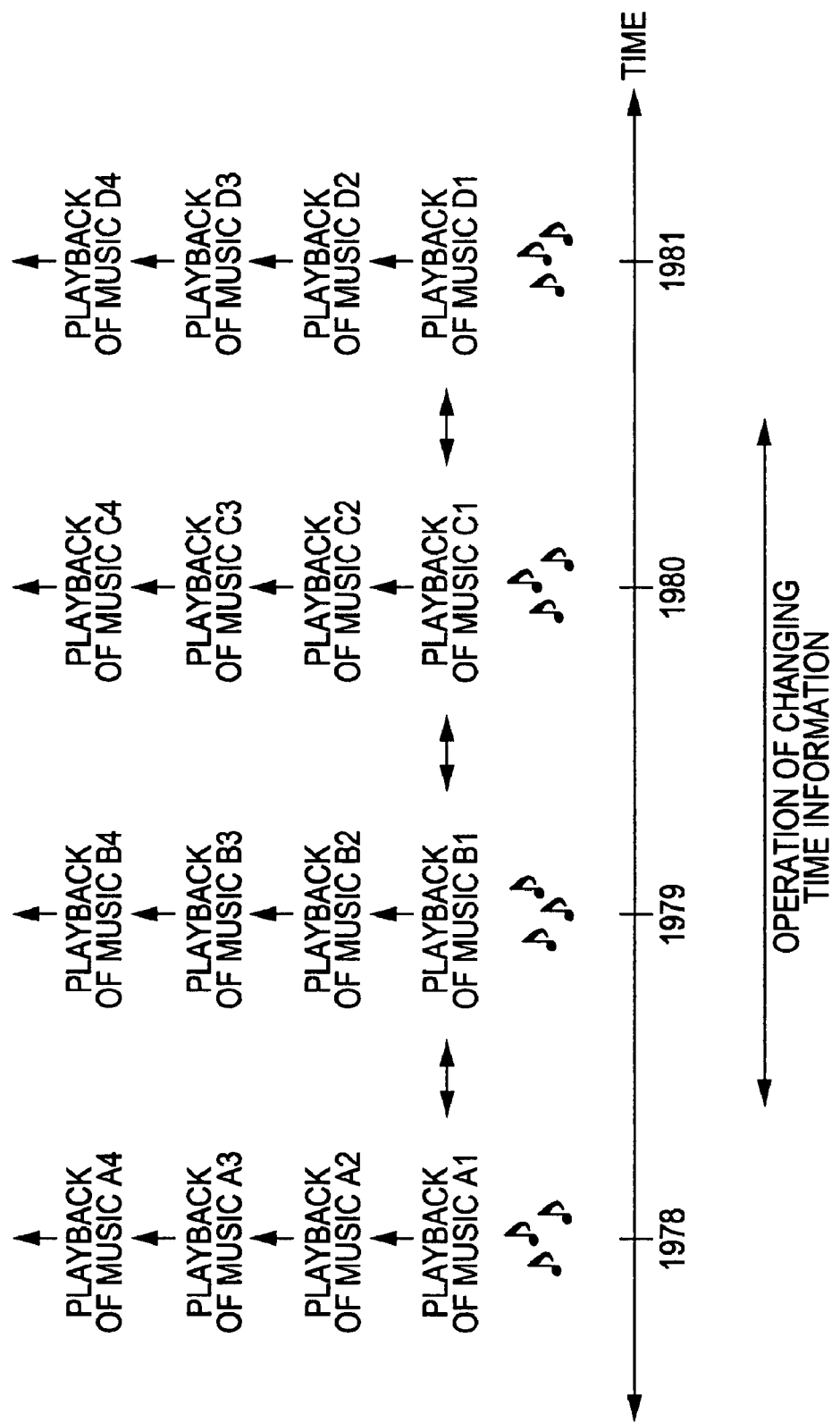
FIG. 9 shows an example of a mode in which contents are provided in a content providing system, according to an embodiment of the present invention.

A first content providing mode is used when contents are provided to the music content receiving terminal 20. Referring to FIG. 9, the first content providing mode is described below.

In the present embodiment, as described above, a user is allowed to continuously change the time information along the time axis by operating the rotatable operation control knob 23. If information indicating the time value on the time axis is transmitted to the content providing server always during the operation performed by the user to change the time information in a similar manner to the operation of rotating a selection dial of a radio receiver to change the receiving frequency, then information indicating a time value which is not finally selected by the user and thus which is meaningless is also transmitted to the content providing server.

In this content providing mode, to avoid the above problem, only when it is determined that a user wants to acquire a content, the content receiving terminal sends a content acquisition request to the content providing server 10.

In this mode, to determine whether a user wants to acquire a content, the status of the operation of the rotatable operation control knob 23 to input time information is monitored. When the rotatable operation control knob 23 is being performed by the user to input time information, if it is detected that the operation has been stopped for a period of time longer than a predetermined value, then it is determined that the user has specified a time value for a content to be provided, and a content acquisition request is sent together with the time information to the content providing server 10. In addition to the unit for inputting time information, a unit for issuing a content acquisition request (such as a send button) may be provided. However, the above-described configuration including no send button is simpler and more convenient for users.

In the case where the rotatable operation control knob 23 is used to specify the time value, as described above, the time value can be coarsely specified (for example, the year can be specified) in the mode in which the large knob 23a and the small knob 23b rotates as a unit. In this case, contents are provided in a manner as shown in FIG. 9.

For example, when it is determined that 1978 is specified as the time value and a content acquisition request is sent to the content providing server 10, the content providing server 10 determines that the year 1978 is specified as the time value, sets the search condition based on the time value and other associated information included in the content acquisition request, searches the content database in accordance with the search condition, and sequentially transmits music contents A1, A2, A3, A4, . . . detected in the search to the music content receiving terminal 20.

In this case, in the first content providing mode, the music content receiving terminal 20 receives the music contents sequentially transmitted in the form of streaming data from the content providing server 10 and plays them back. More specifically, the content providing server 10 first transmits a music content A1. After all data of the music content data A1 has been transmitted to the music content receiving terminal 20, data of a next music content A2 is transmitted. Thus, in the music content receiving terminal 20, the first music content A1 is first played back, and then, after completion of playback of all first music content A1, the next music content A2 is played back from the beginning thereof. Thus, music contents of the specified year are received and played back in a similar manner to receiving of radio broadcasting.

Note that in FIG. 9, music contents A1, A2, A3, A4, . . . obtained as a result of the search and transmitted sequentially in the form of streaming data are not fixed, but they may be dynamically changed by the content providing server 10 each time a content acquisition request is received. This also applies to music contents B1, B2, B3, B4, . . . , C1, C2, C3, C4, . . . , D1, D2, D3, D4, . . . of other years.

During the playback on the music content receiving terminal 20, if a user does not perform any operation, the full music contents A1, A2, A3, . . . are sequentially played back from one content to another.

However, when a certain music content, for example, the music content A1, is being played back, if the user does not like this music content A1 and presses the next-content button 25*e*, then, in response to the pressing of the next-content button 25*e*, a next-content acquisition request is transmitted from the music content receiving terminal 20 to the content providing server 10. If the content providing server 10 receives the next-content acquisition request, the content providing server 10 stops the transmission of the current music content A1 and immediately starts transmission of the next music content A2.

As described above, when the user does not like a content currently being played back, if the user presses the next-content button 25*e*, then the playback of the current content is stopped, and playback of a next content is started. This allows the user to select contents the user likes and listen to only those selected contents.

When one of contents of the year 1978, for example, the content A1 is being played back on the content receiving terminal 20, if the user changes the time value, for example, to year 1979 by operating the rotatable operation control knob 23, then a content acquisition request including time information specifying the year 1979 is transmitted to the content providing server 10. In response, the content providing server 10 stops the transmission of the current music content (the music content A1 in this case) and starts transmission of a music content B1, which is one of music contents detected as a result of the search for music contents of the year 1979.

Thus, in the music content receiving terminal 20, in response to the operation of the rotatable operation control knob 23, the streaming playback is changed from the music content A1 to the music content B1. That is, as described above, if the user repeatedly performs the operation of stopping the rotation of the rotatable operation control knob 23 at a particular time value, for a period longer than the predetermined value, then starting parts of music contents are sequentially played back from a certain specified year to a next specified year.

In the example described above, it is assumed that a year is specified as the time information. Note that the time information is not limited to years, but a particular month, day, hour may be specified in addition to a particular year by operating the small knob 23*b* of the rotatable operation control knob 23. That is, the time information can be specified in a more precise manner than in the above-described example, and contents satisfying the specified time condition can be obtained. Also in this case, when a plurality of contents are found in the search, they are played back in a similar manner to the above-described example.

In the example described above, it is assumed that contents are music contents. However, in the first content providing mode, contents are not limited to music contents, but other types of contents such as AV contents or e-book contents may be provided in a similar manner.

Second Content Providing Mode

In a second content providing mode described below, unlike the first content providing mode described above, when a content acquisition request is issued, preliminary transmission of a requested content is first performed and then a full-content transmission is performed if required.

In the preliminary transmission, the content providing server transmits a predetermined part of each content together with identification information identifying each content to a user rather than transmits all data of each content as in the first content providing mode.

For example, in FIG. 9, a part of each of music contents A1, A2, A3, A4, . . . is sequentially transmitted. It is desirable that an introductory part, a climax part, or other attractive part be employed as the part of each content. Thus, playback of each of music contents A1, A2, A3, A4, . . . is completed in a rather short time, and playback of a particular part of a next music content is started.

In the second content providing mode, a content receiving terminal operates such that when a preliminary transmission is being performed, if a user issues a full-content request, the content receiving terminal transmits the full-content request for the current content to the content providing server 10. That is, the user listens to a part of each content provided in the preliminary transmission. If the user decides to listen to the full content thereof, the user issues a request for the full content thereof.

Thus, in the second content providing mode, to achieve the above-described function, the content receiving terminal includes an input unit such as a full-content request button (which may be in the form of a software button) configured such that if this button is operated when a preliminary transmission of a particular content is being performed, it is determined that providing of a full content of this particular content has been requested, and a full-content request is issued.

Thus, in the second content providing mode, if the content receiving terminal determines that the full-content request button is operated when a preliminary transmission is being performed, the content receiving terminal produces full-content request information including identification information identifying a content which was being received at the point of time when the full-content request button was operated, and the content receiving terminal transmits the full-content request information to the content providing server.

If the content providing server 10 receives the full-content request information from the content receiving terminal when a preliminary transmission is being performed, the content providing server 10 stops the preliminary transmission and transmits full content data of the content identified by the content identification information included in the full-content request information to the content providing terminal which has issued the full-content request.

Also in the second content providing mode, as in the first content providing mode, the content receiving terminal may include a next-content button. In this case, if the next-content button is operated and a next-content request is transmitted from the content receiving terminal to the content providing server, then the content providing server transmits a particular part of a next content as a preliminary transmission even if the transmission of the present content is not completed.

In the second content providing mode, in the case where the content receiving terminal has a display screen, when a preliminary transmission of a content is performed, image information associated with this content may be transmitted so that a user can refer to the image information when the user decides whether to issue a full-content request. For example, in the case of music contents, an image of a record jacket or a CD jacket of each content is transmitted from the content providing server 10 to the content receiving terminal. In the content receiving terminal, the jacket image is displayed on the display screen such that the jacket image is scrolled in synchronization with the progress of playback of the preliminarily transmitted content. For example, in FIG. 5, in the time information display area 241 of the LCD display screen 24 of the music content receiving terminal 20, the jacket image is displayed while being scrolled in instead of the time information display area 241. If a full-content request is issued, the scrolling jacket image is deleted, and the original time information display area 241 is displayed again.

Also in the second content providing mode, contents are not limited to music contents, but other types of contents such as AV contents, electronic book contents, etc. may be provided in a similar manner. In the case of AV contents, a set of attractive scenes may be extracted from each AV content and provided in the preliminary transmission. In the case of electronic book contents, first one or two pages of each content may be provided in the preliminary transmission.

In the case of AV contents, image information provided as auxiliary information corresponding to record jackets or CD jackets in the case of music contents may be tape cassette jackets DVD jackets, or thumbnail images of particular scenes. In the case electronic book contents, images of cover pages of paper book versions may be used.

In the preliminary transmission in the second content providing mode, a predetermined part of each content may be played back not at a normal speed but at an increased speed such as a speed multiplied by a factor of 1.2, 1.5, or 2.0.

Third Content Providing Mode

In also a third content providing mode described below, preliminary transmission is first performed and then a full-content transmission is performed if required. In this third content providing mode, it is assumed that contents of a type other than music contents, such as AV contents, are provided from the content providing server 10 in a manner described in detail below.

In the preliminary transmission in the third content providing mode, the content providing server 10 searches the content database 11 in accordance with a content acquisition request received from the content receiving terminal 30 or 40, produces a list of one or more contents found in the content database 11 as a result of the search, and transmits the list to the content receiving terminal 30 or 40.

Figure 10:
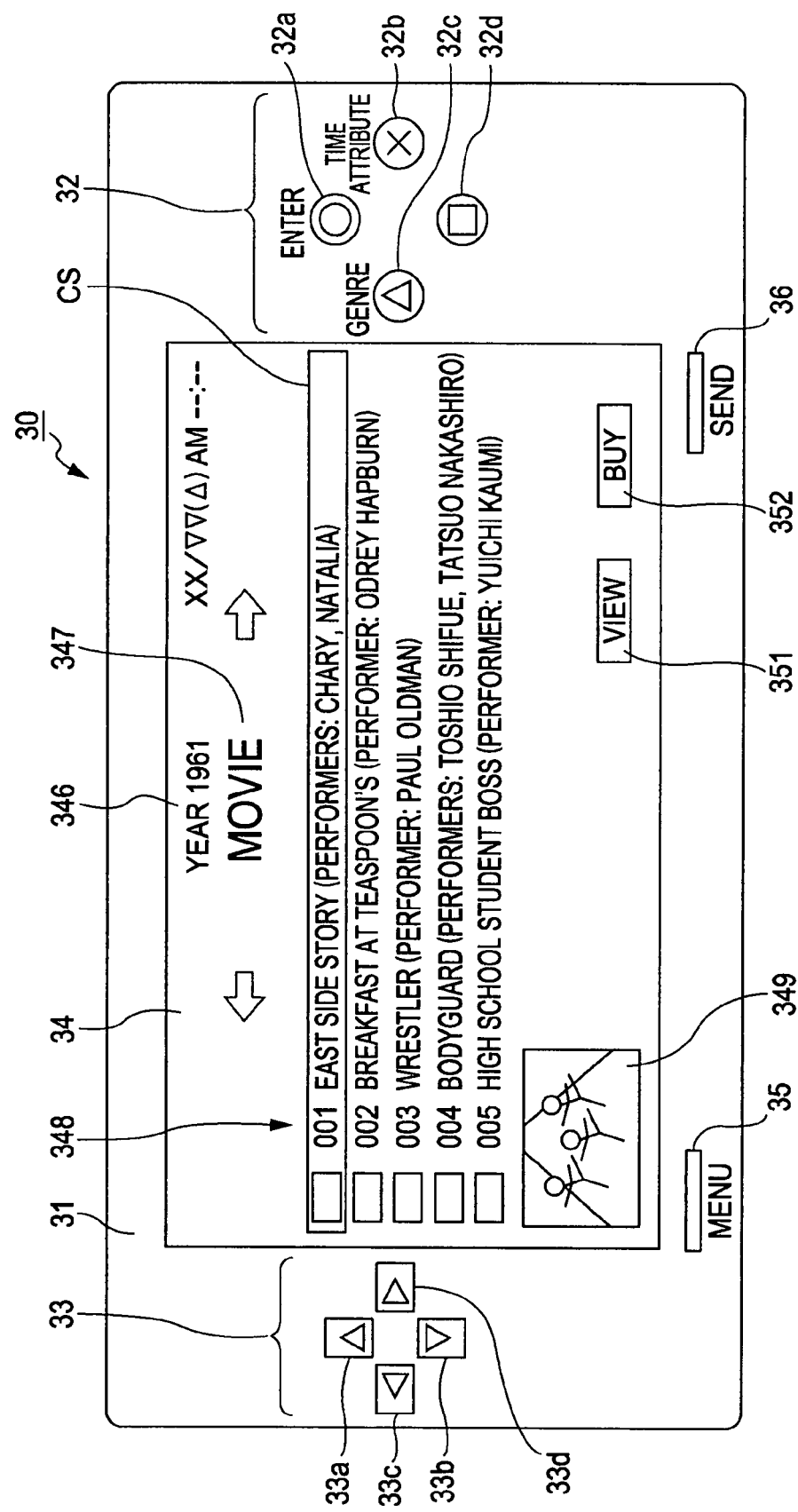
FIG. 10 shows an example of a content receiving terminal adapted to receive contents in a mode in which contents are provided in a content providing system, according to an embodiment of the present invention.
Figure 11:
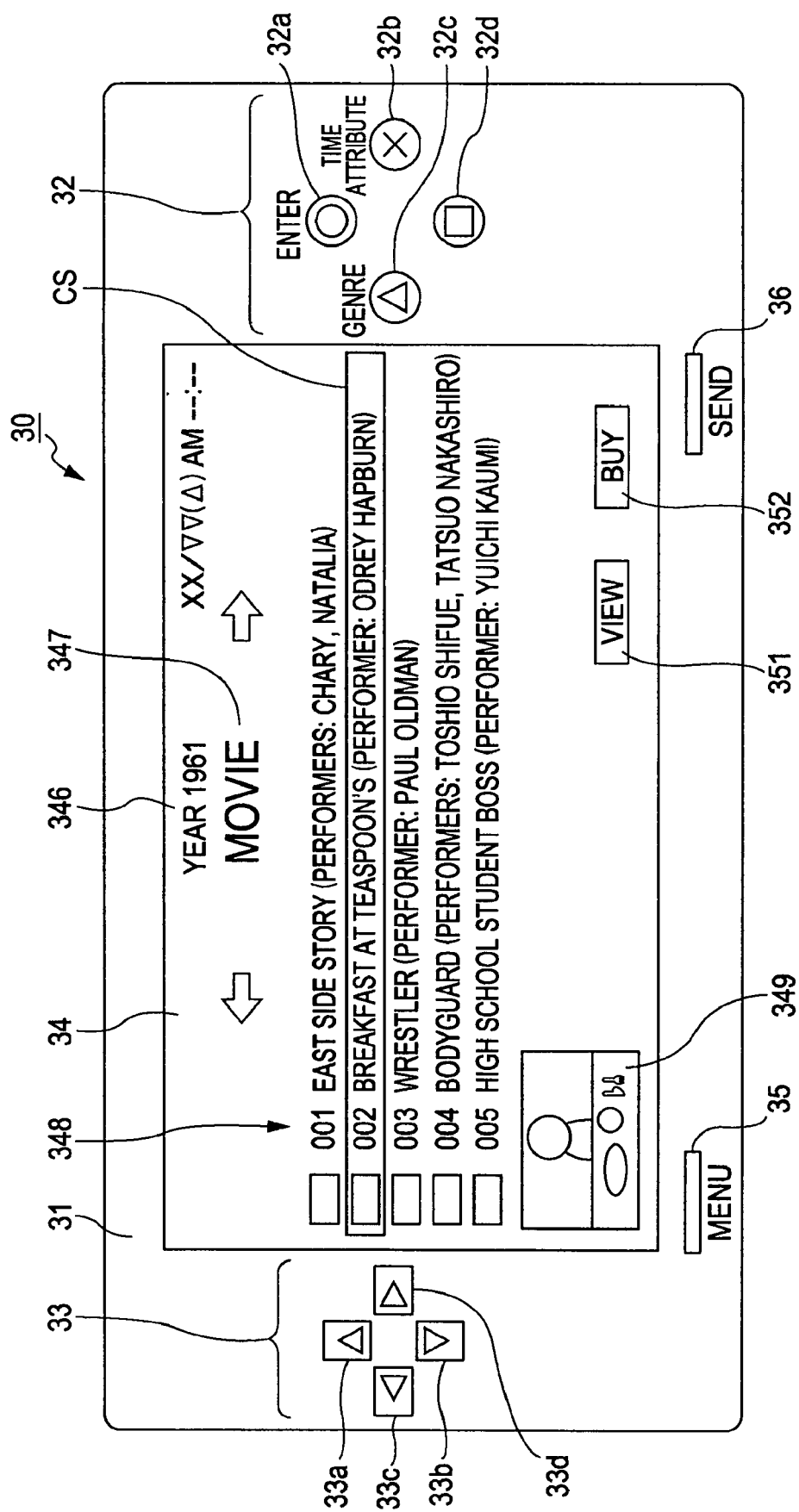
FIG. 11 shows an example of a mode in which contents are provided in a content providing system, according to an embodiment of the present invention.
Figure 12:
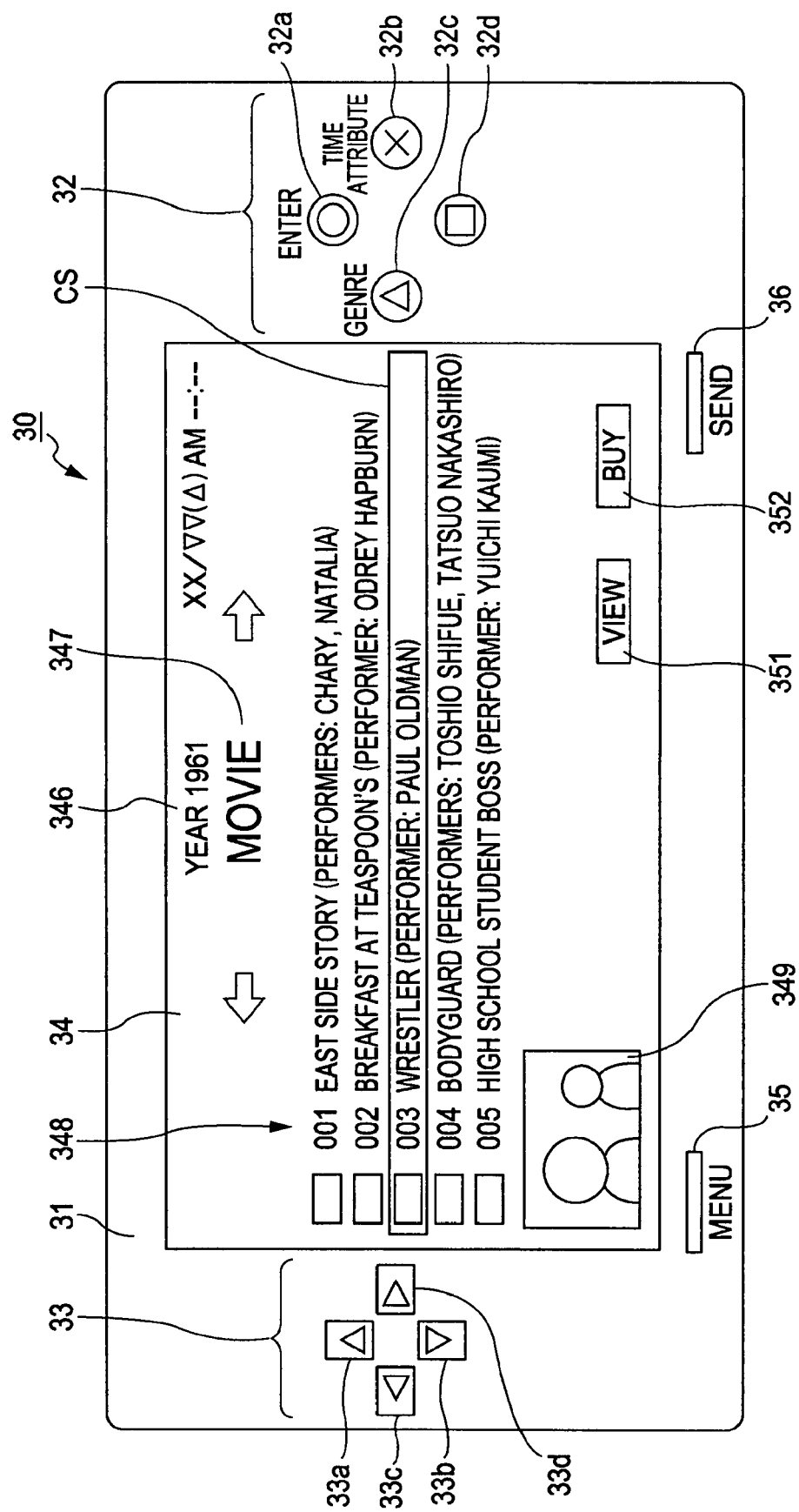
FIG. 12 shows an example of a mode in which contents are provided in a content providing system, according to an embodiment of the present invention.

If the content receiving terminal 30 or 40 receives the list of contents provided in the preliminary transmission from the content providing server 10, the content receiving terminal 30 or 40 displays the list of contents on the display screen so that a user is allowed to select a content from the list. FIGS. 10 to 12 show examples of manners in which a list of contents provided in the preliminary transmission is displayed on the display screen 34.

In the examples shown in FIGS. 10 to 12, it is assumed that a content acquisition request in which "1961" is specified by time information and "movie" is specified by genre information is issued by the content receiving terminal 30, and a list of contents provided, in response to the request, in the preliminary transmission from the content providing server 10 is displayed on the display screen 34 of the content receiving terminal 30.

As shown in FIGS. 10 to 12, instead of the screen including the time information display area used in issuing of a content acquisition request shown in FIG. 7, a screen (a preliminary-transmission receiving screen) for displaying information associated with contents provided in the preliminary transmission is displayed on the display screen 34. In the preliminary-transmission receiving screen, a specified time value is displayed in a time information display area 346, a specified genre is displayed in a genre display area 347, and a list of contents is displayed in a list display area 348.

In the present example shown in FIGS. 10 to 12, a list of "movie" contents is displayed such that each row includes text information indicating a title, a performer(s) thereby identifying a movie content, and a plurality of rows are arranged in a vertical direction. When the list includes a great number of contents which cannot be displayed at a time because of the limited size of the display screen 34, remaining contents may be displayed on a next page or may be displayed by scrolling the list.

In the list of contents displayed in the list display area 348, a content being currently selected is highlighted or surrounded by a rectangular line, or pointed to by a cursor CS, to notify a user which content is currently selected. A particular scene extracted from a movie content selected by the cursor CS is displayed in the form of a thumbnail image in a thumbnail image display area 349 in the display screen 34.

A user is allowed to change the selection of the movie content by operating an up or down arrow button 33a or 33b in an arrow button pad 33 on the preliminary-transmission receiving screen. For example, in the preliminary-transmission receiving screen shown in FIG. 10, if the down arrow button 33b is operated so as to select a movie content one row below the currently selected movie content, then indication on the preliminary-transmission receiving screen changes into that shown in FIG. 11. More specifically, in response to the change in the selected movie content, the thumbnail image displayed in the thumbnail image display area 349 is changed into a scene of the newly selected movie content.

In the preliminary-transmission receiving screen shown in FIG. 11, if the down arrow button 33b is operated so as to select a movie content one row below the currently selected movie content, then indication on the preliminary-transmission receiving screen changes into that shown in FIG. 12. That is, in response to the change in the selected movie content, the thumbnail image displayed in the thumbnail image display area 349 is changed into a scene of the newly selected movie content.

In the preliminary-transmission receiving screen shown in FIG. 10, 11 or 12, if a user selects the "view" icon 351 or the "buy" icon 352 and then presses the enter button 32a or the send button 38, the content receiving terminal determines that a request for transmission of a full content being currently selected has been issued, and the content receiving terminal transmits, to the content providing server 10, the full content providing request together with identification information identifying the selected content (the identification information corresponds to a row in which the content is displayed in the list).

If the content providing server 10 receives a full content providing request from a content receiving terminal, the content providing server 10 identifies AV content data specified by content identification information included in the full content providing request and transmits the identified AV content data to the content receiving terminal which has issued the full content providing request.

For example, if a user selects the "view" icon 351 and presses the enter button 32a or the send button 38, a full content providing request for the purpose of viewing of the selected AV content is issued.

In this case, the content providing server 10 transmits the requested AV content in the form of streaming data to the content receiving terminal 30 or 40 which as issued the request.

If the content receiving terminal receives the streaming data of the content from the content providing server 10, the content receiving terminal displays an image on a display screen (not shown) and/or outputs a sound/voice from a speaker in accordance with the received data thereby playing back the content (which may be a movie content, a news content, an electronic book content, etc.).

If the "buy" icon 352 is selected and the enter button 32a or the send button 38 is pressed, a full-content providing request for the purpose of purchase is issued.

In response to receiving the request, the content providing server 10 transmits the requested AV content and the associated data to the content receiving terminal 30 or 40 which has issued the request. In the present embodiment, when the content data is transmitted from the content providing server 10, the date of transmission or selling of the content is described in the associated data.

If the content receiving terminal receives the AV content data and associated data, the content receiving terminal stores the received AV content data and associated data into the content storage unit. Thereafter, if the user inputs, via an input unit, private time information and attribute information thereof for the content stored in the content storage unit, the content receiving terminal adds the input private time information and the attribute information thereof to the associated data of the content.

In the second content providing mode and the third content providing mode described above, it is assumed that a year is specified as the time information. However, as in the first content providing mode, the time information is not limited to years, but a particular month, day, hour may be specified in addition to a particular year. That is, the time information can be specified in a more precise manner than in the above-described example, and contents satisfying the specified time condition can be obtained. Also in this case, when a plurality of contents are found in the search, they are played back in a similar manner to the above-described example.

Operation of Content Receiving Terminal and Content Providing Server

The operation of issuing a content acquisition request to the content providing server 10 from the content receiving terminal 20, 30, or 40, the operation of providing contents, and the operation performed by the content receiving terminal 20, 30, or 40 to search for contents stored in the content storage unit are described in further detail below with reference to flow charts.

Operation Performed by Content Receiving Terminal to Issue Content Acquisition Request Operation Performed by Music Content Receiving Terminal to Issue Content Acquisition Request The operation performed by a content receiving terminal to receive contents provided by the content providing server 10 in the first content providing mode is described below. In the following description, by way of example, it is assumed that the content receiving terminal is the music content receiving terminal 20 with reference to flow charts shown in FIGS. 13 to 16.

The process shown in FIGS. 13 to 16 is performed by the CPU 201 of the music content receiving terminal 20 by executing a program stored in the ROM 202 using the RAM 203 as a work area.

Figure 13:
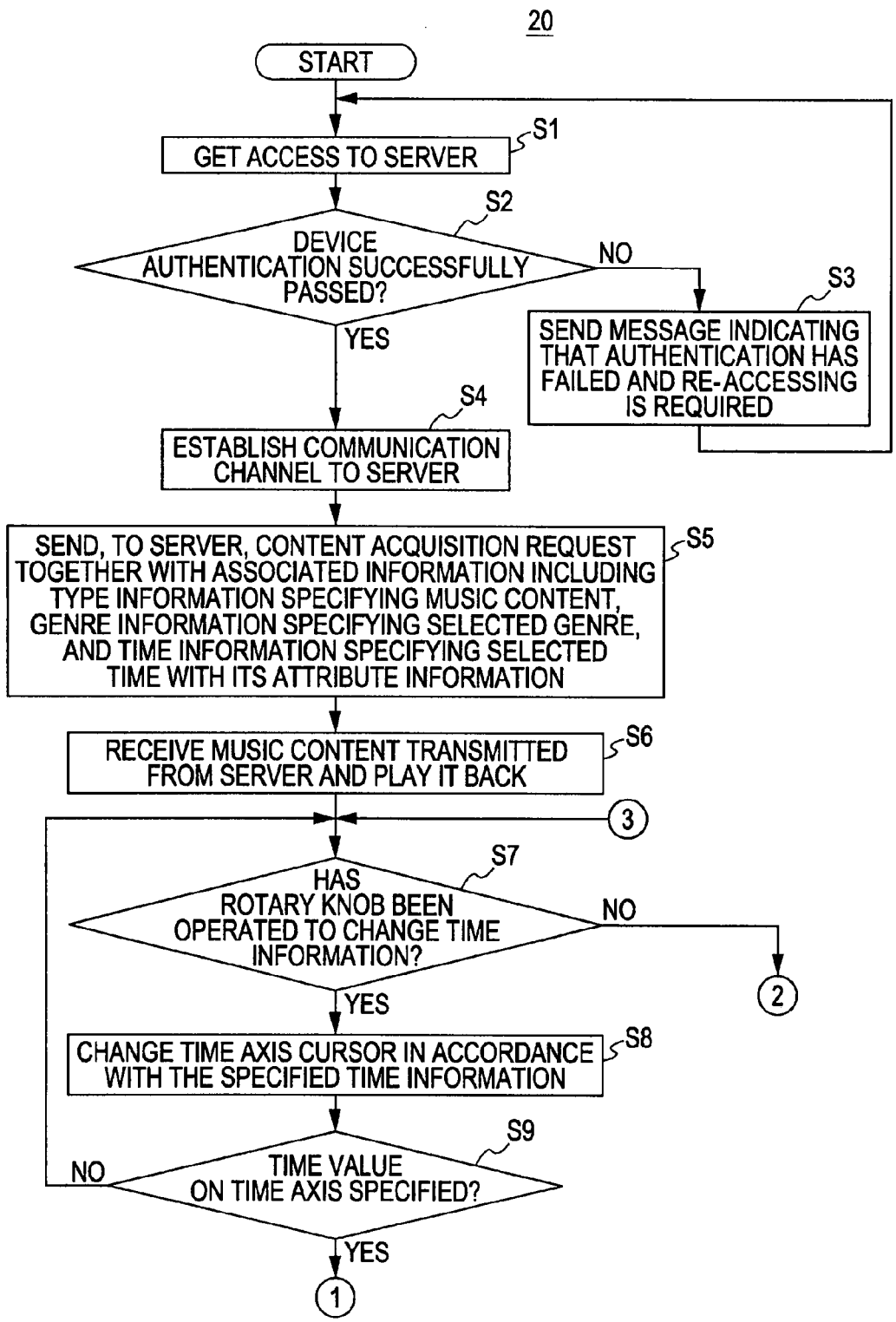
FIG. 13 is a part of a flow chart showing a process performed by a content receiving terminal configured so as to function as a music content receiving terminal according to an embodiment of the present invention.

If the music content receiving terminal 20 is set into an operation mode in which contents is received from the content providing server 10, then the CPU 201 of the music content receiving terminal 20 starts a processing routine shown in FIG. 13. First, the CPU 201 reads a communication network address of the content providing server 10 from the ROM 202 and accesses the content providing server 10 (step S1).

The CPU 201 performs a process to receive device authentication from the content providing server 10, and determines whether a device authentication success message has been received from the content providing server 10 (step S2). If a message indicating that the device authentication has been successfully passed is not received and thus it is determined that the device authentication has failed, the CPU 201 notifies a user that the device authentication has failed and re-accessing to the content providing server 10 is going to be performed (step S3). The process then returns to step S1 to again access the content providing server 10.

If it is determined in step S2 that the device authentication has been successfully passed, the CPU 201 establishes a communication channel to the content providing server 10 (step S4). In the present embodiment, once the communication channel is established between the music content receiving terminal 20 and the content providing server 10 and the music content receiving terminal 20 is connected to the content providing server 10 via the established communication channel, the connection between the music content receiving terminal 20 and the content providing server 10 is maintained until the content receiving operation is ended.

The CPU 201 then transmits, to the content providing server 10, a content acquisition request together with information indicating that a music content is requested to be provided, and associated information including time information indicating a time currently selected on the music content receiving terminal 20, attribute information of the time information, and genre information (step S5).

This makes it possible for the music content receiving terminal 20 to operate in a similar manner to a radio receiver. In a case in which the music content receiving terminal 20 has a last-state memory, the content acquisition request transmitted from the content providing server 10 may specify time information and associated information which are the same as those as of a previous content receiving operation.

The CPU 201 receives a music content which is transmitted in the form of streaming data by the content providing server 10 in response to the content acquisition request issued in step S5, and the CPU 201 plays back the received music content (step S6).

During the playback operation of the streaming data, the CPU 201 monitors the status of a rotatable operation control knob 23 to detect an operation performed by a user to change time information (step S7). If it is determined in step S7 that an operation of changing time information has been performed, the CPU 201 changes the position of the time axis cursor 242 displayed in the time information display area 241 in accordance with the operation of changing the time information (step S8).

The CPU 201 determines whether the operation of changing the time information by the user has been stopped for a period equal to or longer to a predetermined value thereby determining whether it is now time to issue a content acquisition request (step S9). If it is determined in step S9 that the operation of changing the time information is still being performed and thus it is not time to issue the content acquisition request, then the CPU 201 returns the processing flow to step S7 to repeat the process from step S7.

Figure 14:
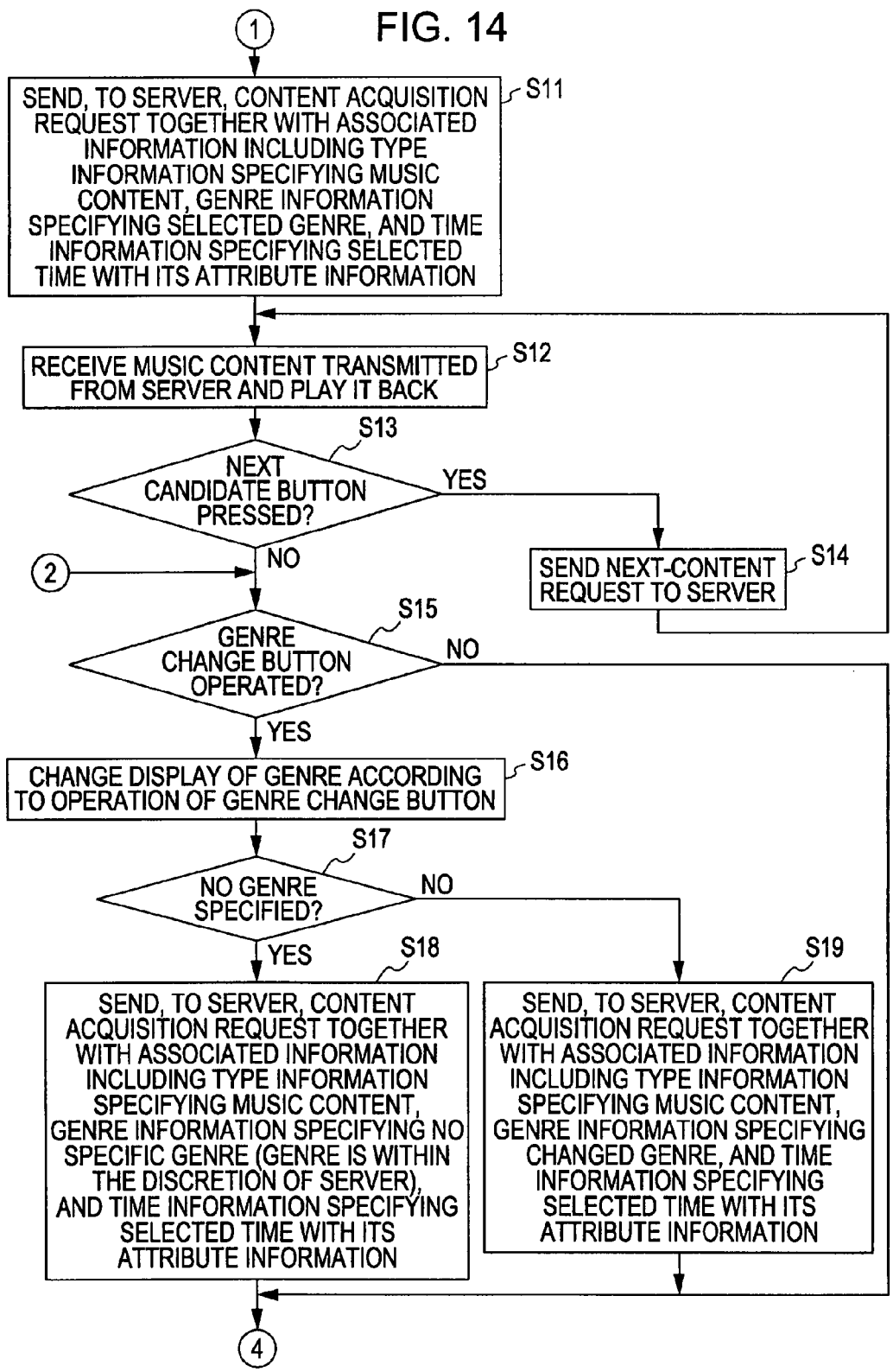
FIG. 14 is a part of a flow chart showing a process performed by a content receiving terminal configured so as to function as a music content receiving terminal according to an embodiment of the present invention.

In a case where it is determined in step S9 that it is time to issue the content acquisition request, the CPU 201 transmits, to the content providing server 10, the content acquisition request together with information indicating that a music content is requested to be provided, and associated information including time information specifying the changed time, attribute information of the time information, and genre information (step S11 in FIG. 14).

The CPU 201 receives a music content which is transmitted in the form of streaming data by the content providing server 10 in response to the content acquisition request issued in step S11, and the CPU 201 plays back the received music content (step S12).

The CPU 201 determines whether the next-content button 25e has been pressed (step S13). If it is determined that the next-content button 25e has been pressed, the CPU 201 transmits a next-content request to the content providing server 10 (step S14). The processing flow then returns to step S12 and the process is repeated from step S12.

In a case where it is determined in step S13 that the next-content button 25e is not pressed, then the CPU 201 determines whether the genre selection button 25b has been operated by the user during the playback operation of the streaming data to change the genre of the content (step S15). If it is determined in step S15 that the operation of changing the genre has been performed, the CPU 201 changes the genre displayed in the genre display area 245 of the display screen 24 in accordance with the operation of the changing the genre performed by the user (step S16).

The CPU 201 transmits a new content acquisition request to the content providing server 10 in response to the detection of the operation of changing the genre in step S15. In the present embodiment, before the content acquisition request is transmitted, the CPU 201 determines whether "don't care" is specified (that is, no particular genre is specified) as a result of the operation of the changing the genre (step S17).

If it is determined in step S17 that "don't care" is specified as the genre, then the CPU 201 transmits, to the content providing server 10, a content acquisition request together with information indicating that a music content is requested to be provided, and associated information including time information indicating the specified time, attribute information of the time information, and information indicating that selection of the genre is within the discretion of the content providing server 10 (step S18).

In a case in which it is determined in step S17 that a particular genre other than "don't care" is specified, the CPU 201 transmits, to the content providing server 10, a content acquisition request together with information indicating that a music content is requested to be provided, and associated information including time information indicating the specified time, attribute information of the time information, and genre information indicating the specified particular genre (step S19).

Figure 15:
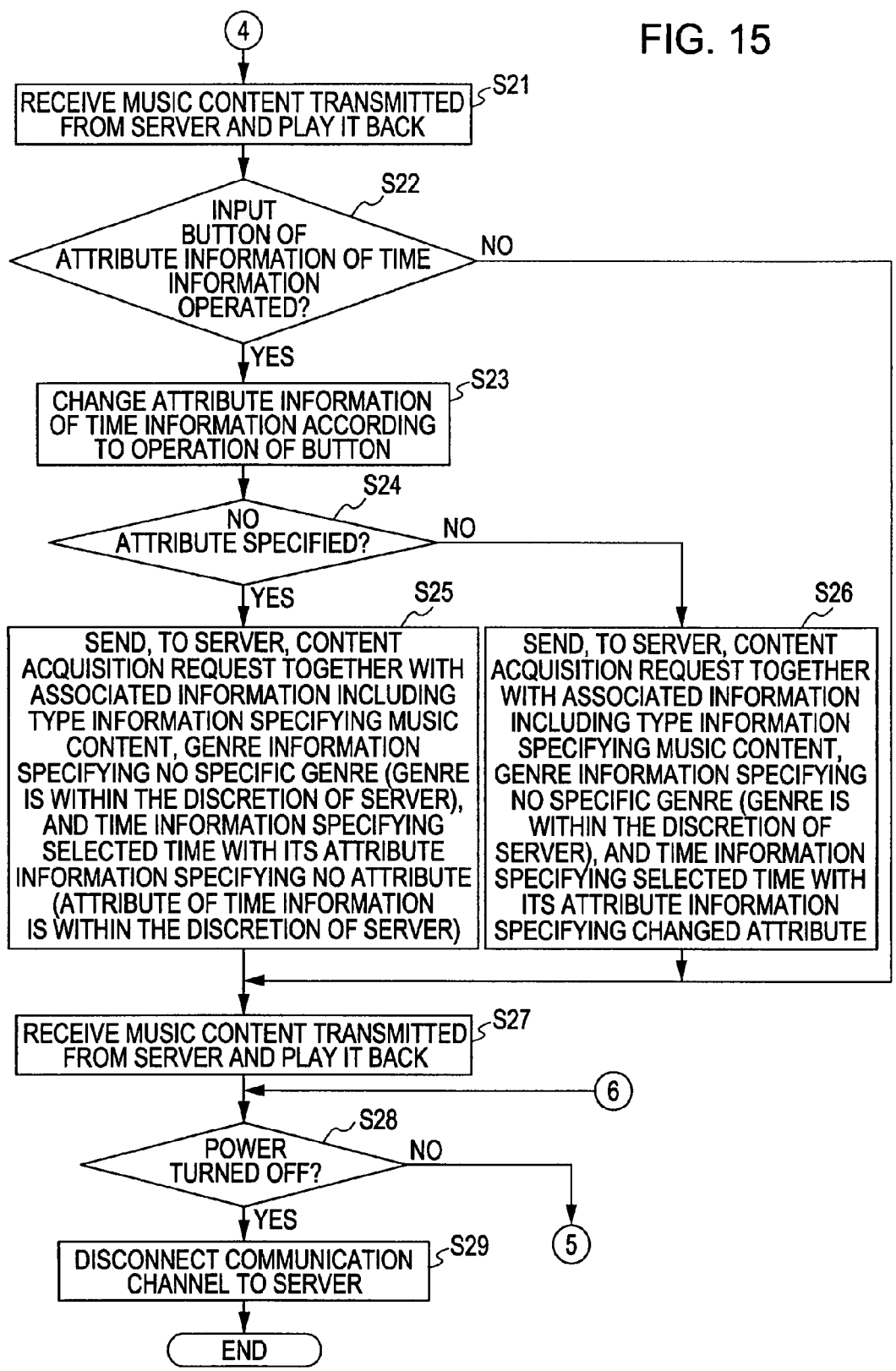
FIG. 15 is a part of a flow chart showing a process performed by a content receiving terminal configured so as to function as a music content receiving terminal according to an embodiment of the present invention.

After completion of step S18 or S19, the CPU 201 receives a music content which is transmitted in the form of streaming data by the content providing server 10 in response to the content acquisition request issued in step S16 or S17, and the CPU 201 plays back the received music content (step S21 in FIG. 15).

Also in a case where it is determined in step S15 that no operation is performed on the genre selection button 25b, the CPU 201 advances the process to step S21 and in step S21, the CPU 201 receives a music content which is transmitted in the form of streaming data by the content providing server 10 in response to the content acquisition request issued in step S5, and the CPU 201 plays back the received music content.

In a case where it is determined in step S7 in FIG. 13 that no operation is performed to change the time information, the CPU 201 advances the process to step S15 in FIG. 14 to perform the above-described process from step S15.

After step S21, the CPU 201 determines whether the time attribute selection button 25a has been operated by a user to change the attribute of the time information (step S22). If it is determined in step S22 that the operation of changing the attribute of the time information has been performed, the CPU 201 changes the attribute information of the time information displayed in the time attribute display area 244 on the display screen 24 in accordance with the operation of changing the attribute performed by the user (step S23).

The CPU 201 transmits a new content acquisition request to the content providing server 10 in response to the detection of the operation of changing the attribute of the time information in step S22. In the present embodiment, before the content acquisition request is transmitted, the CPU 201 determines whether "don't care" is specified (that is, no particular attribute is specified) as a result of the operation of the changing the attribute of the time information (step S24).

In a case where it is determined in step S24 that that "don't care" is specified as the attribute of the time information, the CPU 201 transmits, to the content providing server 10, a content acquisition request together with information indicating that a music content is requested to be provided, and associated information including time information indicating the specified time, attribute information indicating that the selection of the attribute of the time information is within the discretion of the content providing server 10, and genre information indicating the specified genre (step S25).

If it is determined in step S24 that a particular attribute other than "don't care" is specified for the time information, the CPU 201 transmits, to the content providing server 10, a content acquisition request together with information indicating that a music content is requested to be provided, and associated information including time information indicating the specified time, attribute information indicating the specified attribute of the time information, and genre information indicating the specified genre (step S26).

After step S25 or S26, the CPU 201 receives a music content which is transmitted in the form of streaming data by the content providing server 10 in response to the content acquisition request issued in step S25 or S26, and the CPU 201 plays back the received music content (step S27). Also in a case where it is determined in step S22 that no operation is performed on the time attribute selection button 25a, the CPU 201 advances the process to step S27, and in step S27, the CPU 201 receives a music content which is transmitted in the form of streaming data by the content providing server 10 in response to the content acquisition request issued in step S5, and the CPU 201 plays back the received music content.

The CPU 201 monitors the status of the power switch to detect whether the power switch has been turned off (step S28). If it is determined that the power switch has been turned off, the CPU 201 disconnects the communication channel to the content providing server 10 (step S29) and ends the present processing routine.

Figure 16:
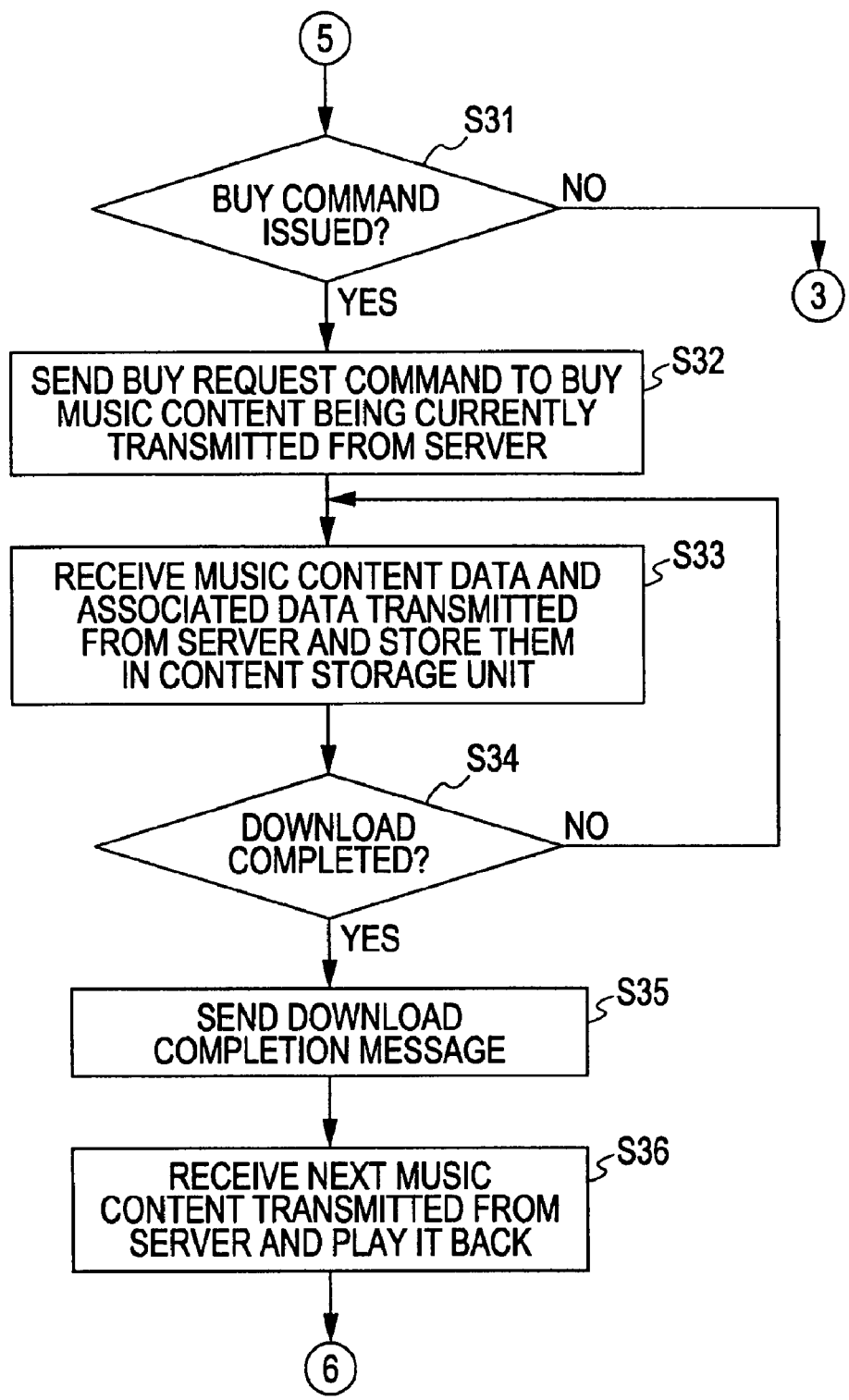
FIG. 16 is a part of a flow chart showing a process performed by a content receiving terminal configured so as to function as a music content receiving terminal according to an embodiment of the present invention.

In a case where it is determined in step S27 that the power switch is not turned off, the CPU 201 further determines whether a user has pressed the purchase button 25d to issue a purchase command (step S31 in FIG. 16). If it is determined in step S31 that the purchase command is not issued, then the processing flow returns to step S7 in FIG. 13 to repeat the process from step S7.

On the other hand, if it is determined in step S31 that the purchase command has been issued, the CPU 201 transmits, to the content providing server 10, the music content purchase request command together with identification information identifying the music content being currently transmitted from the content providing server 10 (step S32).

If the content providing server 10 receives the purchase request, the content providing server 10 temporarily stops transmission of the streaming data and transmits the requested music content data and associated data. The CPU 201 stops playback of streaming data and receives the music content data and the associated data thereof transmitted from the content providing server 10 and stores them in the content storage unit 206 in such a manner that they are related to each other (step S33).

The CPU 201 determines whether the requested music content data has been downloaded (stored) (step S34). If the downloading is not yet completed, the process returns to step S33 to continue the downloading. If it is determined that the downloading has been completed, a download completion message is sent to the content providing server 10 (step S35).

If the downloading is complete, the content providing server 10 resumes transmission of streaming data of music contents starting with a music content following the downloaded music content.

The CPU 201 receives the streaming data of the music content transmitted from the content providing server 10 and plays it back (step S36). The processing flow then returns to step S28 in FIG. 15 to repeat the process from step S28.

Operation Performed by AV Content Receiving Terminal to Acquire Content

The operation performed by a content receiving terminal to receive contents provided by the content providing server 10 in the third content providing mode is described below. In the following description, by way of example, it is assumed that the content receiving terminal is the AV content receiving terminal 30 FIGS. 17 to 20 show a flow chart of a process performed by the AV content receiving terminal 30.

The process shown in FIGS. 17 to 20 is performed by the CPU 301 of the AV content receiving terminal 30 by executing a program stored in the ROM 302 using the RAM 303 as a work area.

When the AV content receiving terminal 30 is in a power-on state, the CPU 301 monitors the status of the menu button 35 to detect whether the menu button 35 is operated (step S41). If it is determined that no operation on the menu button 35 is performed, other process is performed (step S42).

If it is determined in step S41 that the menu button 35 has been operated, the CPU 301 displays a list of function available on the AV content receiving terminal 30 on the display screen 34 (step S43). The CPU 301 then determines whether, from the function list, an operation mode has been selected to receive an AV content in accordance with time information (hereinafter, this mode will be referred to as the time-information-based AV content reception mode) (step S44).

If it is determined in step S44 that a function other than the time-information-based AV content reception mode has been selected, then the CPU 301 performs a process corresponding to the selected function (step S45). A content search process routine included in step S45 will be described in detail later.

In a case where it is determined in step S44 that the time-information-based AV content reception mode has been selected, the CPU 301 reads a communication network address of the content providing server 10 from the ROM 302 and accesses the content providing server 10 (step S46).

The CPU 301 performs a process to receive device authentication from the content providing server 10, and determines whether a device authentication success message has been received from the content providing server 10 (step S47). If no device authentication success message is received, and it is determined that the device authentication has failed, a message is displayed to notify a user that the device authentication has failed and accessing to the content providing server 10 is going to be tried again (step S48). The process then returns to step S46 to again access the content providing server 10.

In a case where it is determined in step S47 that the device authentication has been successfully passed, the CPU 301 establishes a communication channel to the content providing server 10 (step S49). In the present embodiment, once the communication channel is established between the AV content receiving terminal 30 and the content providing server 10 and the AV content receiving terminal 30 is connected to the content providing server 10 via the established communication channel, the connection between the AV content receiving terminal 30 and the content providing server 10 is maintained until the content receiving operation is ended.

After the communication channel to the content providing server 10 has been established, the CPU 301 displays a screen for issuing AV content acquisition request based on time information (step S50). An example of a screen for issuing AV content acquisition request based on time information is shown in FIG. 7.

The CPU 301 determines whether, on the screen for issuing AV content acquisition request, a left-arrow button 33c or a right-arrow button 33d has been operated by a user to change the time information (step S51). If it is determined in step S51 that the operation of changing the time information has been performed, the CPU 301 changes the position of the time axis cursor 342 in the time axis display area 342 in accordance with the operation of changing the time information (step S52).

Figure 18:
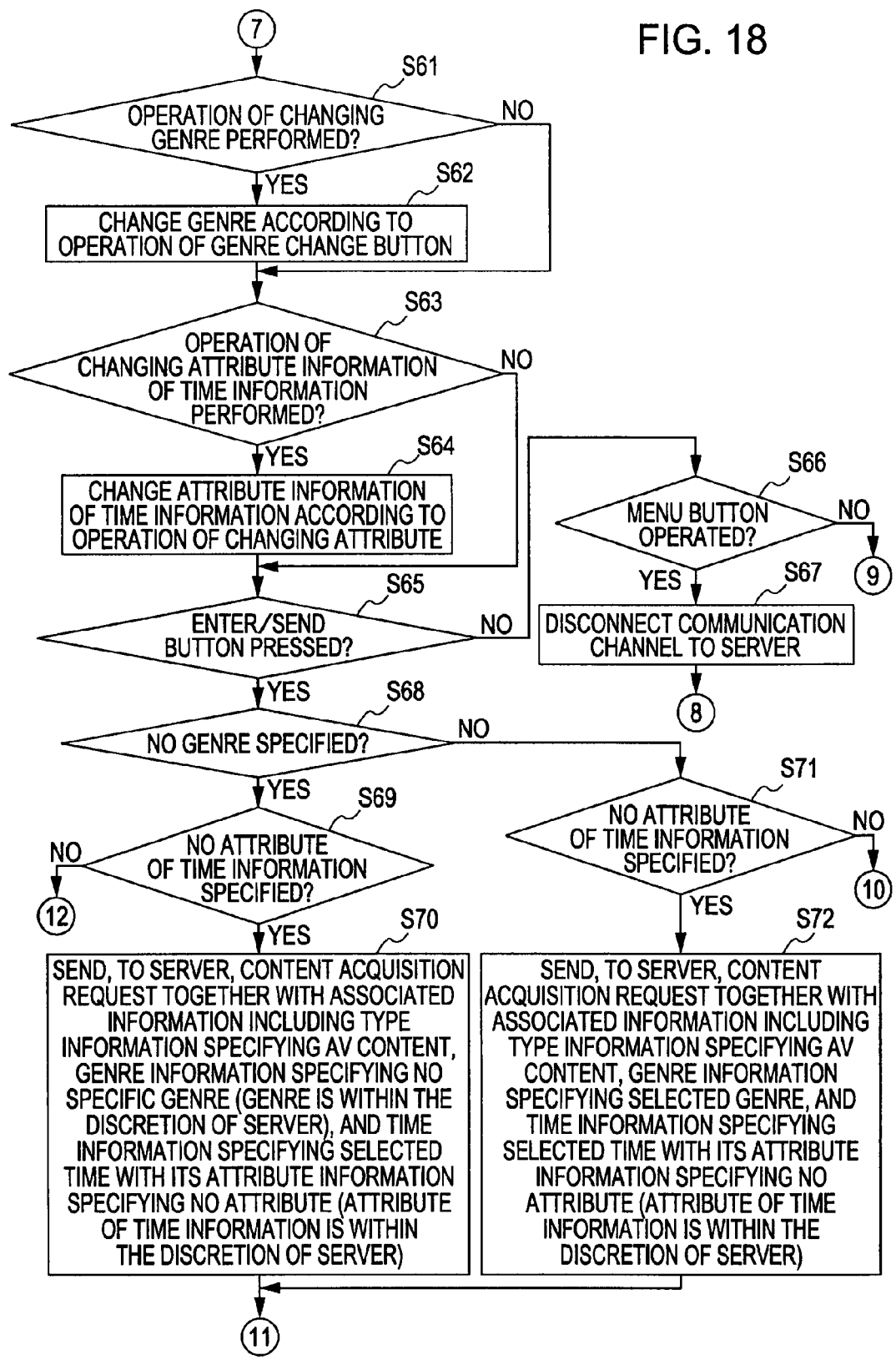
FIG. 18 is a part of a flow chart showing a process performed by a content receiving terminal configured so as to function as an AV content receiving terminal according to an embodiment of the present invention.

In a case where it is determined in step S51 that no operation is performed to change the time information, or in a case where step S52 is completed, the CPU 301 determines whether the genre selection button 32c has been operated by a user to change the genre (step S61 in FIG. 18).

If it is determined in step S61 that the operation of changing the genre has been performed, then the CPU 301 changes the indication in the genre display area 345 on the display screen 34 in accordance with the operation of changing the genre (step S62).

In a case where it is determined in step S61 that no operation to change the genre is performed or in a case where step S62 is completed, the CPU 301 determines whether the time attribute selection button 32b has been operated by the user to change the attribute of the time information (step S63). If it is determined in step S63 that the operation of changing the attribute of the time information has been performed, the CPU 301 changes the attribute information of the time information displayed in the time attribute display area 344 on the display screen 34 in accordance with the operation of changing the attribute performed by the user (step S64).

If it is determined in step S63 that no operation to change the attribute of the time information has been performed, or it step S64 is completed, the CPU 301 determines whether an enter button 32a or a send button 36 has been operated by the user to issue a preliminary content transmission request (step S65).

In a case where it is determined in step S65 that the enter button 32a or the send button 36 has not been operated and thus it is determined that the preliminary content transmission request has not been issued, the CPU 301 determines whether the menu button 35 has been operated (step S66).

Figure 17:
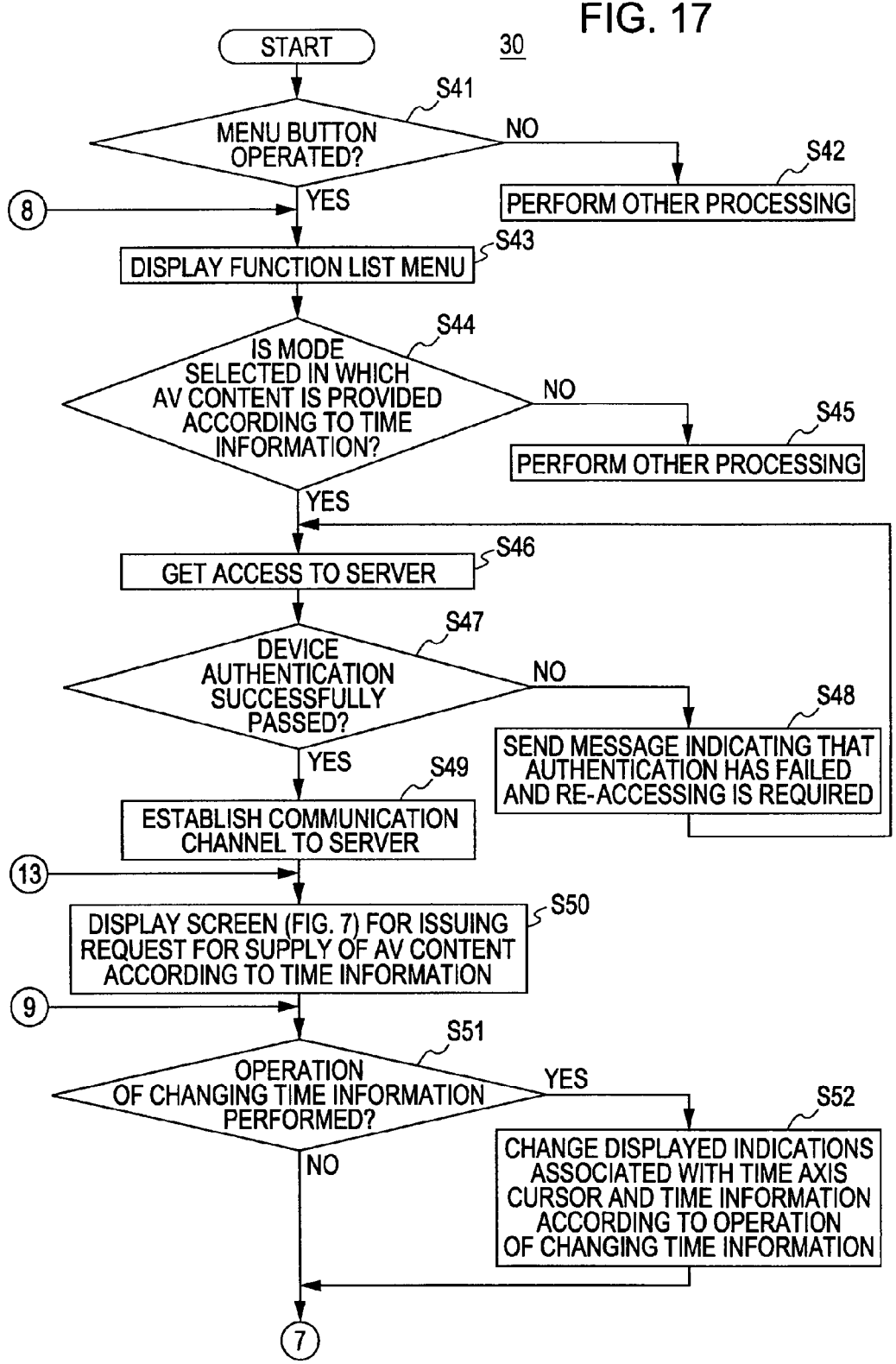
FIG. 17 is a part of a flow chart showing a process performed by a content receiving terminal configured so as to function as an AV content receiving terminal according to an embodiment of the present invention.

If it is determined in step S66 that the menu button 35 has not been operated, the CPU 301 returns the process to step S51 in FIG. 17 to repeat the process from step S51. If it is determined in step S66 that the menu button 35 has been operated, the CPU 301 disconnects the communication channel to the content providing server 10 (step S67). Thereafter, the process returns to step S43 in FIG. 17 to repeat the process from step S43.

In a case where it is determined in step S65 that the enter button 32*a* or the send button 36 has been operated to issue the preliminary content transmission request, the CPU 301 transmits a new content acquisition request to the content providing server 10. In the present example, before the content acquisition request is transmitted, the CPU 301 determines whether "don't care" is specified for the genre and the attribute of the time information.

More specifically, first, the CPU 301 determines whether "don't care" is specified for the genre (step S68). In a case where it is determined in step S68 that that "don't care" is specified as the genre, then the CPU 301 further determines whether "don't care" is specified as the attribute of the time information (step S69).

If it is determined in step S69 that "don't care" is specified as the attribute of the time information, the CPU 301 transmits, to the content providing server 10, a content acquisition request together with information indicating that an AV content is requested to be provided, and associated information including time information indicating the specified time and information indicating that the selection of the attribute of the time information and the genre is within the discretion of the content providing server 10 (step S70).

Figure 19:
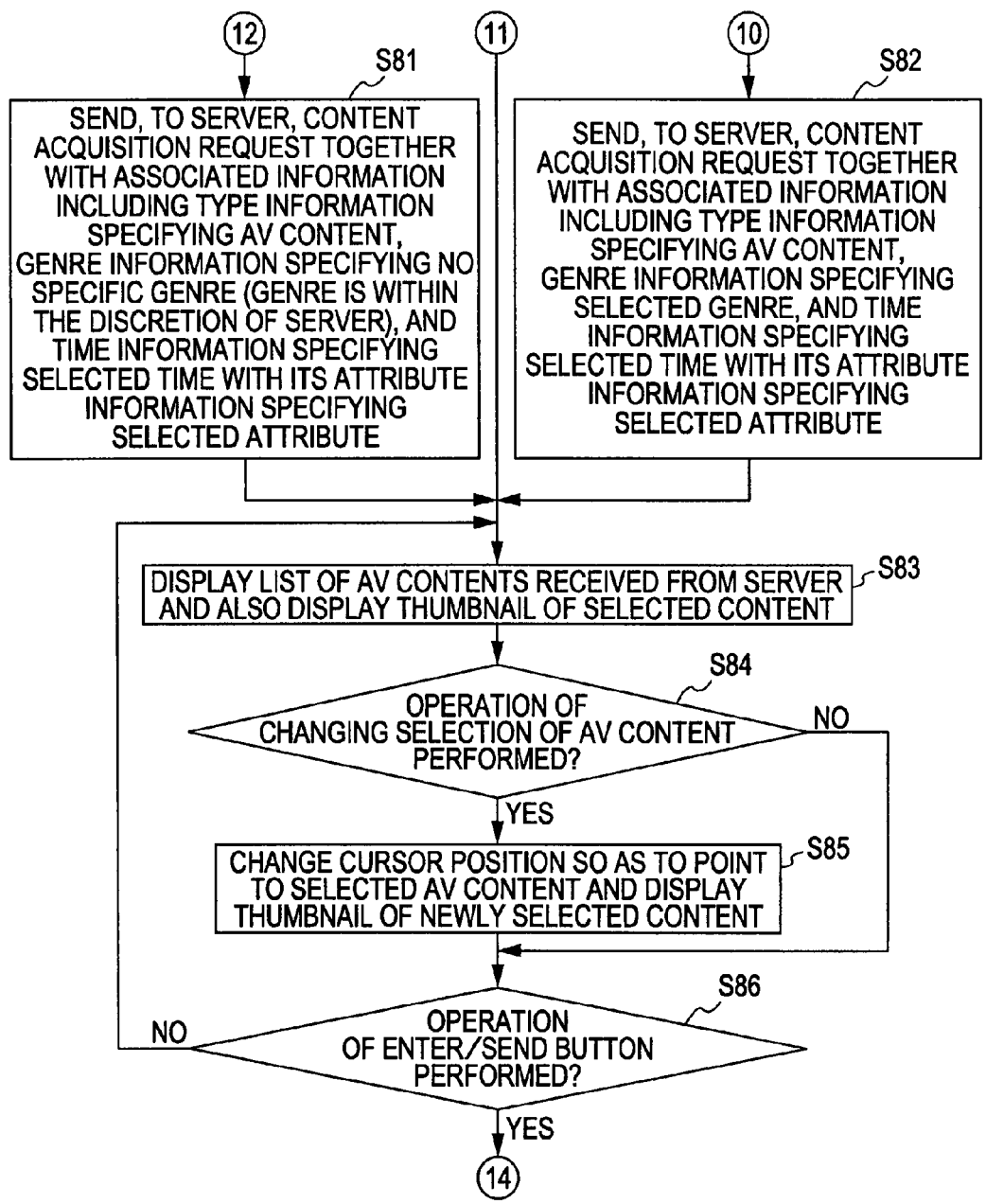
FIG. 19 is a part of a flow chart showing a process performed by a content receiving terminal configured so as to function as an AV content receiving terminal according to an embodiment of the present invention.
Figure 20:
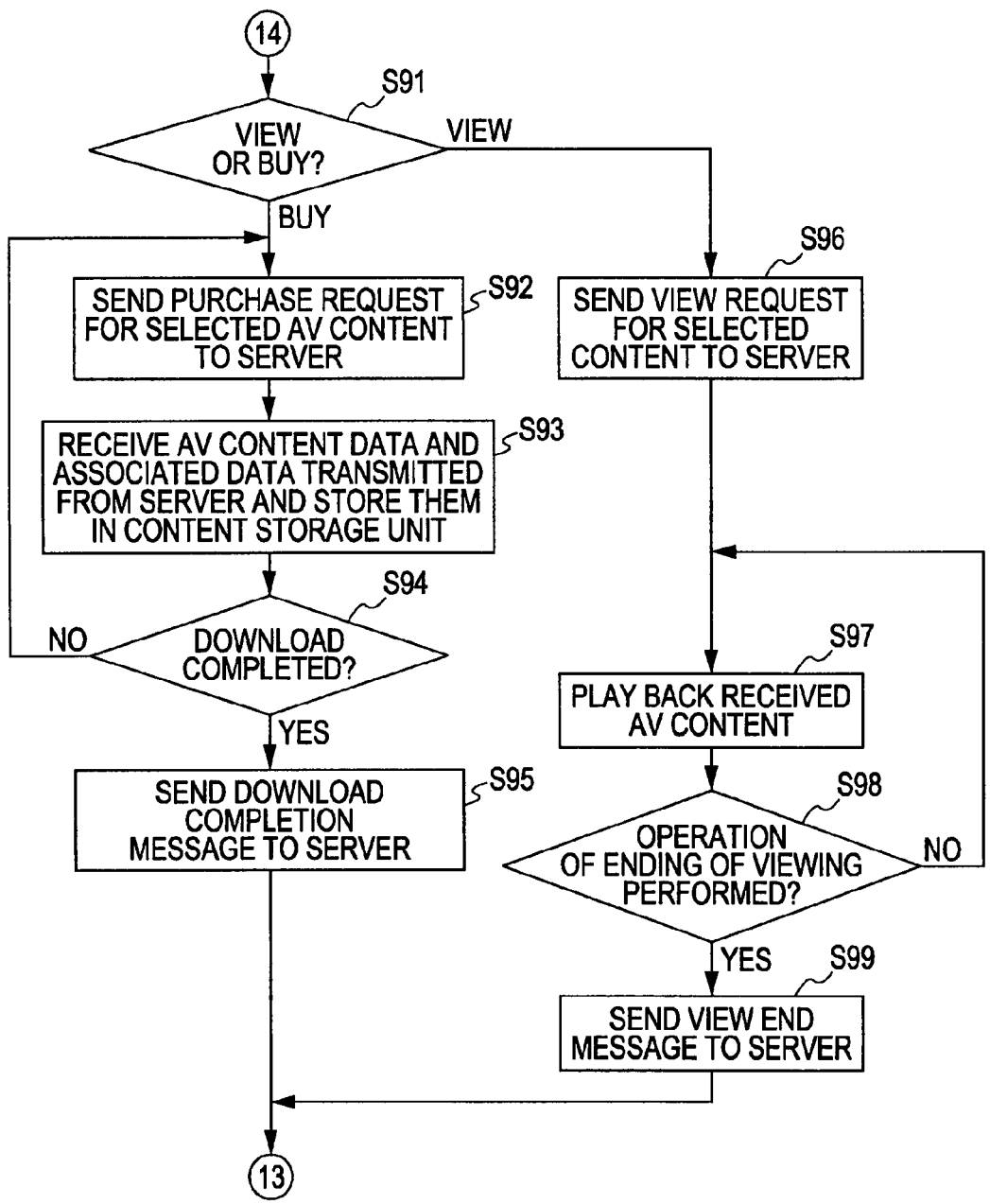
FIG. 20 is a part of a flow chart showing a process performed by a content receiving terminal configured so as to function as an AV content receiving terminal according to an embodiment of the present invention.

On the other hand, if it is determined in step S69 that "don't care" is not specified but a particular attribute of the time information is specified, the CPU 301 transmits, to the content providing server 10, a content acquisition request together with information indicating that an AV content is requested to be provided, and associated information including time information indicating the specified time, attribute information indicating the selected genre, and information indicating that the selection of the genre is within the discretion of the content providing server 10 (step S81 in FIG. 19).

In a case where it is determined in step S68 that "don't care" is not specified but a particular genre is specified, then the CPU 301 further determines whether "don't care" is specified for the attribute of the time information (step S71).

In a case where it is determined in step S71 that "don't care" is specified as the attribute of the time information, the CPU 301 transmits, to the content providing server 10, a content acquisition request together with information indicating that an AV content is requested to be provided, and associated information including time information indicating the specified time, genre information indicating the specified genre, and information indicating that the selection of the attribute of the time information is within the discretion of the content providing server 10 (step S72).

In a case where it is determined in step S71 that "don't care" is not specified but a particular attribute of the time information is specified, the CPU 301 transmits, to the content providing server 10, a content acquisition request together with information indicating that an AV content is requested to be provided, and associated information including time information indicating the specified time, attribute information indicating the specified attribute of the time information, and genre information indicating the specified genre (step S82 in FIG. 19).

After step S70, S72, S81 or S82, the CPU 301 receives a list of AV contents and thumbnail image data of a currently selected content transmitted the content providing server 10 in response to the content acquisition request issued in step S70, S72, S81, or S82, and the CPU 301 displays the received AV content list and the thumbnail image on the display screen 34, for example, as shown in FIG. 10 (step S83).

The CPU 301 monitors the status of the list of AV contents to detect whether an operation has been performed to change the selection of an AV content (step S84). If it is determined that the operation of changing the selection of the AV content has been performed, the cursor position is changed so as to indicate the selected AV content, and a thumbnail image of the selected AV content is displayed (step S85).

In a case where it is determined in step S84 that no operation has been performed to change the selection of the AV contents in the AV content list, or in a case where step S85 is completed, the CPU 301 determines whether the enter button 32*a* or the send button 36 has been operated by the user to issue a full content transmission request (step S86).

If it is determined in step S86 that the full content transmission request has not been issued, the CPU 301 returns the process to step S83 to repeat the process from S83. On the other hand, if it is determined in step S86 that the full content transmission request has been issued, the CPU 301 further determines whether the view icon 351 or the buy icon 352 is selected (step S91 in FIG. 20).

If it is determined in step S91 that the full content transmission request has been issued in a state in which the buy icon 352 is selected, the CPU 301 transmits the AV content purchase request including identification information identifying the selected AV content to the content providing server 10 (step S92).

In response to the purchase request, the content providing server 10 transmits the data of the requested AV content and associated data. The CPU 301 receives the AV content data and the associated data transmitted from the content providing server 10 and stores them in the content storage unit 306 in such a manner that they are related to each other (step S93).

The CPU 301 determines whether the purchased AV content data has been downloaded (stored) (step S94). If the downloading is not yet completed, the process returns to step S93 to continue the downloading. If it is determined that the downloading has been completed, a download completion message is sent to the content providing server 10 (step S95).

If the downloading of data transmitted from the content providing server 10 is completed, the process returns to step S50 in FIG. 17, in which the screen for issuing AV content acquisition request based on time information is displayed.

On the other hand, if it is determined in step S91 that the full content transmission request has been issued in a state in which the view icon 351 is selected, the CPU 301 transmits the AV content view request including identification information identifying the selected AV content to the content providing server 10 (step S96).

In response to the view request, the content providing server 10 transmits the data of the requested AV content. If the CPU 301 receives the AV content data transmitted from the content providing server 10, the CPU 301 decodes the received data, displays the decoded data on the display screen 34, and outputs associated voice/sound from a speaker thereby playing back the AV content in the streaming manner (step S97).

The CPU 301 determines whether the user has performed an operation to end the viewing (step S98). Note that the operation to end the viewing may be performed not only after the content has been fully viewed by a user of the content receiving terminal but at an arbitrary time before the end of the content. If it is determined that the operation to end the viewing has not been performed, the process returns to step S97 to continue the playback of the received AV content. On the other hand, if it is determined in step S98 that the operation to end the viewing has been performed, the CPU 301 transmits a view end message to the content providing server (step S99). Thereafter, the process returns to step S50 in FIG. 17, in which the screen for issuing AV content acquisition request is displayed, and the above-described process is repeated.

In the examples described above with reference to FIG. 13 to 16 or FIGS. 17 to 20, when "don't care" is specified for the genre or the attribute of the time information, information is transmitted which indicates that the selection of the genre or the attribute of the time information is within the discretion of the content providing server 10. Alternatively, information indicating that no genre or no attribute of the time information is specified may be transmitted to the content providing server 10.

When the content providing server 10 receives the information indicating that no genre or no attribute of the time information is specified, the content providing server 10 may determine that the selection of the genre or the attribute of the time information is within the discretion of the content providing server 10, and the content providing server 10 may transmit a content of a recommended or default genre or attribute of the time information to the content receiving terminal.

Operation of Content Providing Server

An example of an operation of the content providing server 10 is described below with reference to flow charts shown in FIGS. 21 to 27. In the example described below, it is assumed that when the content providing server 10 transmits music contents, the transmission is performed in the first content providing mode described above, while the third content providing mode is employed for AV contents. Note that other types of contents may be transmitted in proper modes depending on the content types, although further descriptions thereof are not given herein. Also note that in the present example it is assumed that when "don't care" is specified for associated information such as genre information or attribute information of time information (that is, when a specific genre or attribute is not specified), a predetermined recommended genre or attribute of time information is applied.

The process shown in FIGS. 21 to 27 is performed by the CPU 101 by executing a program stored in the ROM 102 using the RAM 103 as a work area.

The CPU 101 of the content providing server 10 monitors whether an access request is received from a content receiving terminal (step S111). If it is determined that an access request has been received from a content receiving terminal, the CPU 101 authenticates the content receiving terminal which has issued the access request (step S112). If the authentication has failed, the CPU 101 notifies the content receiving terminal that the authentication has failed (step S113). Thereafter, the process returns to step S111.

If it is determined in step S112 that the device authentication has been successfully passed, the CPU 101 monitors whether a content acquisition request from the content receiving terminal is received (step S114). If the content acquisition request is received, the CPU 101 analyzes the received content acquisition request (step S115).

The CPU 101 determines whether the content requested by the content acquisition request is a music content (step S116). If it is determined that a music content is requested, the CPU 101 performs an operation in the first content providing mode.

Figure 22:
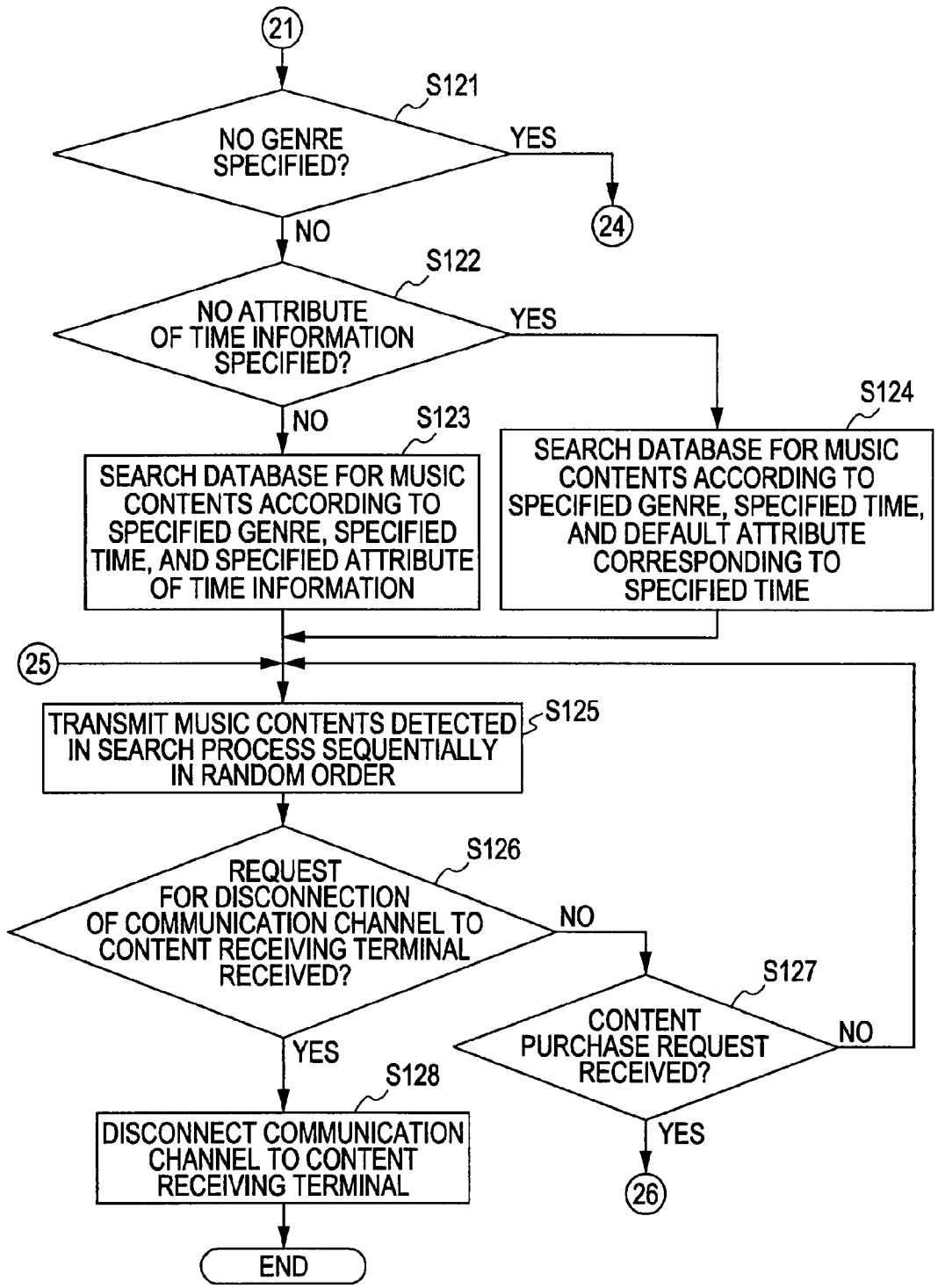
FIG. 22 is a part of a flow chart showing a process performed by a content providing server according to an embodiment of the present invention.

That is, first, the CPU 101 analyzes the associated information included in the content acquisition request to determine whether "don't care" is specified for the genre (step S121 in FIG. 22). If it is determined that "don't care" is not specified but a particular genre is specified, the CPU 101 further determines whether "don't care" is specified for the attribute of the time information (step S122).

If it is determined in step S122 that "don't care" is not specified but a particular attribute of the time information is specified, the CPU 101 sets a search condition according to the specified genre, the specified time information, and the specified attribute of the time information, and searches the content database 11 according to the set search condition (step S123).

In a case where it is determined in step S122 that "don't care" is specified as the attribute of the time information, the CPU 101 sets a search condition according to the specified genre, the specified time information, and a predetermined recommended attribute of the time information, and searches the content database 11 according to the set search condition (step S124).

Figure 23:
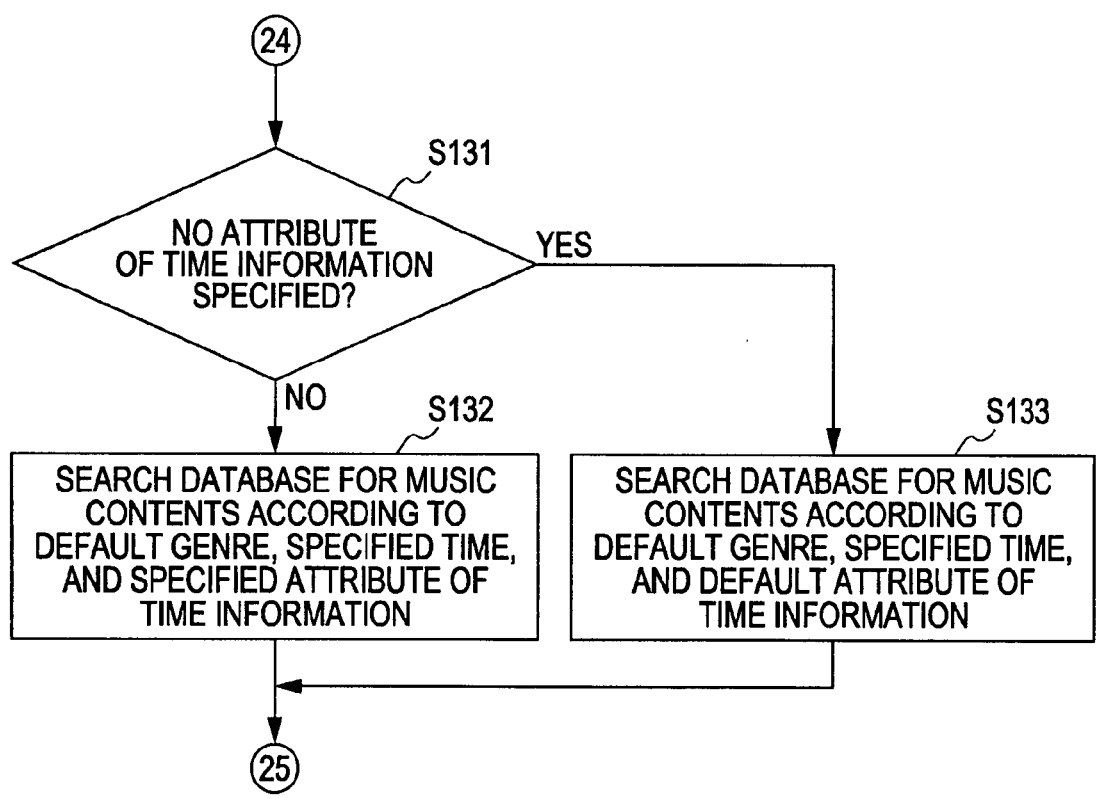
FIG. 23 is a part of a flow chart showing a process performed by a content providing server according to an embodiment of the present invention.
Figure 24:
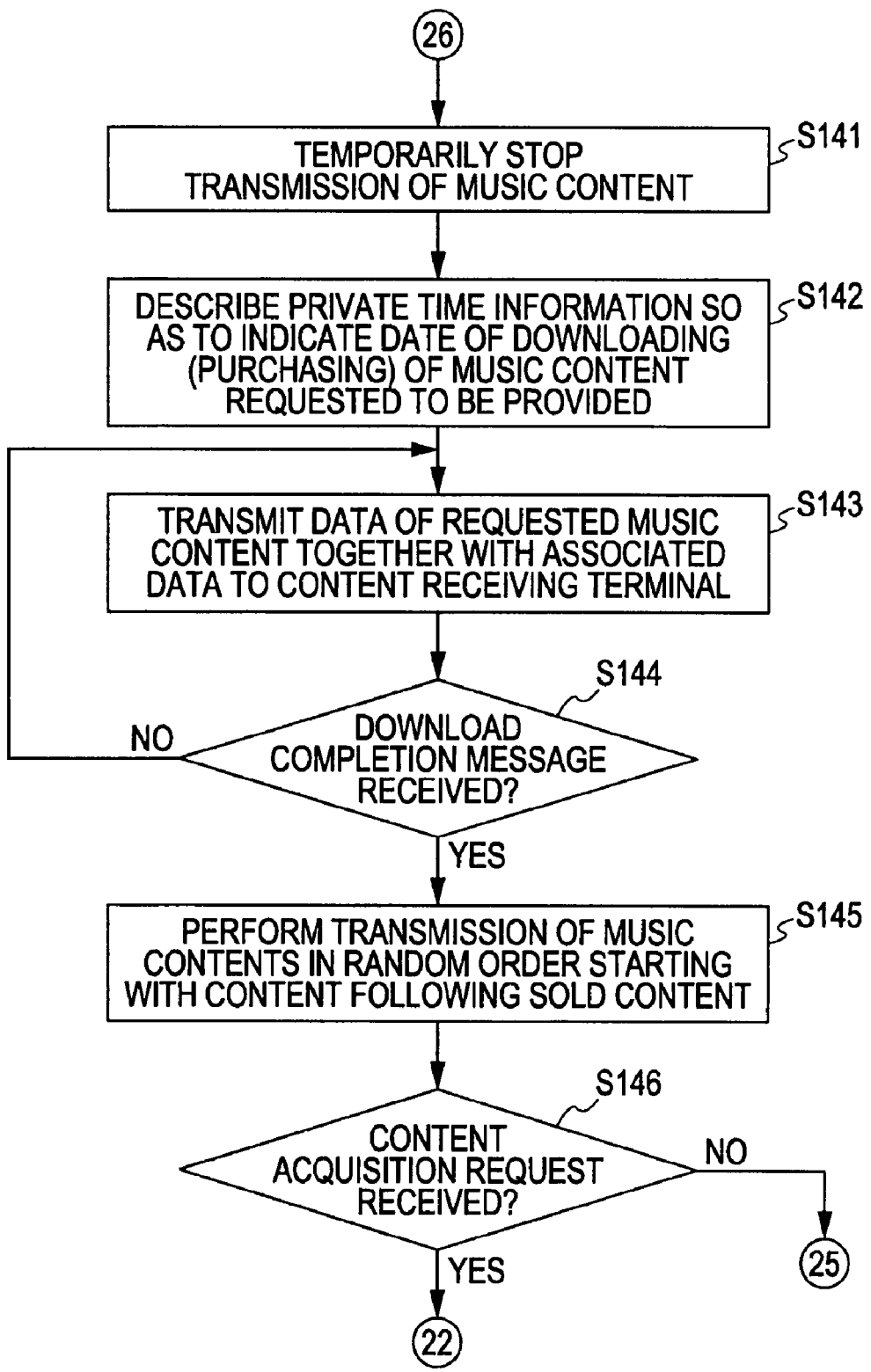
FIG. 24 is a part of a flow chart showing a process performed by a content providing server according to an embodiment of the present invention.

In a case where it is determined in step S121 that "don't care" is specified for the genre, the CPU 101 further determines whether "don't care" is specified for the attribute of the time information (step S131 in FIG. 23).

If it is determined in step S131 that "don't care" is not specified but a particular attribute of the time information is specified, the CPU 101 sets a search condition according to a predetermined recommended genre, the specified time information, and the specified attribute of the time information, and searches the content database 11 according to the set search condition (step S132).

On the other hand, if it is determined in step S131 that "don't care" is specified as the attribute of the time information, the CPU 101 sets a search condition according to a predetermined recommended genre, the specified time information, and a predetermined recommended attribute of the time information, and searches the content database 11 according to the set search condition (step S133).

After the search step S123, S124, S132 or S133, the CPU 101 transmits data of music contents detected in the search step, sequentially in a random order, to the content receiving terminal (step S125).

The CPU 101 determines whether a communication channel disconnection request has been received from the content receiving terminal (step S126). If it is determined that the communication channel disconnection request has not been received from the content receiving terminal, the CPU 101 determines whether a content purchase request has been received from the content receiving terminal (step S127).

If it is determined in step S127 that the content purchase request has been received, the CPU 101 temporarily stops transmission of the streaming data of the music content (step S141 in FIG. 24), and describes the date of downloading (purchasing) the music content, as private time information, in the associated data of the music content (step S142).

The CPU 101 transmits data of the requested music content data and associated data to the content receiving terminal which has issued the purchase request (step S143). The CPU 101 determines whether a download completion message has been received from the content receiving terminal (step S144). If it is determined that the download completion message has not been received, the process returns to step S143 to continue the downloading process.

If it is determined in step S144 that the download completion message has been received, the CPU 101 resumes transmission of streaming data of music contents starting with a music content following the purchased music content in a random order (step S145).

The CPU 101 determines whether a new content acquisition request has been received (step S146). If it is determined that a new content acquisition request has not been received, the process returns to step S125 in FIG. 22 to continue the transmission of the current content data.

Figure 21:
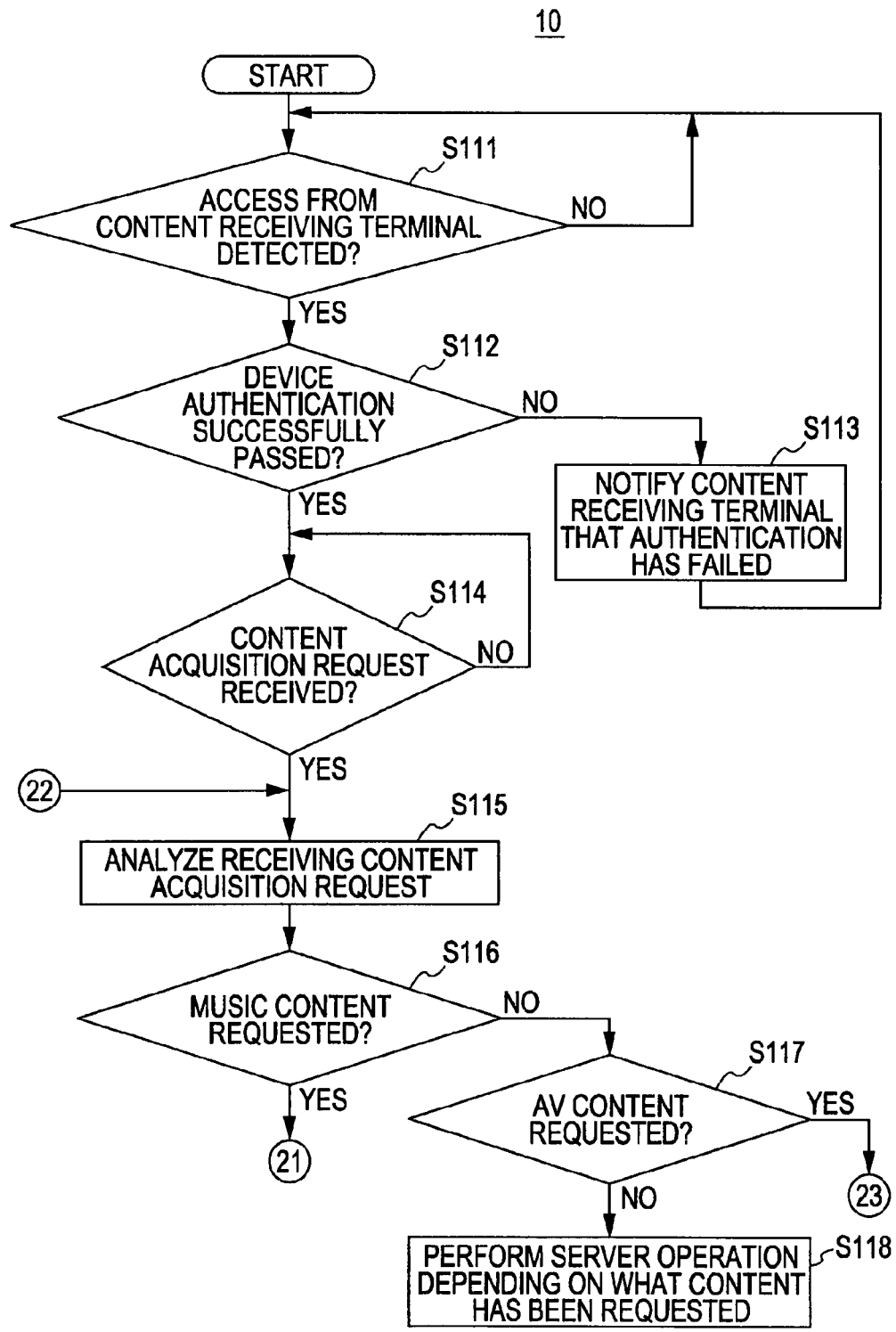
FIG. 21 is a part of a flow chart showing a process performed by a content providing server according to an embodiment of the present invention.

On the other hand, if it is determined in step S146 that a new content acquisition request has been received, the process returns to step S115 in FIG. 21 to repeat the process from step S115.

If it is determined in step S126 it is determined that a communication channel disconnection request has been received from the content receiving terminal, the CPU 101 disconnects the communication channel to the content receiving terminal (step S128) and ends the present processing routine.

In a case where it is determined in step S116 in FIG. 21 that the content requested by the content acquisition request is not a music content the CPU 101 determines whether the content requested by the content acquisition request is an AV content (step S117). If it is determined that the specified content is not an AV content, the CPU 101 performs a content providing operation in a proper mode depending on the content type (step S118).

In a case in which it is determined in step S117 that the content requested by the content acquisition request received from the content receiving terminal is an AV content, the CPU 101 determines that the content acquisition request received in step S114 is a request for preliminary content transmission, and performs the operation in the third content providing mode described above.

Figure 25:
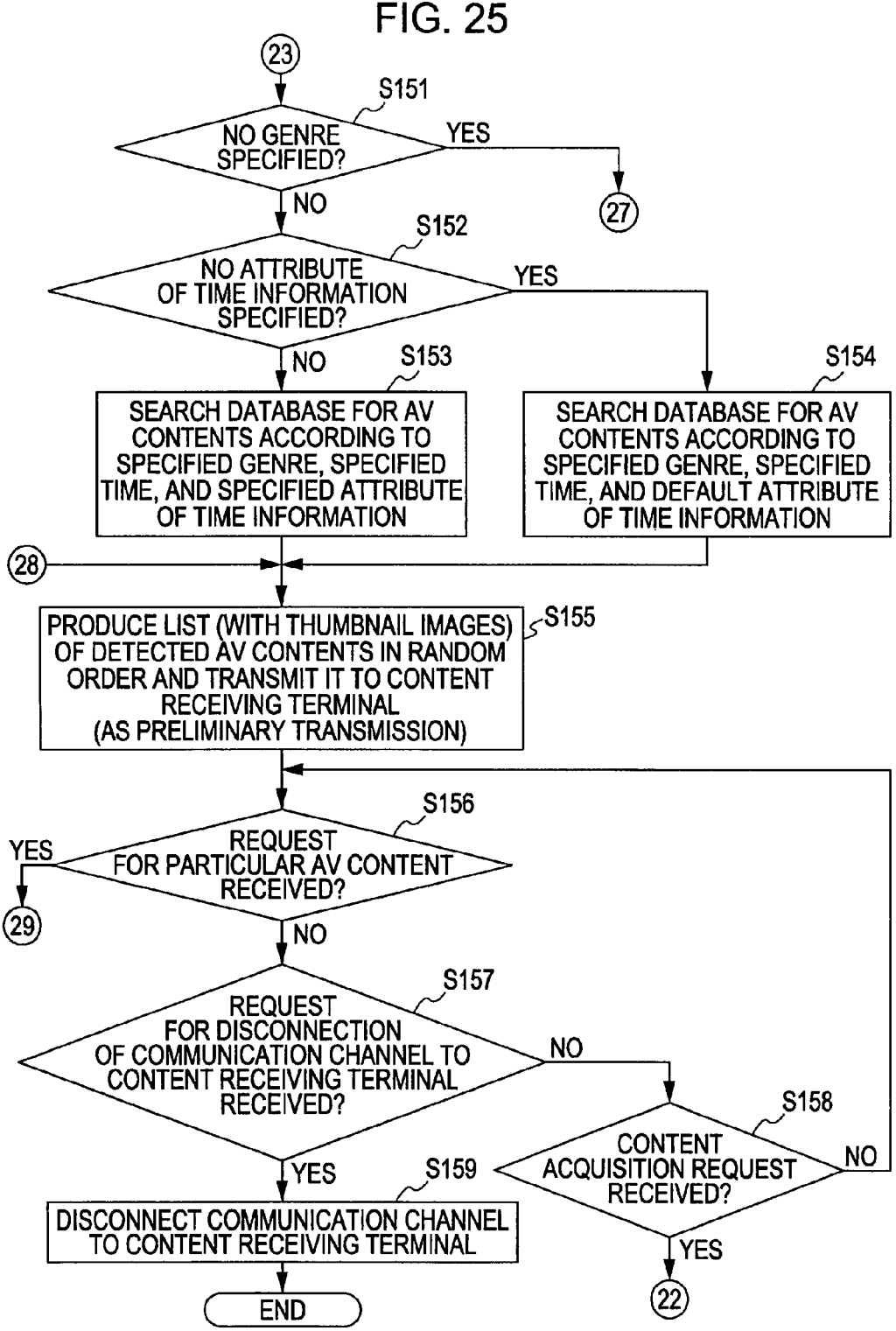
FIG. 25 is a part of a flow chart showing a process performed by a content providing server according to an embodiment of the present invention.

That is, first, the CPU 101 analyzes the associated information included in the content acquisition request to determine whether "don't care" is specified for the genre (step S151 in FIG. 25). If it is determined that "don't care" is not specified but a particular genre is specified, the CPU 101 further determines whether "don't care" is specified for the attribute of the time information (step S152).

If it is determined in step S152 that "don't care" is not specified but a particular attribute of the time information is specified, the CPU 101 sets a search condition according to the specified genre, the specified time information, and the specified attribute of the time information, and searches the content database 11 according to the set search condition (step S153).

In a case where it is determined in step S152 that "don't care" is specified for the attribute of the time information, the CPU 101 sets a search condition according to the specified genre, the specified time information, and a predetermined recommended attribute of the time information, and searches the content database 11 according to the set search condition (step S154).

Figure 26:
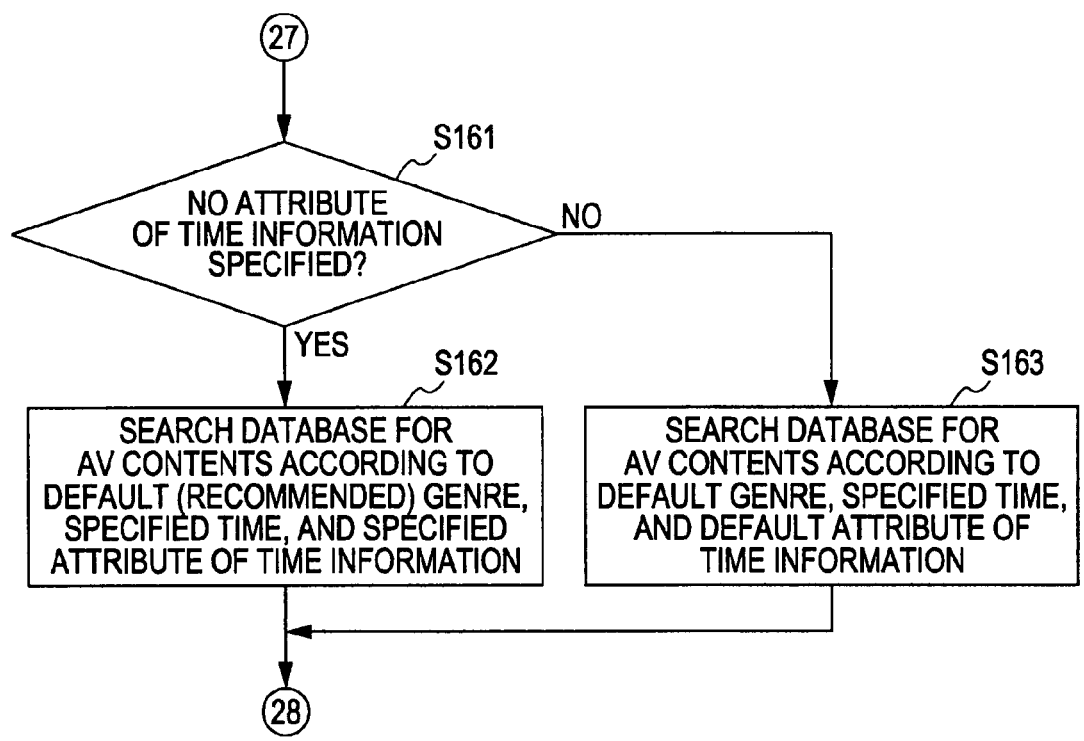
FIG. 26 is a part of a flow chart showing a process performed by a content providing server according to an embodiment of the present invention.
Figure 27:
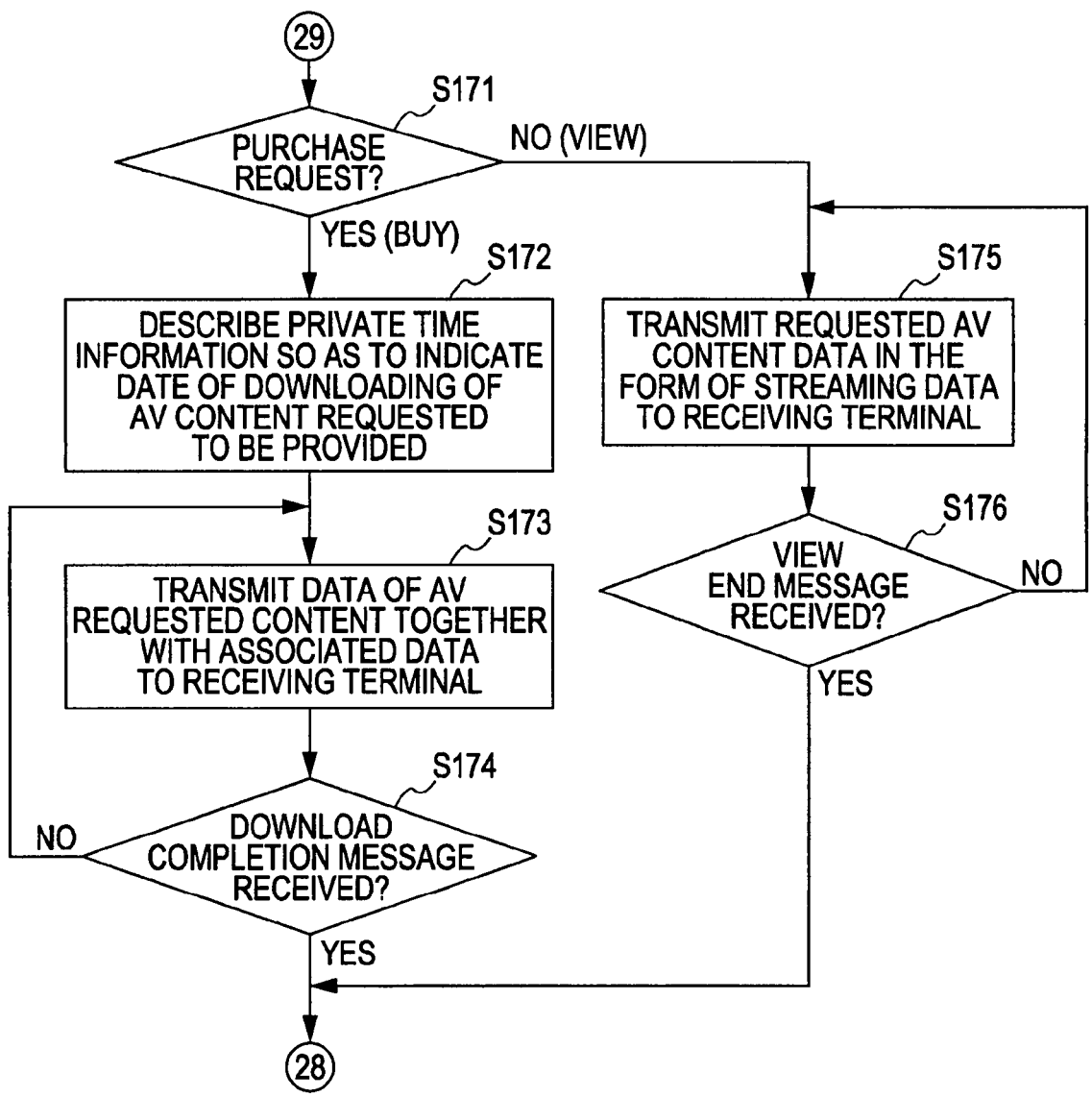
FIG. 27 is a part of a flow chart showing a process performed by a content providing server according to an embodiment of the present invention.

In a case where it is determined in step S151 that "don't care" is specified for the genre, the CPU 101 further determines whether "don't care" is specified for the attribute of the time information (step S161 in FIG. 26).

If it is determined in step S161 that "don't care" is not specified but a particular attribute of the time information is specified, the CPU 101 sets a search condition according to a predetermined recommended genre, the specified time information, and the specified attribute of the time information, and searches the content database 11 according to the set search condition (step S162).

In a case where it is determined in step S161 that "don't care" is specified as the attribute of the time information, the CPU 101 sets a search condition according to a predetermined recommended genre, the specified time information, and a predetermined recommended attribute of the time information, and searches the content database 11 according to the set search condition (step S163).

After the search step S153, S154, S162 or S163, the CPU 101 transmits, to the content receiving terminal, a content list in which AV contents detected in the searching step are listed in a random order, and thumbnail image data that makes it possible to display an image of a selected content (step S155).

The CPU 101 waits for a request (a full content transmission request) for acquisition of a content selected from the list to be received from the content receiving terminal (step S156). If it is determined in step S156 that the full content transmission request has been received, the CPU 101 further determines whether the received full content transmission request is for the purpose of purchase (step S171 in FIG. 27).

If it is determined in step S171 that the request is for the purpose of purchase, the CPU 101 describes the date of downloading (purchasing) the AV content, as private time information, in the associated data of the AV content (step S172).

The CPU 101 reads data of the requested AV content and associated data from the content database 11 and transmits them to the content receiving terminal which has issued the request (step S173).

The CPU 101 determines whether a download completion message has been received from the content receiving terminal (step S174). If it is determined that the download completion message has not been received, the process returns to step S173 to continue the transmission process.

If it is determined in step S174 that the download completion message has been received, the CPU 101 returns the process to step S155 in FIG. 25 to transmit, to the content receiving terminal, a content list in which AV contents detected in the searching step are listed in a random order, and thumbnail image data that makes it possible to display an image of a selected content.

In a case where it is determined in step S171 that the received content transmission request is not for the purpose of purchase but for the purpose of viewing, the CPU 101 reads the requested AV content from the content database 11 and transmits it in the form of streaming data to the content receiving terminal which has issued the request (step S175).

The CPU 101 determines whether a view end message has been received from the content receiving terminal (step S174). If it is determined that the view end message has not been received, the process returns to step S175 to continue the transmission of the streaming data.

If it is determined in step S174 that the view end message has been received, the CPU 101 returns the process to step S155 in FIG. 25 to transmit, to the content receiving terminal, a content list in which AV contents detected in the searching step are listed in a random order, and thumbnail image data that makes it possible to display an image of a selected content.

In a case where it is determined in step S156 the full content transmission request has not been received, the CPU 101 determines whether a communication channel disconnection request has been received from the content receiving terminal (step S157). If it is determined that the communication channel disconnection request has not been received from the content receiving terminal, the CPU 101 determines whether a new content acquisition request has been received (step S158). If it is determined that a new content acquisition request has not been received, the process returns to step S156 to wait for the full content transmission request to be received from the content receiving terminal.

If it is determined that a new content acquisition request has been received, the processing flow returns to step S115 in FIG. 21 to repeat the process from step S115.

If it is determined in step S157 that a communication channel disconnection request has been received from the content receiving terminal, the CPU 101 disconnects the communication channel to the content receiving terminal (step S159), and ends the present processing routine.

Content Search Process Performed by Content Receiving Terminal

The process of searching for contents from a plurality of contents stored in a content storage unit of a content receiving terminal in accordance with a search condition in terms of associated data of contents is described below.

Content Search Process Performed by Music Content Receiving Terminal

First, the process of searching for contents from a plurality of contents stored in the content storage unit 206 of the music content receiving terminal 20 in accordance with a search key determined based on time information and attribute information thereof is described below with reference to flow charts shown in FIGS. 28 to 34.

The process shown in FIGS. 13 to 16 is performed by the CPU 201 of the music content receiving terminal 20 by executing a program stored in the ROM 202 using the RAM 203 as a work area.

Figure 28:
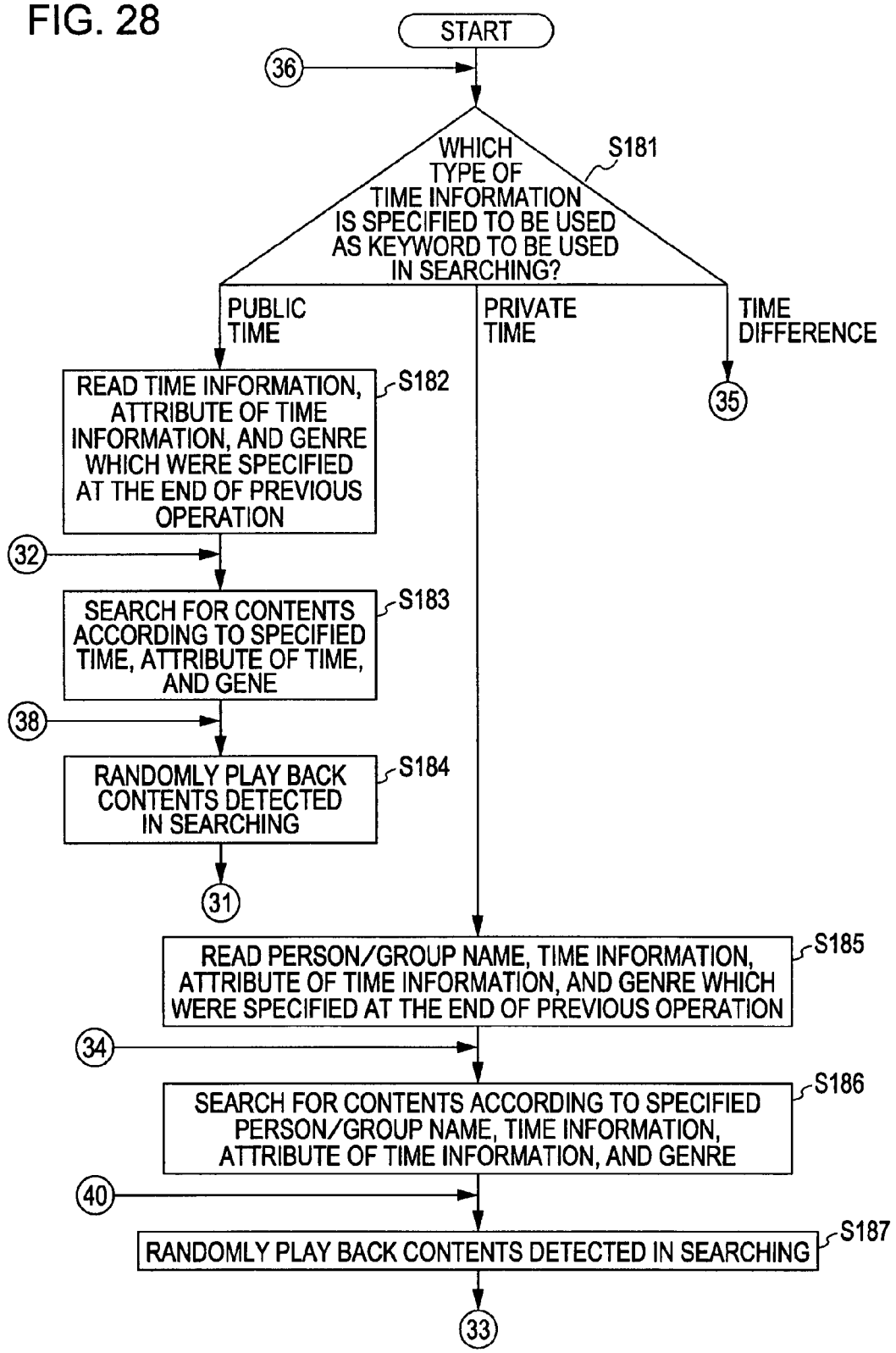
FIG. 28 is a part of a flow chart showing a process performed by a content receiving terminal configured so as to function as a music content receiving terminal according to an embodiment of the present invention.

If the music content receiving terminal 20 is set into an operation mode in which contents are searched for from those stored in the music content receiving terminal 20, the CPU 201 starts a processing routine shown in FIG. 28. First, the position of the search condition selection switch 27 is checked to determine which time information is specified to be used in the searching: private time information", public time information", or difference between private time information and public time information (step S181).

If it is determined in this step S181 that public time information is selected, the CPU 201 reads the time information (the public time information), the attribute of the time information, and the genre, which were specified in the immediately previous searching operation, from a storage unit (step S182).

In the CPU 201, the content search unit 219 searches the associated data of music contents stored in the content storage unit 206 according to the specified search condition in terms of the public time information and the attribute information of the time information (step S183).

If a plurality of music contents are detected as a result of the search, the CPU 201 plays back the detected music contents in an arbitrary order (step S184). If the next-content button 25e is operated, a next music content candidate is played back in immediate response to the operation of the next-content button 25e even if the end of the current music content has not yet been reached.

Figure 29:
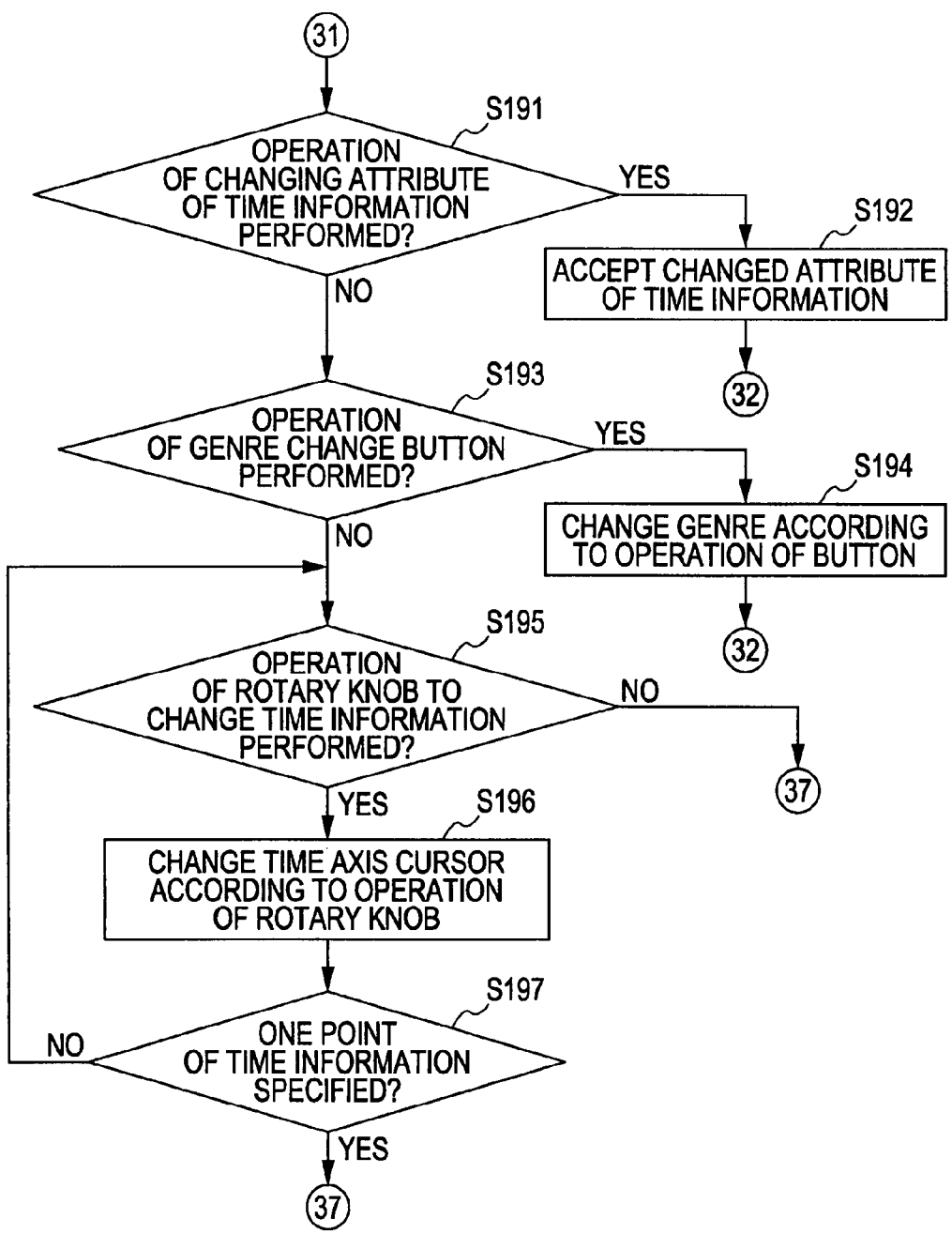
FIG. 29 is a part of a flow chart showing a process performed by a content receiving terminal configured so as to function as a music content receiving terminal according to an embodiment of the present invention.

The CPU 201 monitors the status of the operation control button 25a to detect whether the attribute of the time information is changed (step S191 in FIG. 29). If it is determined that the attribute of the time information has been changed, the CPU 201 accepts the changed attribute of the time information and changes the attribute of the time information displayed in the time information attribute display area 244 (step S192). The CPU 201 then returns the process to step S183 to again perform the search in accordance with the changed search condition by repeating the process from step S183.

In a case where it is determined in step S191 that the attribute of the time information has not been changed, the CPU 201 determines whether the operation control button 25b has been operated to change the genre (step S193) If it is determined that the genre has been changed, the CPU 201 accepts the changed genre and changes the genre displayed in the genre display area 245 (step S194). The CPU 201 then returns the process to step S183 to again perform the search in accordance with the changed search condition by repeating the process from step S183.

In a case where it is determined in step S193 that the genre has not been changed, the CPU 201 determines whether the rotatable operation control knob 23 has been operated to change the public time information (step S195). If it is determined that the public time information has been changed, the CPU 201 accepts the changed time information and changes the position of the time axis cursor 242 in accordance with the operation of changing the time information (step S196). The CPU 201 determines whether the operation of changing the time information by the user has been stopped for a period equal to or longer to the predetermined value thereby determining whether it is now time to issue a content acquisition request (step S197).

In a case where it is determined in step S197 that the operation of changing the time information is still being performed and thus it is not time to issue the content acquisition request, the CPU 201 returns the processing flow to step S195 to repeat the process from S195.

In a case where it is determined in step S197 that it is time to issue the content acquisition request, the CPU 201 returns the processing flow to step S183 to again perform the search in accordance with the changed search condition by repeating the process from step S183.

Figure 30:
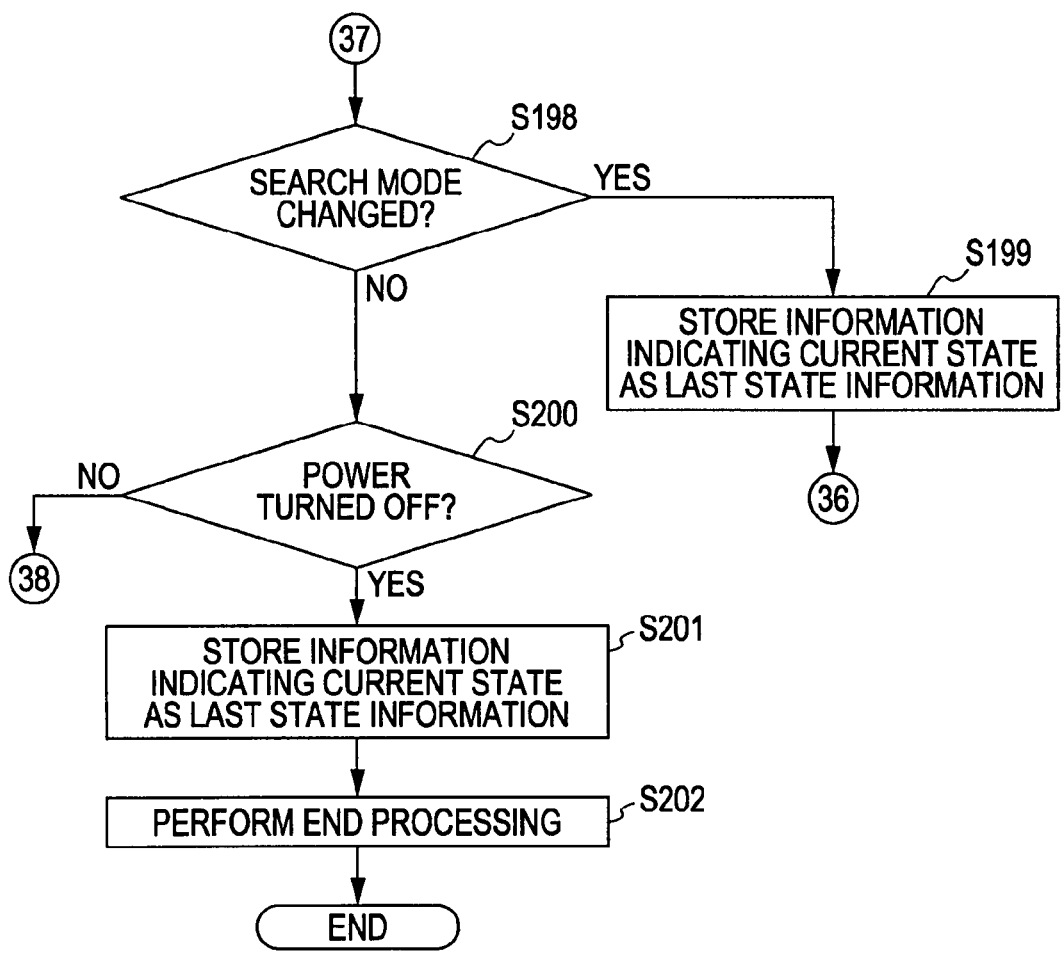
FIG. 30 is a part of a flow chart showing a process performed by a content receiving terminal configured so as to function as a music content receiving terminal according to an embodiment of the present invention.

In a case where it is determined in step S195 that the operation to change the time information has not been performed, the CPU 201 determines whether the operation mode has been changed from the search mode to another mode (step S198 in FIG. 30). If it is determined that the operation mode has been changed, the public time information, the attribute information of the time information, and the genre information specified at this point of time are stored in the storage unit (step S199). Thereafter, the process returns to step S181.

In a case where it is determined in step S198 that the operation mode remains in the search mode without being changed into another mode, the CPU 201 determines whether the power switch has been turned off (step S200). If it is determined that the power switch remains in the on-state without being turned off, the process returns to step S184 to continue the playback of the detected music content.

If it is determined is step S200 that the power switch has been turned off, the CPU 201 stores the public time information, the attribute of the time information, and the genre specified at this point of time into the storage unit (step S201). The CPU 201 then performs an end process including adding time information (private time information) indicating a history of playback of the music content to the associated data of the music content (step S202), and ends the present processing routine.

In a case where it is determined in step S181 that private time information is selected, the CPU 201 reads the time information (the private time information), the person/group name, the attribute of the time information, and the genre, which were specified in the immediately previous searching operation based on the private time information, from the storage unit (step S185). Note that the person/group name indicates which person/group the private time information belongs to.

By using the content search unit 219, the CPU 201 searches for music contents stored in the content storage unit 206 according to the specified search condition in terms of the private time information, the person/group name, the attribute of the time information, and the genre (step S186).

If a plurality of music contents are detected as a result of the search, the CPU 201 plays back the detected music contents in an arbitrary order (step S187).

Figure 31:
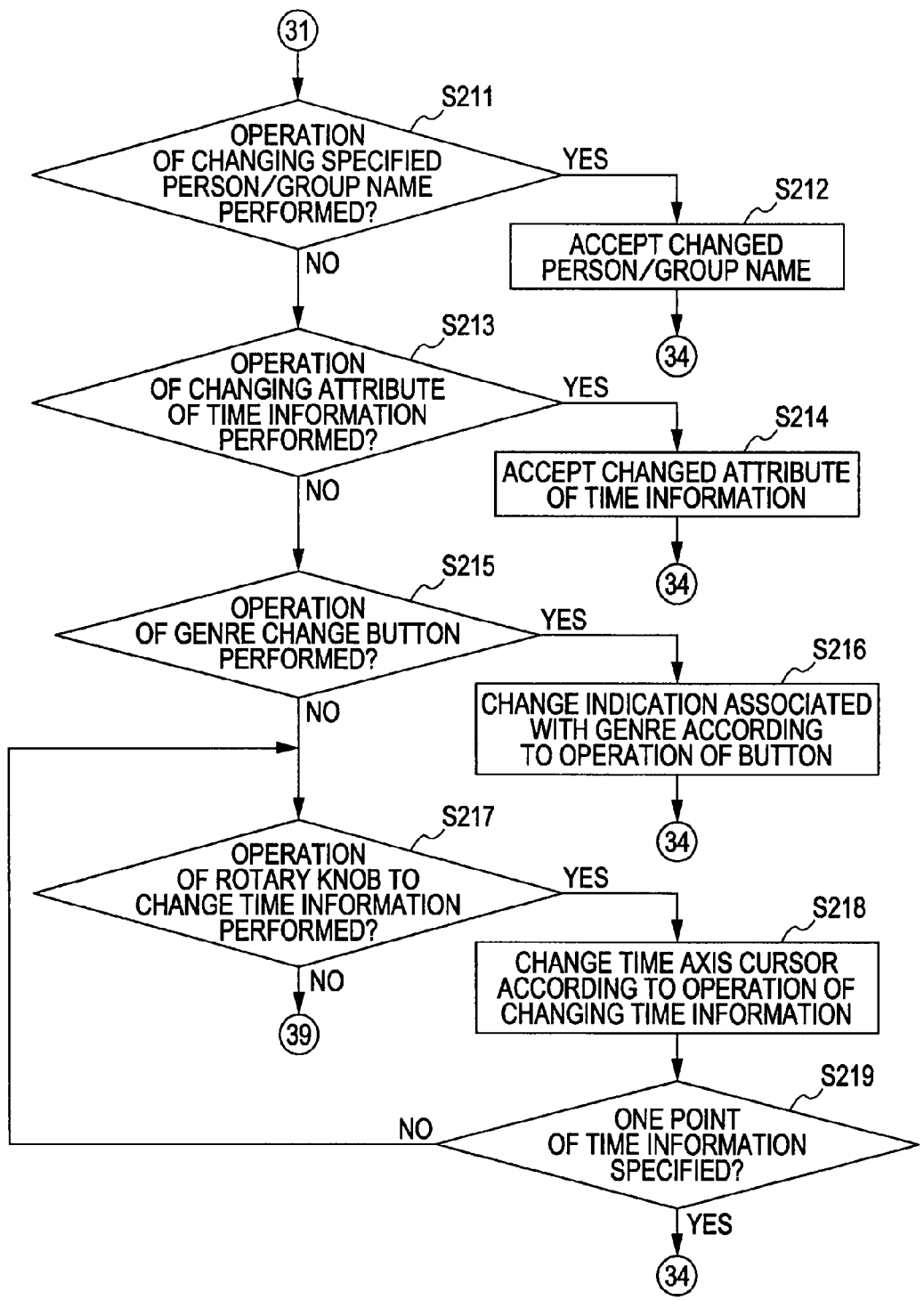
FIG. 31 is a part of a flow chart showing a process performed by a content receiving terminal configured so as to function as a music content receiving terminal according to an embodiment of the present invention.

The CPU 201 determines whether an operation to change the person/group name has been performed (step S211 in FIG. 31). If it is determined that the person/group name has been changed, the CPU 201 accepts the changed person/group name (step S212). The CPU 201 then returns the process to step S186 to again perform the search in accordance with the changed search condition by repeating the process from step S186.

The CPU 201 determines whether the operation control button 25a has been operated change the attribute of the time information (step S213). If it is determined that the attribute of the time information has been changed, the CPU 201 accepts the changed attribute of the time information and changes the attribute of the time information displayed in the time information attribute display area 244 (step S214). The CPU 201 then returns the process to step S186 to again perform the search in accordance with the changed search condition by repeating the process from step S186.

In a case where it is determined in step S213 that the attribute of the time information has not been changed, the CPU 201 determines whether the operation control button 25b has been operated to change the genre (step S215). If it is determined that the genre has been changed, the CPU 201 accepts the changed genre and changes the genre displayed in the genre display area 245 (step S216). The CPU 201 then returns the process to step S186 to again perform the search in accordance with the changed search condition by repeating the process from step S186.

In a case where it is determined in step S215 that the genre has not been changed, the CPU 201 determines whether the rotatable operation control knob 23 has been operated to change the private time information (step S217). If it is determined that the private time information has been changed, the CPU 201 accepts the changed time information and changes the position of the time axis cursor 242 in accordance with the operation of changing the time information (step S218). The CPU 201 determines whether the operation of changing the time information by the user has been stopped for a period equal to or longer to the predetermined value thereby determining whether it is now time to issue a content acquisition request (step S219).

If it is determined in step S219 that the operation of changing the time information is still being performed and thus it is not time to issue the content acquisition request, then the CPU 201 returns the processing flow to step S217 to repeat the process from step S217.

In a case where it is determined in step S219 that it is time to issue the content acquisition request, the CPU 201 returns the process to step S186 to again perform the search in accordance with the changed search condition by repeating the process from step S186.

Figure 32:
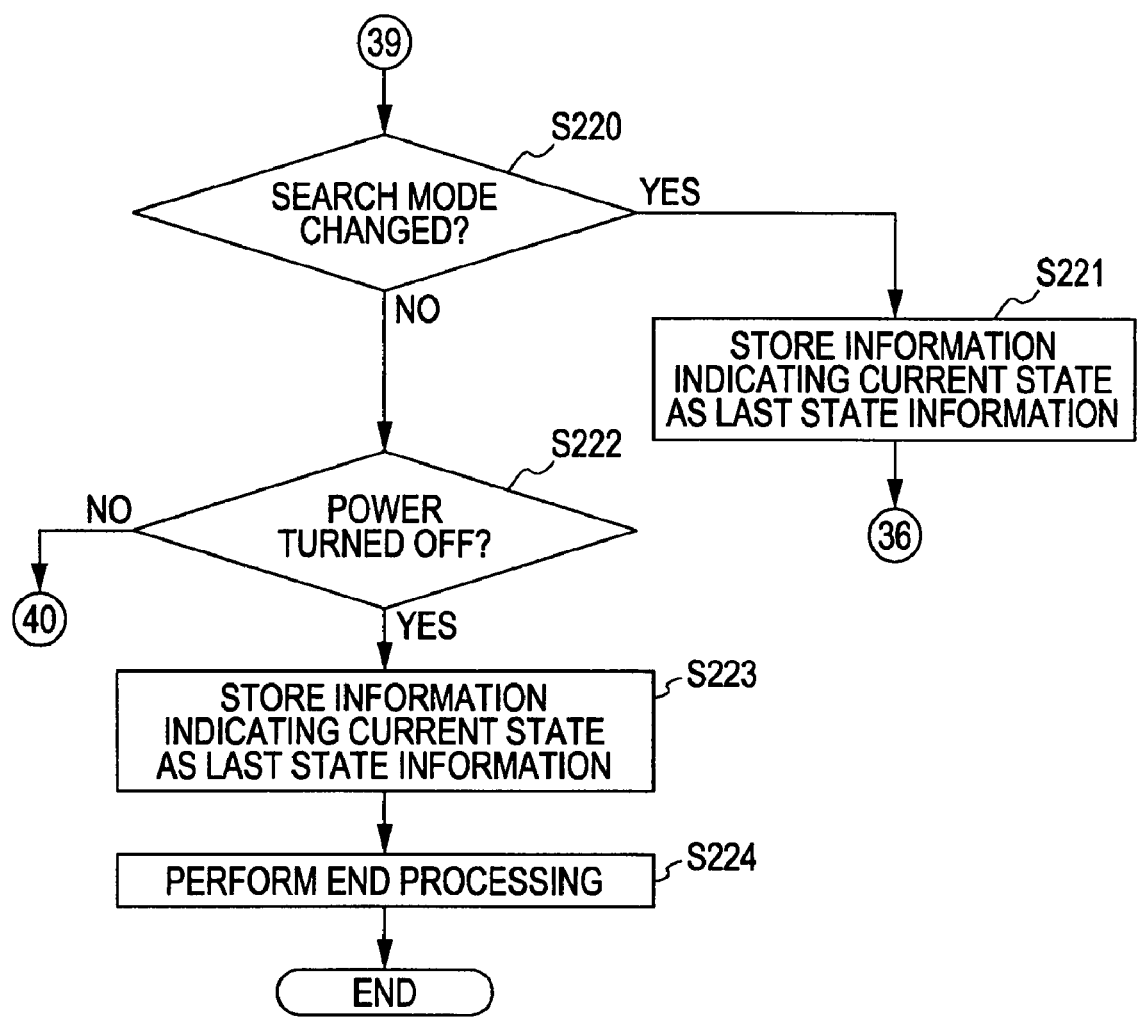
FIG. 32 is a part of a flow chart showing a process performed by a content receiving terminal configured so as to function as a music content receiving terminal according to an embodiment of the present invention.

In a case where it is determined in step S217 that the operation to change the time information has not been performed, the CPU 201 determines whether the operation mode has been changed from the search mode to another mode (step S220 in FIG. 32). If it is determined that the operation mode has been changed, the CPU 201 stores the private time information, the person/group name, the attribute of the time information, and the genre specified at this point of time into the storage unit (step S221). Thereafter, the process returns to step S181.

In a case where it is determined in step S220 that the operation mode remains in the search mode without being changed into another mode, the CPU 201 determines whether the power switch has been turned off (step S222). If it is determined that the power switch remains in the on-state without being turned off, the process returns to step S186 to continue the playback of the detected music content.

If it is determined is step S222 that the power switch has been turned off, the CPU 201 the public time information, the attribute information of the time information, and the genre information specified at this point of time are stored in the storage unit (step S223). The CPU 201 then performs an end process including adding time information (private time information) indicating a history of playback of the music content to the associated data of the music content (step S224), and ends the present processing routine.

Figure 33:
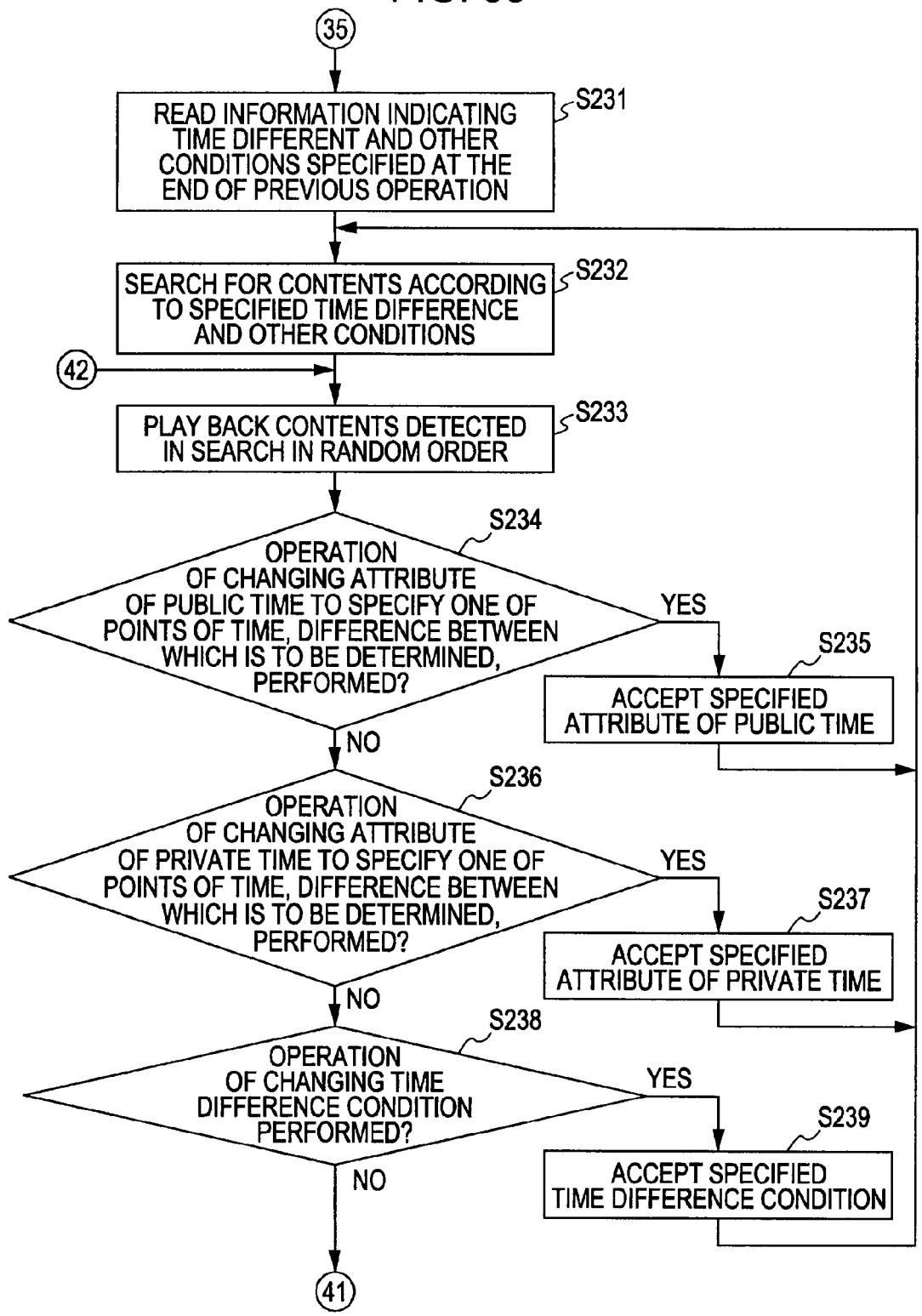
FIG. 33 is a part of a flow chart showing a process performed by a content receiving terminal configured so as to function as a music content receiving terminal according to an embodiment of the present invention.

In a case where it is determined in step S181 that time difference" is selected, the CPU 201 reads the time difference, which were specified in the immediately previous searching operation based on the "time difference", from the storage unit (step S231 in FIG. 33).

By using the content search unit 219, the CPU 201 searches for music contents stored in the content storage unit 206 according to the specified search condition in terms of the time difference and other parameters (step S232).

If a plurality of music contents are detected as a result of the search, the CPU 201 plays back the detected music contents in an arbitrary order (step S233).

The CPU 201 determines whether an operation has been performed to change the attribute of the public time information indicating a time value which is one of two time values the difference between which is to be determined (step S234). If it is determined that the attribute of the public time information has been changed, the CPU 201 accepts the changed attribute of the public time information (step S235). The CPU 201 then returns the process to step S232 to again perform the search in accordance with the changed search condition by repeating the process from step S232.

In a case where it is determined in step S234 that the operation to change the attribute of the public time information has not been performed, the CPU 201 determines whether an operation has been performed to change the attribute of the private time information indicating a time value which is the other one of two time values the difference between which is to be determined (step S236) If it is determined that the attribute of the private time information has been changed, the CPU 201 accepts the changed attribute of the private time information (step S237). The CPU 201 then returns the process to step S232 to again perform the search in accordance with the changed search condition by repeating the process from step S232.

In a case where it is determined in step S236 the operation to change the attribute of the private time information has not been performed, the CPU 201 determines whether an operation to change the time difference condition (step S238). If it is determined that the operation to change the time difference condition has been performed, the CPU 201 accepts the changed time difference condition (step S239). The CPU 201 then returns the process to step S232 to again perform the search in accordance with the changed search condition by repeating the process from step S232.

In the process described above, the time difference condition is determined, for example, such that the difference between the private time value having the specified attribute and the public time value having the specified attribute is first specified, and then a range to be satisfied is specified. For example, a range greater than the specified time difference is specified as the search condition, or a range smaller than the specified time difference is specified as the search condition.

More specifically, for example, when the release date is specified as the attribute of the public time information, and the purchase date (download date) is specified as the attribute of the private time information, if one week is specified as the difference between the pubic time value and the private time value and furthermore, "shorter than one week" is specified as the range, then contents which were purchased within one week after the release date are searched for.

In a case where when the same attributes as those in the above example are specified respectively for the attribute of the public time information and the attribute of the private time information, if "5 years" is specified as the time difference and "longer than the specified time difference value" is specified as the search condition in terms of the range, old-hit music contents or the like are searched for.

Figure 34:
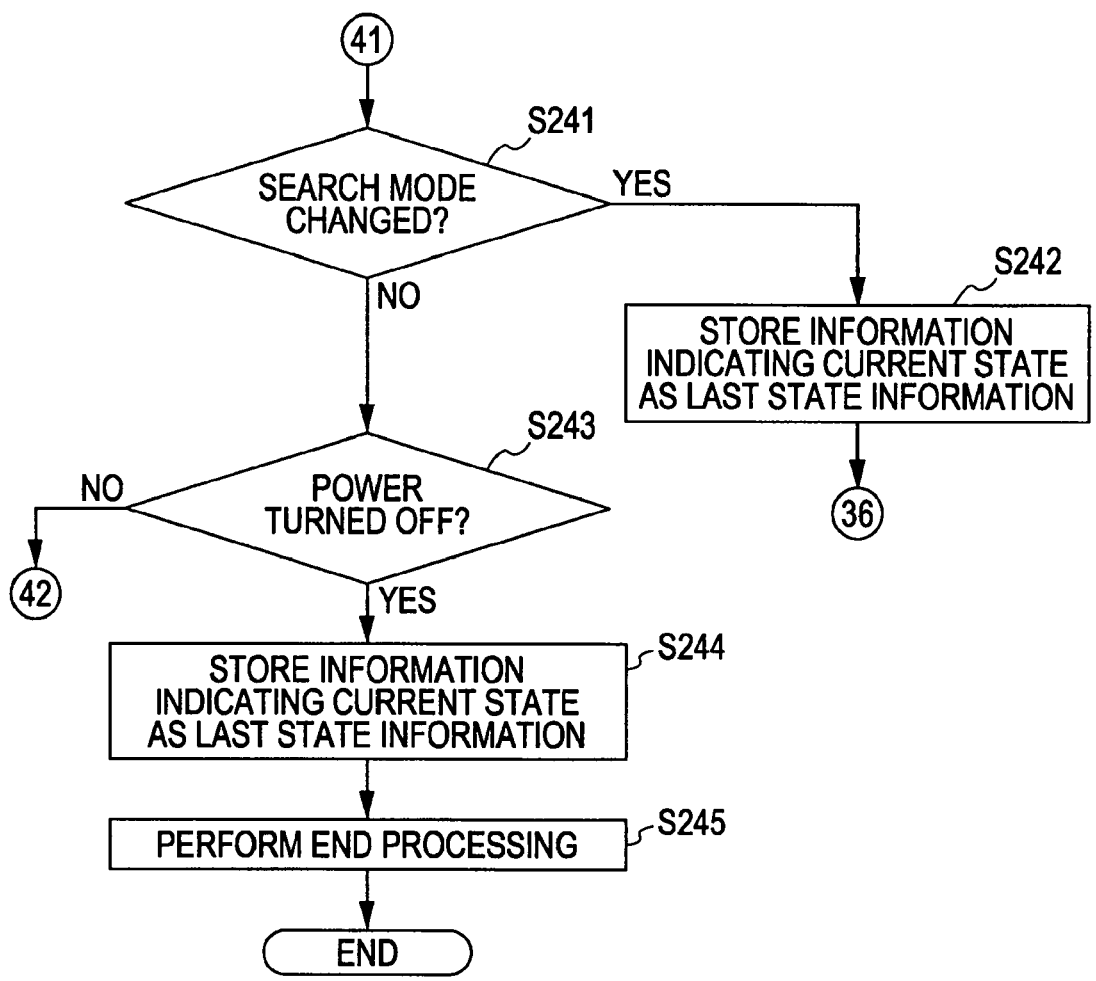
FIG. 34 is a part of a flow chart showing a process performed by a content receiving terminal configured so as to function as a music content receiving terminal according to an embodiment of the present invention.

In a case where it is determined in step S238 that the operation to change the time difference condition has not been performed, the CPU 201 determines whether the operation mode has been changed from the search mode to another mode (step S241 in FIG. 34). If it is determined that the operation mode has been changed, the CPU 201 stores the attribute of the private time information, the attribute of the public time information, and the time difference specified at this point of time into the storage unit (step S242). Thereafter, the process returns to step S181.

In a case where it is determined in step S241 that the operation mode remains in the search mode without being changed into another mode, the CPU 201 determines whether the power switch has been turned off (step S243). If it is determined that the power switch remains in the on-state without being turned off, the process returns to step S233 to continue the playback of the detected music content.

In a case where it is determined in step S243 that the power switch has been turned off, the CPU 201 stores the attribute of the private time information, the attribute of the public time information, and the time difference specified at this point of time into the storage unit (step S244). The CPU 201 then performs an end process including adding time information (private time information) indicating a history of playback of the music content to the associated data of the music content (step S245), and ends the present processing routine.

Figure 35:
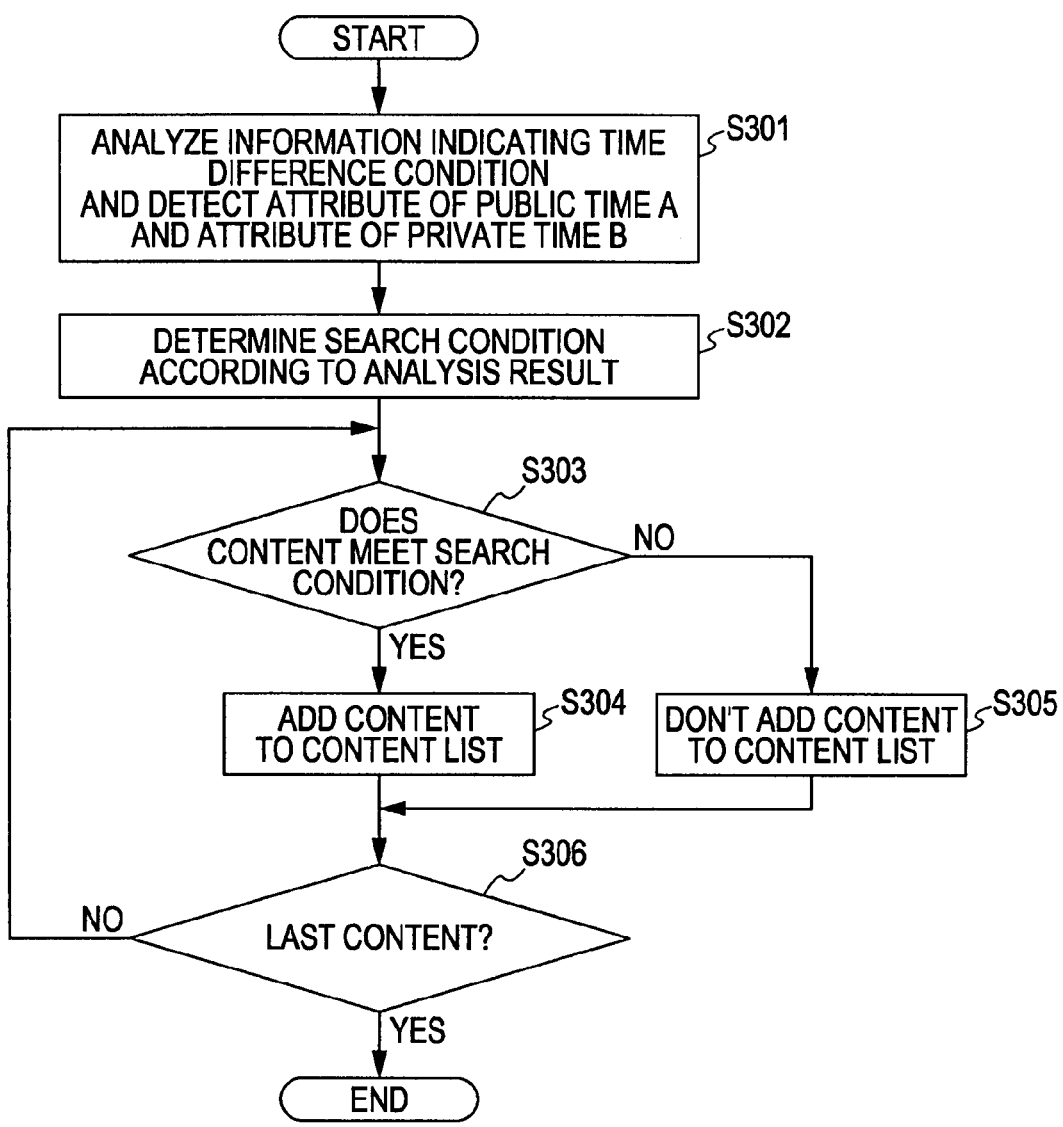
FIG. 35 is a part of a flow chart showing a process performed by a content receiving terminal configured so as to function as a music content receiving terminal according to an embodiment of the present invention.

A specific example of the search process based on the time difference condition in step S232 is described below with reference to a flow chart shown in FIG. 35.

That is, first, the CPU 201 analyzes the time difference condition information to identify the specified attribute of the public time information A and the specified attribute of the private time information B (step S301). Thereafter, the CPU 201 determines the difference C between B and A and identifies whether "greater than C" or "smaller than C" is specified as the search condition in terms of the range (step S302).

The CPU 201 then reads associated data of music contents and examines the associated data to determine whether attributes of public and private time information satisfy the specified attributes thereby extracting music contents having specified attributes of public and time information. The CPU 201 further examines the time values of the extracted music contents to determine the time difference between the public time information A and the private time information B and further determines whether the time difference is within the range specified as the search condition in terms of the range (step S303).

If it is determined in step S303 that the content under examination satisfies the specified search condition in terms of the time difference, then the CPU 201 adds the content to a list of music contents to be played back (step S304).

On the other hand, if it is determined in step S303 that the specified search condition in terms of the time difference is not satisfied, then the CPU 201 does not add the content to the list of music contents to be played back (step S305).

After step S304 or S305, the CPU 201 determines whether the examination is completed for all music contents stored in the content storage unit 206 (step S306). If it is determined that the examination is not yet completed for all music contents, then the process returns to step S303 to examine a next content by repeating the process from step S303. In the case where it is determined in step S306 that the examination is completed for all contents, the present search process routine is ended.

Content Search Process Performed by AV Content Receiving Terminal

The process of searching for contents from a plurality of contents stored in the content storage unit 306 of the AV content receiving terminal 30 in accordance with a search condition based on time information and attribute information thereof is described below with reference to flow charts shown in FIGS. 35 to 41.

The process shown in FIGS. 36 to 41 is performed by the CPU 301 of the AV content receiving terminal 30 by executing a program stored in the ROM 302 using the RAM 303 as a work area.

Figure 36:
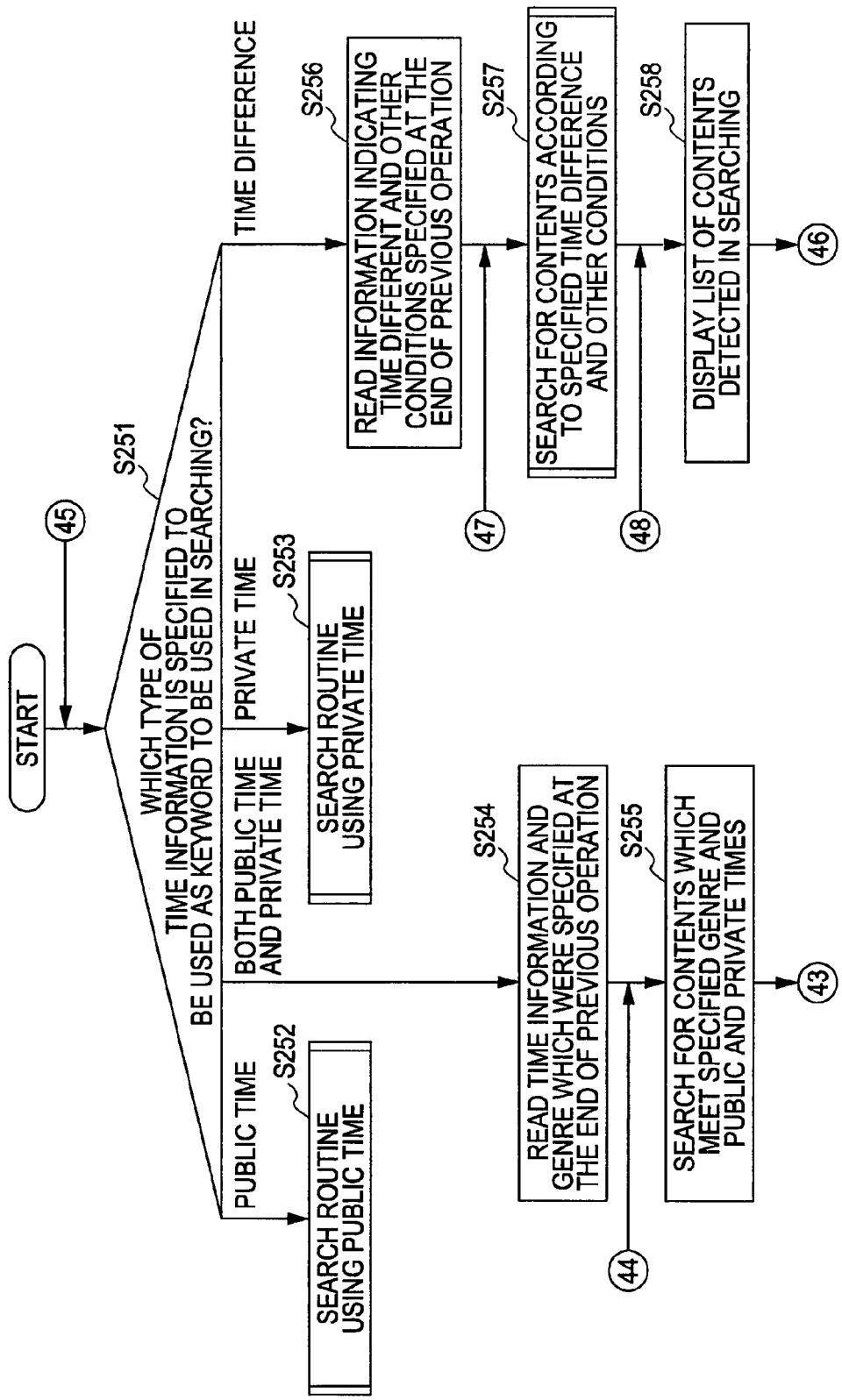
FIG. 36 is a part of a flow chart showing a process performed by a content receiving terminal configured so as to function as an AV content receiving terminal according to an embodiment of the present invention.
Figure 37:
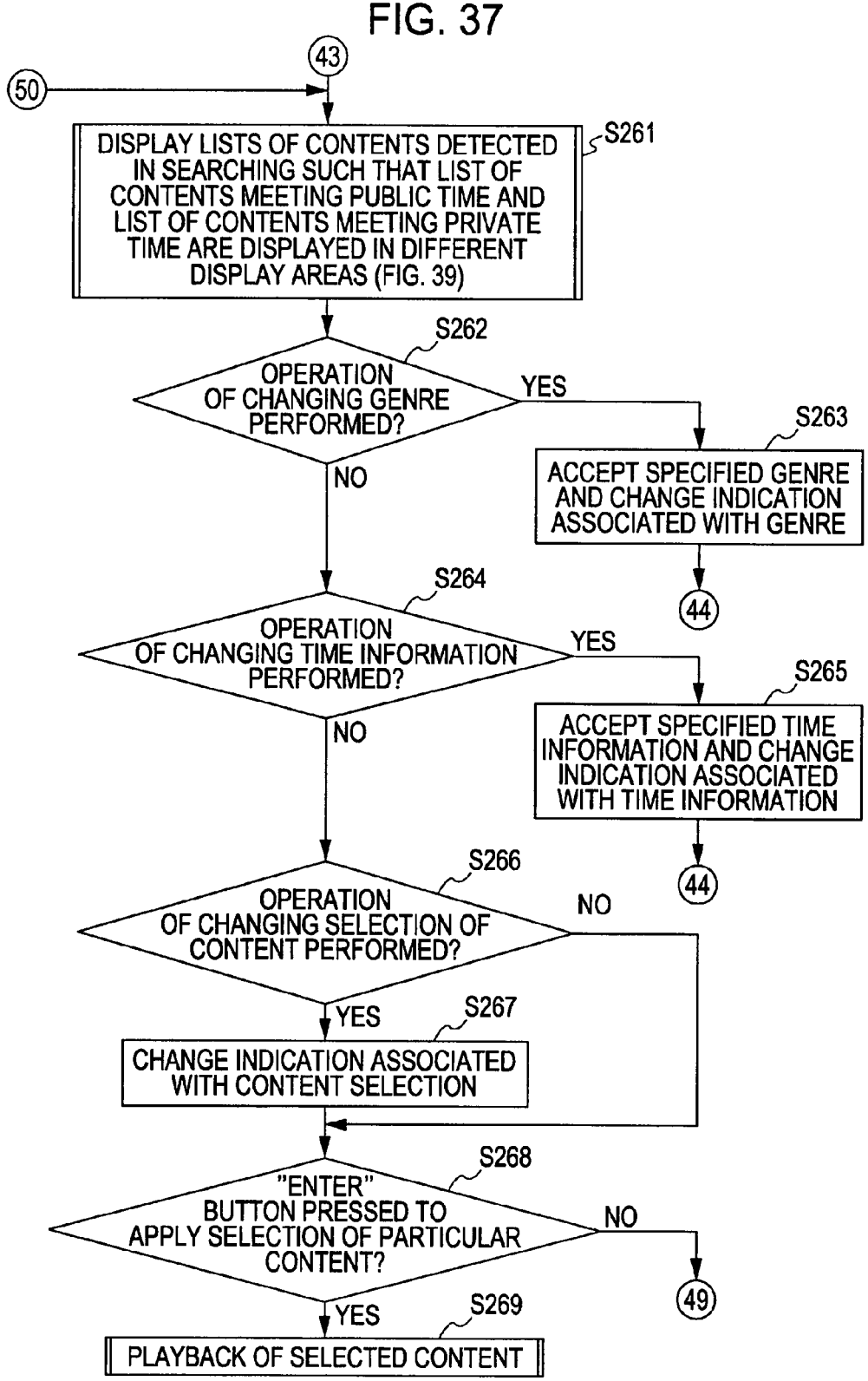
FIG. 37 is a part of a flow chart showing a process performed by a content receiving terminal configured so as to function as an AV content receiving terminal according to an embodiment of the present invention.

If the AV content receiving terminal 30 is set into an operation mode in which contents are searched from those stored in the AV content receiving terminal 30, then the CPU 301 starts a processing routine shown in FIG. 36. The CPU 301 identifies time information specifies to be used in the search, for example, via the menus screen. More specifically, it is determined which of private time information of "public time information", "time difference between private time information and public time information" or "both public time information and private time information" is selected as time information to be used in the search process (step S251).

If it is determined in step S251 that public time information is selected, then the CPU 301 performs the content search routine using the public time information, the attribute information of the public time information, and the genre information as search keys (step S252).

On the other hand, if it is determined in step S251 that private time information is selected, then the CPU 301 performs the content search routine using the private time information, the attribute information of the private time information, and the genre information as search keys (step S253).

The content search routine in step S252 using the public time information, the attribute information thereof, and the genre information as search keys, and the content search routine in step S253 using the private time information, the attribute information thereof, and the genre information as search keys are basically similar to the above-described content search routine performed by the music content receiving terminal 20 using the public time information, the private time information, the attribute information thereof, and the genre information as search keys, although the flow chart thereof is not shows.

However, in this content search routine performed by the AV content receiving terminal 30, unlike the content search routine performed by the music content receiving terminal 20 in which music contents detected in the search process are sequentially played back, a list of AV contents satisfying the search condition is first displayed on the display screen 34, and only AV contents selected by a user from the list are played back.

In the AV content receiving terminal, it is also allowed to search for contents in accordance with both the public time information and the private time information. In this case, the search condition may or may not include also the genre information.

More specifically, if it is determined in step S251 that use of both the public time information and the private time information as search keys is specified, then the CPU 301 reads the genre information and the time information, which were specified at the end of the previous search operation, from the storage unit (step S254), and the CPU 301 searches for contents by checking whether the associated data of AV contents stored in the content storage unit 306 satisfies the specified search condition in terms of the time information and the genre (step S255).

The CPU 301 detects AV contents which have time information satisfying the specified search condition in terms of public time information and which satisfy the search condition in terms of the genre, and produces a list of detected AV contents. The CPU 301 also detects AV contents which have time information satisfying the specified search condition in terms of private time information and which satisfy the search condition in terms of the genre, and produces a list of detected AV contents. The CPU 301 then displays these two lists on the display screen 34 such that the list of AV contents with time information satisfying the search condition in terms of the public time information is displayed in a display area 37 on the left-hand side of the display screen 34, while the list of AV contents with time information satisfying the search condition in terms of the private time information is displayed in a display area 38 on the right-hand side of the display screen 34, as shown in FIG. 39 (step S261 in FIG. 37).

Figure 39:
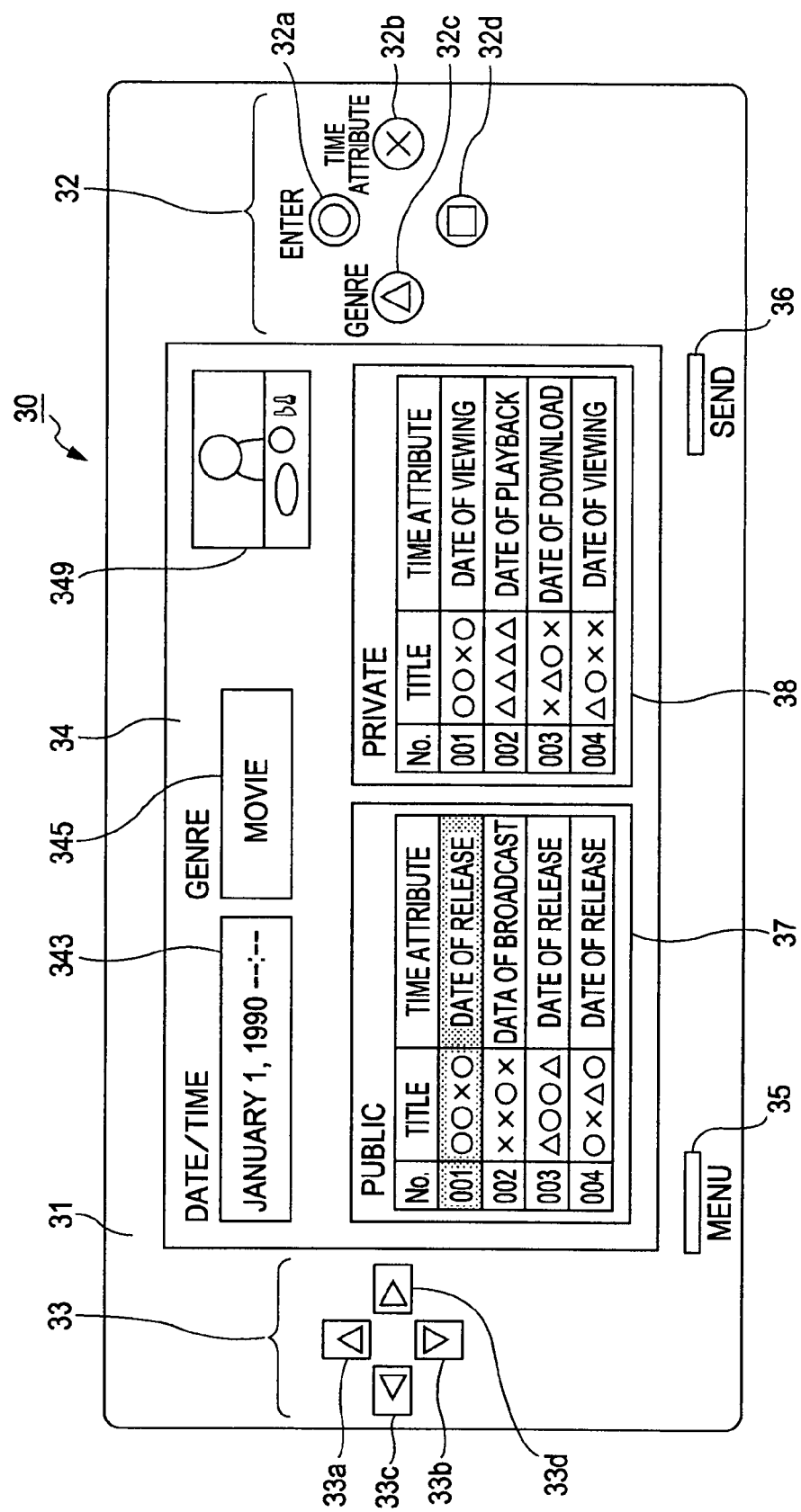
FIG. 39 is a diagram showing an example of a display screen on an operation control panel of a content receiving terminal configured so as to function as an AV content receiving terminal according to an embodiment of the present invention.

In the two lists, as shown in FIG. 39, a title and an attribute of time information of each AV content is displayed. Therefore, from these lists, a user can know the attributes of public time information and private time information for each content. On the basis of the attributes of time information, the user can select an AV content to be played back.

Because the list of AV contents satisfying the search condition in terms of public time information and the list of AV contents satisfying the search condition in terms of private time information are displayed in separate display areas 37 and 38, the user can easily decide which AV content should be played back by selecting a content from the lists of AV contents obtained by simply specifying the time information and the genre. This is very convenient for the user.

The CPU 301 then determines whether the operation control button 32*c* has been operated to change the genre (step S262). If it is determined that the genre has been changed, the CPU 301 accepts the changed genre and changes the genre displayed in the genre display area 345 (step S263). The CPU 301 then returns the process to step S255 to again perform the search in accordance with the changed search condition by repeating the process from step S255.

On the other hand, if it is determined in step S262 that the genre has not been changed, the CPU 301 determines whether the time information has been changed (step S264). If it is determined that the time information has been changed, the CPU 301 accepts the changed time information and changes the time information displayed in the time information display area 343 (step S265). The CPU 301 then returns the process to step S255 to again perform the search in accordance with the changed search condition by repeating the process from step S255.

In a case where it is determined in step S264 that the operation to change the time information has not been performed, then the CPU 301 determines whether the operation to change the selected content (step S266). Note that the changing operation may be performed using the arrow button pad 33. In the present example, it is allowed to select a content from either one of lists displayed in the display areas 37 and 38, and the selection as to which one of the lists is used is performed by using the left or right arrow button 33*c* or 33*d*.

In the example shown in FIG. 39, selection of a content is allowed for the display area 37 on the left-hand side, and an AV content in a row with a row number of 001 is currently selected. Note that the row 001 is shaded to indicate that this row is currently selected. A thumbnail image of the currently selected content is displayed in the image display area 349.

In a case where it is determined in step S266 that the operation of changing the selected content has been performed, the CPU 301 changes the indications in the list in accordance with the operation so as to indicate which content has been newly selected (step S267).

On the other hand, if it is determined in step S266 that the operation to change the selected content has not been performed or after step S267, the CPU 301 determines whether the enter button 32*a* has been operated to apply the selection of the content (step S268).

If it is determined in step S268 that the operation to apply the selection of the content has been performed, then the CPU 301 plays back the AV content being currently selected in the content list displayed on the display screen 34 (step S269).

Figure 38:
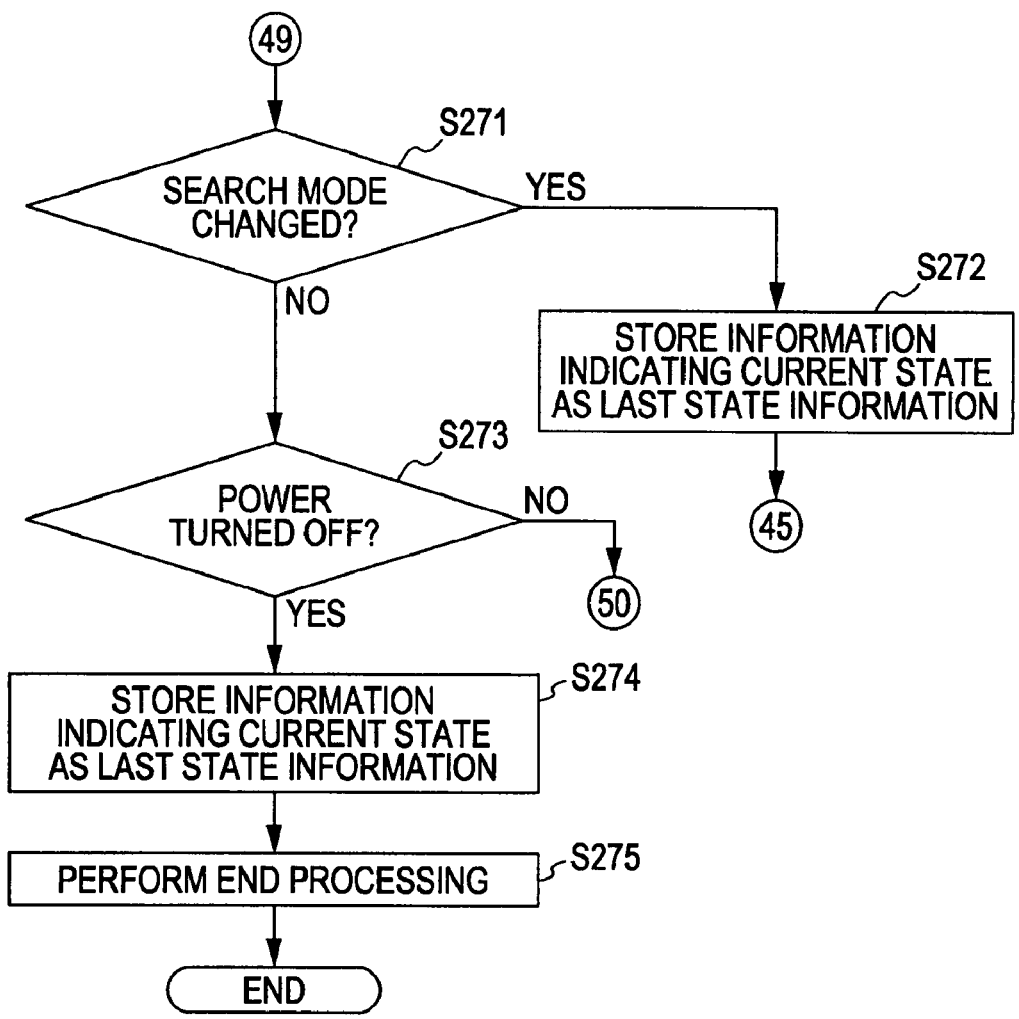
FIG. 38 is a part of a flow chart showing a process performed by a content receiving terminal configured so as to function as an AV content receiving terminal according to an embodiment of the present invention.

On the other hand, if it is determined in step S268 that the operation to apply the selection of the content has not been performed, then the CPU 301 determines whether the operation mode has been changed from the search mode to another mode (step S271 in FIG. 38). If it is determined that the operation mode has been changed, the CPU 301 stores the time information and the genre information specified at this point of time into the storage unit (step S272). Thereafter, the process returns to step S251.

On the other hand, if it is determined in step S271 that the operation mode remains in the search mode without being changed into another mode, then the CPU 301 determines whether the power switch has been turned off (step S273). If it is determined that the power switch remains in the on-state without being turned off, the process returns to step S261 to continue displaying of the content lists.

In a case where it is determined in step S273 that the power switch has been turned off, then the CPU 301 stores the time information and the genre information specified at this point of time into the storage unit (step S274). The CPU 301 then performs an end process including adding time information (private time information) indicating a history of viewing of the AV content to the associated data of the AV content (step S275), and ends the present processing routine.

In a case where it is determined in step S251 that time difference" is selected, the CPU 301 reads the time difference, which were specified in the immediately previous searching operation based on the "time difference", from the storage unit (step S256).

The CPU 301 then searches for contents by checking whether the associated data of AV contents stored in the content storage unit 306 satisfies the specified search condition in terms of the time information and the genre (step S257).

The CPU 301 produces a list of detected contents and displays the produced content list on the display screen 34, for example, as shown in FIG. 7.

Figure 40:
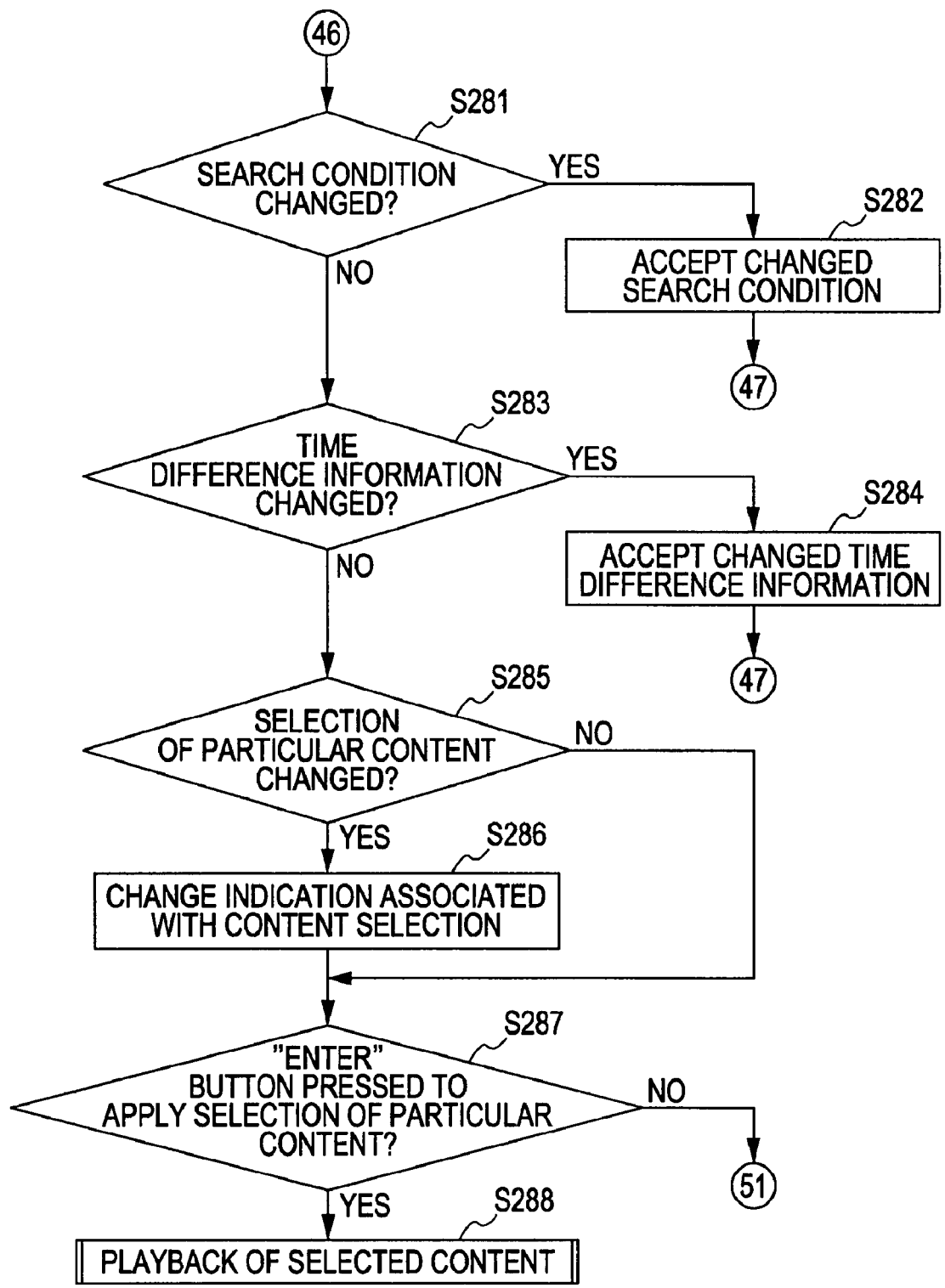
FIG. 40 is a part of a flow chart showing a process performed by a content receiving terminal configured so as to function as an AV content receiving terminal according to an embodiment of the present invention.

The CPU 301 then determines whether an operation has been performed to change the attribute of the public or private time information indicating a time value which is one of two time values the difference between which is to be determined (step S281 in FIG. 40). If it is determined that the changing operation has been performed, the CPU 301 accepts the changed attribute of the public or private time information (step S282). The CPU 301 then returns the process to step S257 to again perform the search in accordance with the changed search condition by repeating the process from step S257.

On the other hand, if it is determined in step S281 that the operation to change the attribute of the public or private time information has not been performed, then the CPU 301 further determines whether an operation to change the time difference condition (step S283). If it is determined that the time difference condition has been changed, the CPU 301 accepts the changed time difference condition (step S284). The CPU 301 then returns the process to step S257 to again perform the search in accordance with the changed search condition by repeating the process from step S257.

As described above, the time difference condition information includes information specifying the difference between the private time value having the specified attribute and the public time value having the specified attribute is first specified, and information specifying an allowable range of the time difference. For example, a range greater than the specified time difference may be specified as the search condition, or a range smaller than the specified time difference may be specified as the search condition.

In a case where it is determined in step S283 that the operation to change the time difference condition has not been performed, then the CPU 301 determines whether the operation to change the selected content (step S285).

In a case where it is determined in step S285 that the operation to change the selected content has been performed the CPU 301 changes the indications in the list in accordance with the operation so as to indicate which content has been newly selected (step S286).

In a case where it is determined in step S285 that the operation to change the selected content has not been performed or after step S286, the CPU 301 determines whether the enter button 32a has been operated to apply the selection of the content (step S287).

If it is determined in step S287 that the operation to apply the selection of the content has been performed, the CPU 301 plays back the AV content being currently selected in the content list displayed on the display screen 34 (step S288).

Figure 41:
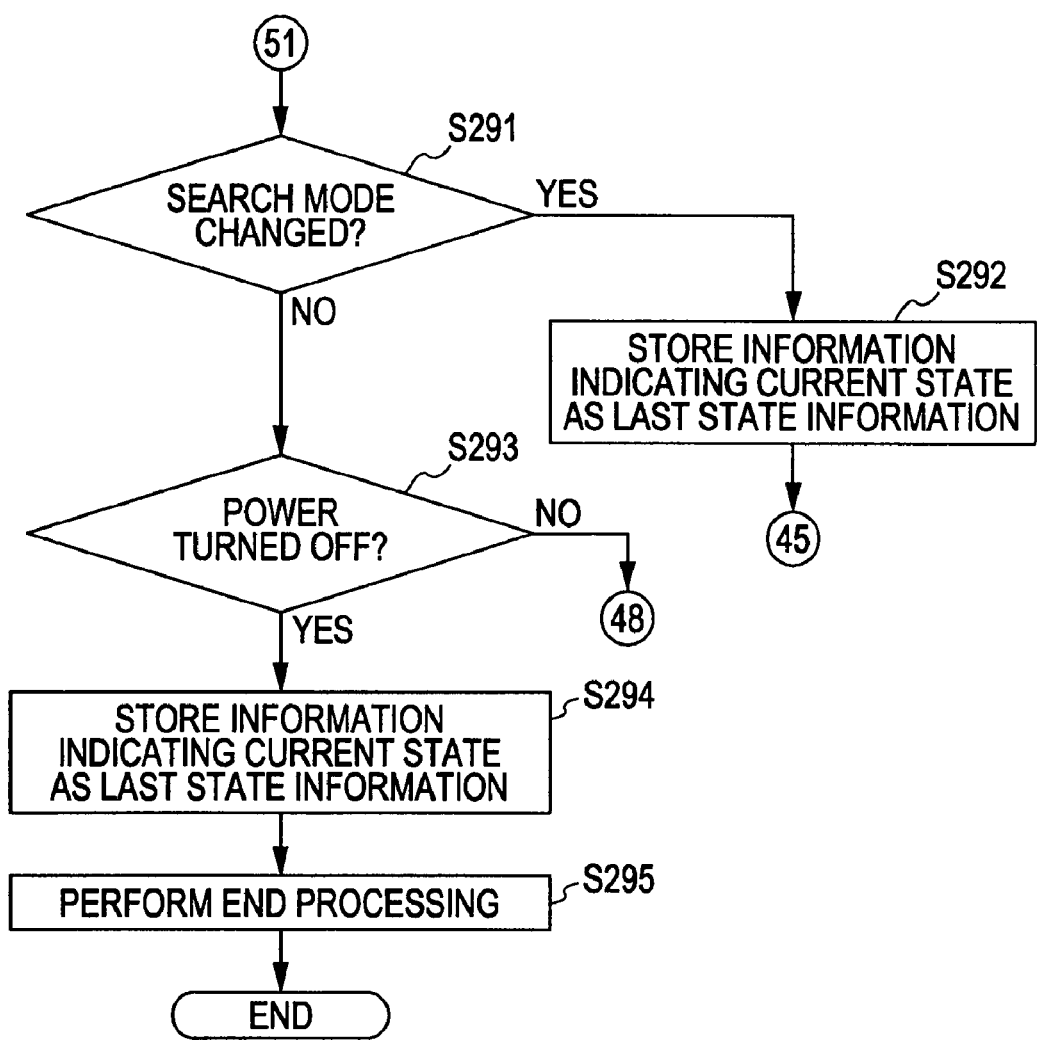
FIG. 41 is a part of a flow chart showing a process performed by a content receiving terminal configured so as to function as an AV content receiving terminal according to an embodiment of the present invention.

On the other hand, if it is determined in step S287 that the operation to apply the selection of the content has not been performed, the CPU 301 determines whether the operation mode has been changed from the search mode to another mode (step S291 in FIG. 41). If it is determined that the operation mode has been changed, the CPU 301 stores the time difference condition information and the genre information specified at this point of time into the storage unit (step S292). Thereafter, the process returns to step S251.

On the other hand, if it is determined in step S291 that the operation mode remains in the search mode without being changed into another mode, then the CPU 301 determines whether the power switch has been turned off (step S293). If it is determined that the power switch remains in the on-state without being turned off, the process returns to step S258 to continue displaying of the content lists.

In a case where it is determined in step S293 that the power switch has been turned off, then the CPU 301 stores the time difference condition information and the genre information specified at this point of time into the storage unit (step S294). The CPU 301 then performs an end process including adding time information (private time information) indicating a history of viewing of the AV content to the associated data of the AV content (step S295), and ends the present processing routine.

Modifications to Embodiments

In the embodiments described above, it is assumed by way of example that the genre is only the allowed content attribute type. However, the content attribute type is not limited to the genre, but an attribute of other attribute type may be described in the content acquisition request.

In this case, the content attributes may be specified in a hierarchical manner. For example, the content attribute type such as the genre, the artist (the performer), the author is first specified, and then other attribute of the selected content attribute type is specified. More specifically, if the artist is specified as the content attribute type, a list of artists is displayed, and an artist is selected from the list.

This makes it possible to easily find contents performed by a particular artist and released or purchased in a particular year (or on a particular day of a particular month in a particular year) or hit in a particular year (or on a particular day of a particular month in a particular year), and so on.

In the embodiments described above, the content receiving terminal searches for contents of a particular single type which satisfy a specified search condition in terms of time information (and also associated information if required). However, in a case where a plurality types of content data are stored in the content database, it may be allowed to search for contents of a plurality of types which satisfy a specified search condition in terms of time information (and also in terms of associated information if necessary).

In the embodiments described above, a list of detected contents is displayed such that each row includes text information corresponding to a particular content. Alternatively, for example, each row may include an image of a disk jacket or a thumbnail image of a content in addition to a text description.

In a case where a range such as a year is specified as time information to be satisfied, detected contents may be arranged in an overlapping manner in the order of time in a direction perpendicular to the display screen (for example, disk jackets are arranged in the above-described manner).

Other Embodiments

Home Network

In the embodiments described above, the network using the Internet is used in the content providing system. A home network may also be directly employed in the content providing system. For example, a home network using a commercial power line or a wireless home network may be used.

In the case where a home network is used, for example, the content providing system may include a home server realized by a personal computer including an internal/external high-capacity storage medium, and content data and associated information may be described in a content database stored on the storage medium.

A user may record a content using a broadcast program recording apparatus and transfer it to the content database via the home network, or may read content data from a copiable and removable recording medium and record it in the content database.

The personal computer may access an external apparatus via the Internet to acquire various kinds of contents and may store acquired contents in the database.

It is desirable that the broadcast program recording apparatus have a capability of adding data indicating recording date to a recorded content data and transferring the resultant content data to the content database. The recording apparatus may further have a capability of extracting a broadcast date from electronic program table data and supplying it to the content database.

In this home network system, a portable terminal serving as a content receiving terminal may produce a content acquisition request in a similar manner to the above-described embodiments and may transmit it to the home server. In response, a content may be provided from the home server.

Modifications described above may also be applied to this home network system.

Further Modifications

In the embodiments described above, contents satisfying a specified search condition in terms of time information are searched for. In a case where the time information specifies a particular year, month, hours, minutes, and seconds, not only contents exactly satisfying the time information but also contents close to the specified time information may also be searched for. Also in a case where the time information does not specify such a precise time value but coarsely specifies a time value, not only contents exactly satisfying the time information but also contents close to the specified time information may also be searched for.

This makes it possible for a user to issue a content acquisition request even when the user does not remember the exact time value. That is, the user may guess a rough time value and may issue a content acquisition request based on the guessed rough time value. Contents detected as a result of search based on the rough time value are supplied to the user. This makes it possible for the user to easily acquire necessary contents.

In the embodiments described above, music contents or AV contents are played back when they are provided in the form of streaming data from the content providing server. Alternatively, content data may be downloaded, and downloaded content data may be played back. In this case, a content receiving terminal and a content providing server in the content providing system do not necessarily need to be always connected to each other, and a communication channel between them may be disconnected after downloading is completed.

The content data stored in the content database 11 of the content providing server 10 may include associated data indicating private time information related to a particular person such as an artist or a performer.

In the content providing server 10, each time a particular content is provided to a particular user identified by a user ID, associated data of this content may be stored in associated with the user ID and the content ID. In this case, even when a content receiving terminal does not have a content storage unit, the content receiving terminal is capable of acquire a desired content from the content providing server 10 by issuing a content acquisition request including information specifying private time information, public time information, and/or time difference information.

It should be understood by those skilled in the art that various modifications, combinations, sub-combinations and alterations may occur depending on design requirements and other factors insofar as they are within the scope of the appended claims or the equivalents thereof.

What is claimed is:

1. A method of obtaining contents for use in a computer system comprising a processor, the method comprising:
    setting public time information and private time information, the public time information being associated with each content and the private time being associated with each content;
    providing input time information;
    associating a time information type with the input time information, the time information type indicating whether the input time information is public time information or private time information;
    identifying a searching request for content according to the input time information and the time information type; and
    receiving content responsive to the searching request.

2. The method of obtaining contents according to claim 1, wherein:
    the public time information and the private time information each include, as associated data, attribute information indicating attributes of the public time information and the private time information, respectively; and
    content searching is performed using also the attribute information of each type of time information.

3. The method of obtaining contents according to claim 2, wherein the attribute information of the private time information includes information identifying a person or group associated with the private time information.

4. The method of obtaining contents according to claim 2, wherein a plurality of sets of public time information and attribute information of the public time information are defined for content data.

5. The method of obtaining contents according to claim 2, wherein a plurality of sets of private time information and attribute information of the private time information are defined for content data.

6. The method of obtaining contents according to claim 2, wherein a set of private time information and attribute information of the private time information associated with the content is input by a user of the content.

7. The method of obtaining contents according to claim 2, wherein a set of private time information and attribute information of the private time information associated with the content is defined and assigned to the content by a device configured to use content data.

8. The method of obtaining contents according to claim 1, wherein when particular time information is provided as a search key, contents whose public time information matches the search key and content whose private time information matches the search key are searched for, and a result is received and displayed such that detected contents whose public time information matches the search key are distinguishable from detected contents whose private time information matches the search key.

9. The method of obtaining contents according to claim 1, wherein the content searching is performed using the difference between the public time information and the private time information as a search key.

10. The method of obtaining contents according to claim 9, wherein:
    the public time information and the private time information each include, as associated data, attribute information indicating attributes of the public time information and the private time information, respectively; and
    when the difference between the public time information and the private time information is set as the search key, the attribute information of the public time information and the attribute information of the private time information are also set as search keys.

11. A content usage apparatus configured to:

provide input time information;

associate a time information type with the input time information, the time information type indicating whether the input time information is public time information or private time information;

identify a search request for contents by providing, as search keys, the input time information and the time information type associated with the input time information, wherein each content is associated with public time information and private time information; and use contents received responsive to the search request.

* * * * *